US011937062B2

(12) United States Patent
Liu

(10) Patent No.: US 11,937,062 B2
(45) Date of Patent: Mar. 19, 2024

(54) ELECTROACOUSTIC TRANSDUCER, SPEAKER MODULE, AND ELECTRONIC DEVICE

(71) Applicant: Huawei Technologies Co., Ltd., Shenzhen (CN)

(72) Inventor: Jinhua Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 127 days.

(21) Appl. No.: 17/777,764

(22) PCT Filed: Nov. 10, 2020

(86) PCT No.: PCT/CN2020/127758

§ 371 (c)(1),
(2) Date: May 18, 2022

(87) PCT Pub. No.: WO2021/104006

PCT Pub. Date: Jun. 3, 2021

(65) Prior Publication Data

US 2022/0417666 A1 Dec. 29, 2022

(30) Foreign Application Priority Data

Nov. 28, 2019 (CN) ......................... 201911194492.1

(51) Int. Cl.
*H04R 9/04* (2006.01)
*H04R 1/02* (2006.01)
(Continued)

(52) U.S. Cl.
CPC ............. *H04R 9/046* (2013.01); *H04R 1/025* (2013.01); *H04R 9/025* (2013.01); *H04R 9/045* (2013.01); *H04R 9/06* (2013.01)

(58) Field of Classification Search
CPC ........ H04R 9/046; H04R 1/025; H04R 9/025; H04R 9/045; H04R 9/06
(Continued)

(56) References Cited

U.S. PATENT DOCUMENTS 9,479,873 B2 10/2016 Yamagami et al.
10,277,986 B2 4/2019 Li
(Continued)

FOREIGN PATENT DOCUMENTS

CN 206674192 U 11/2017
CN 208158872 U 11/2018
(Continued)

*Primary Examiner* — Norman Yu
(74) *Attorney, Agent, or Firm* — Slater Matsil, LLP

(57) ABSTRACT

Embodiments of this application disclose an electroacoustic transducer, including a center magnet, two first side magnets, two second side magnets, a voice coil, a voice diaphragm, and two flexible printed circuit boards. The two first side magnets are symmetrically arranged on two sides of the center magnet, and a first gap is formed between the first side magnet and the center magnet. One end of the voice coil is partially located in the first gap, and the voice diaphragm is fixedly connected to the other end of the voice coil. The two flexible printed circuit boards are symmetrically arranged on two sides of the center magnet. The electroacoustic transducer has comparatively high magnetic induction strength and comparatively high sensitivity.

19 Claims, 33 Drawing Sheets

(51) Int. Cl.
*H04R 9/02* (2006.01)
*H04R 9/06* (2006.01)

(58) Field of Classification Search
USPC ....... 381/412, 400, 150, 324, 396, 401, 409, 381/111, 191
See application file for complete search history.

(56) References Cited

U.S. PATENT DOCUMENTS

| | | | |
|---|---|---|---|
| 11,026,025 | B2 | 6/2021 | Xiao et al. |
| 11,310,603 | B2 | 4/2022 | Cheng et al. |
| 2017/0265007 | A1 | 9/2017 | Guo et al. |
| 2019/0028804 | A1 | 1/2019 | Zhao et al. |
| 2019/0238989 | A1 | 8/2019 | Xiao et al. |
| 2021/0235196 | A1 | 7/2021 | Cheng et al. |

FOREIGN PATENT DOCUMENTS

| | | | | |
|---|---|---|---|---|
| CN | 209517495 | U | | 10/2019 |
| CN | 209526874 | U | | 10/2019 |
| CN | 110418254 | A | | 11/2019 |
| CN | 110418255 | A | | 11/2019 |
| CN | 110418259 | | * | 11/2019 |
| CN | 110418259 | A | | 11/2019 |
| CN | 110418261 | A | | 11/2019 |
| IN | 110418256 | A | | 11/2019 |
| JP | 2016025613 | A | | 2/2016 |
| KR | 20090028877 | A | | 3/2009 |

* cited by examiner

ELECTROACOUSTIC TRANSDUCER, SPEAKER MODULE, AND ELECTRONIC DEVICE

CROSS-REFERENCE TO RELATED APPLICATIONS

This application is a national stage of International Application No. PCT/CN2020/127758, filed on Nov. 10, 2020, which claims priority to Chinese Patent Application No. 201911194492.1, filed on Nov. 28, 2019. Both of the aforementioned applications are hereby incorporated by reference in their entireties.

TECHNICAL FIELD

Embodiments of this application relate to the field of audio technologies, and in particular, to an electroacoustic transducer, a speaker module, and an electronic device.

BACKGROUND

A moving coil micro-speaker is an electroacoustic transducer, and is an audio assembly commonly used in a portable electronic device currently. As consumers require increasingly high sound quality of electronic devices, speakers usually need to be designed with larger amplitudes. Currently, a speaker includes a voice coil and a wire connected to the voice coil. Because the wire needs to vibrate with the voice coil at a large amplitude, a flexible printed circuit (flexible printed circuit, FPC) board is used to form the wire in the industry, to reduce a risk of wire fracture due to fatigue.

The voice coil is inserted in a magnetic circuit of the speaker, and the flexible printed circuit board needs to vibrate with the voice coil in the magnetic circuit. Therefore, a structural size of the flexible printed circuit board and a size of the magnetic circuit of the speaker affect each other, and a specific design gap further needs to be reserved between the flexible printed circuit board and the magnetic circuit of the speaker, to prevent the flexible printed circuit board from colliding with the magnetic circuit during vibration. Therefore, when a comparatively long design size is used for the flexible printed circuit board to reduce local stress during large-amplitude vibration, the size of the magnetic circuit is shortened, thereby reducing a driving force for the speaker, and causing poor sensitivity of the speaker.

SUMMARY

An objective of this application is to provide an electroacoustic transducer, a speaker module, and an electronic device with comparatively high sensitivity.

According to a first aspect, an embodiment of this application provides an electroacoustic transducer. The electroacoustic transducer is configured to convert an electrical signal into a sound signal. The electroacoustic transducer includes a center magnet, two first side magnets, two second side magnets, a voice coil, a voice diaphragm, and two flexible printed circuit boards. The two first side magnets are symmetrically arranged on two sides of the center magnet, and a first gap is formed between the first side magnet and the center magnet. The two second side magnets are symmetrically arranged on two sides of the center magnet, and the second side magnet is located on a side, away from the center magnet, of the first side magnet. One end of the voice coil is partially located in the first gap, and the voice diaphragm is fixedly connected to the other end of the voice coil. The two flexible printed circuit boards are symmetrically arranged on two sides of the center magnet. The flexible printed circuit board is located on a side, away from the center magnet, of the first side magnet, and is located between the second side magnet and the voice diaphragm. Tail ends of two stubs of the flexible printed circuit board are fixedly connected to two corners of the voice coil respectively.

Compared with a conventional electroacoustic transducer in which flexible printed circuit boards are arranged on a side magnet and a center magnet, in the electroacoustic transducer in this embodiment, a relative location relationship between the flexible printed circuit board and the first side magnet is changed, so that the gap between the first side magnet and the center magnet is narrower, and a magnetic circuit of the electroacoustic transducer has higher magnetic induction strength, thereby helping improve sensitivity of the electroacoustic transducer. In addition, in the electroacoustic transducer, a pair of second side magnets is additionally disposed in a space under the flexible printed circuit boards, so that magnetic induction strength of the magnetic circuit of the electroacoustic transducer is effectively improved, a driving force for the magnetic circuit is significantly increased, and the electroacoustic transducer has higher sensitivity.

In some embodiments, the first side magnet is spaced from the flexible printed circuit board. For example, on an XY plane of the electroacoustic transducer (that is, a plane on which a length direction of the electroacoustic transducer and a width direction of the electroacoustic transducer are located), a spacing between the first side magnet and the flexible printed circuit board may range from 0.1 millimeters to 0.5 millimeters. In this case, when vibrating with the voice coil, the flexible printed circuit board does not collide with the first side magnet, thereby ensuring reliability of the flexible printed circuit board.

In some embodiments, the second side magnet is spaced from the flexible printed circuit board. In a thickness direction of the electroacoustic transducer, a spacing between the flexible printed circuit board and the second side magnet may range from 0.1 millimeters to 0.7 millimeters. In this case, when vibrating with the voice coil, the flexible printed circuit board does not collide with the second side magnet, thereby ensuring reliability of the flexible printed circuit board.

In an optional embodiment, the electroacoustic transducer further includes a basin stand. A frame of the basin stand includes a first face and a second face that are opposite to each other. A periphery of the voice diaphragm is fixed to the first face of the frame. The voice coil is located on an inner side of the frame. The two flexible printed circuit boards are both partially fixed to the second face of the frame. A part, not fixed to the frame, of the flexible printed circuit board may vibrate with the voice coil relative to the frame.

In this embodiment, the voice diaphragm and the flexible printed circuit board are both fixed to the frame of the basin stand, so that assembly precision of the voice diaphragm and the flexible printed circuit board are comparatively high, and when the voice coil vibrates, the voice diaphragm fixed to an upper end of the frame and the flexible printed circuit board fixed to a lower end of the frame can be better synchronously driven, and a probability of rolling vibration of the voice coil is low, so that the electroacoustic transducer has comparatively good sound quality.

For example, the periphery of the voice diaphragm may be fixed to the first face of the frame of the basin stand through bonding. A vibration direction of the voice diaphragm is parallel to the thickness direction of the electroacoustic transducer. A space on the inner side of the frame forms a shape that is narrow at the bottom and wide at the top, so that the voice diaphragm has a larger vibration space, thereby helping the voice diaphragm implement large-amplitude vibration.

In an embodiment, the voice diaphragm includes a vibration diaphragm and a dome. The dome is roughly in a rectangular plate shape. The dome includes a top face and a bottom face that are disposed opposite to each other, and a peripheral region of the top face of the dome is concave to form a limiting groove. The vibration diaphragm is roughly in a rectangular ring shape. The vibration diaphragm includes a first fixed part, a vibrating part, and a second fixed part that are connected in sequence. The first fixed part is located on an inner side of the vibrating part, and the second fixed part is located on an outer side of the vibrating part. The first fixed part of the vibration diaphragm is partially accommodated in the limiting groove of the dome, and is fixed to the dome. A bottom face of the first fixed part of the vibration diaphragm is in contact with a bottom wall of the limiting groove of the dome. For example, a top face of the first fixed part of the vibration diaphragm is flush with the top face of the dome. A cross-sectional shape of the vibrating part of the vibration diaphragm is an arc or approximately arc shape, and an extension track of the vibrating part is in a rounded rectangular shape. The vibrating part of the vibration diaphragm is concave. To be specific, the vibrating part is concave in a direction away from the top face of the first fixed part of the vibration diaphragm and a top face of the second fixed part of the vibration diaphragm. In this case, when the vibrating part of the vibration diaphragm is subject to an external force, the vibrating part can deform, so that the first fixed part and the second fixed part move relative to each other, and the dome and the second fixed part move relative to each other.

In this embodiment, because the vibrating part of the vibration diaphragm is concave, an upper space of the electroacoustic transducer can be saved, and after the vibration diaphragm deforms under an influence of water pressure or air pressure, the vibration diaphragm can easily restore.

In another embodiment, the voice diaphragm includes a vibration diaphragm and a dome. The dome is roughly in a rectangular plate shape. The dome includes a top face and a bottom face that are disposed opposite to each other, and a peripheral region of the bottom face of the dome is convex to form a limiting groove. The vibration diaphragm is roughly in a rectangular ring shape. The vibration diaphragm includes a first fixed part, a vibrating part, and a second fixed part that are connected in sequence. The first fixed part is located on an inner side of the vibrating part, and the second fixed part is located on an outer side of the vibrating part. The first fixed part of the vibration diaphragm is partially accommodated in the limiting groove of the dome, and is fixed to the dome. A top face of the first fixed part of the vibration diaphragm is in contact with a bottom wall of the limiting groove of the dome. For example, a bottom face of the first fixed part of the vibration diaphragm is flush with the bottom face of the dome. A cross-sectional shape of the vibrating part of the vibration diaphragm is an arc or approximately arc shape, and an extension track of the vibrating part is in a rounded rectangular shape. The vibrating part of the vibration diaphragm is convex. To be specific, the vibrating part is convex in a direction away from the bottom face of the first fixed part of the vibration diaphragm and a bottom face of the second fixed part of the vibration diaphragm. When the vibrating part of the vibration diaphragm is subject to an external force, the vibrating part can deform, so that the first fixed part and the second fixed part move relative to each other, and the dome and the second fixed part move relative to each other.

In this embodiment, because the vibrating part of the vibration diaphragm is convex, a space under the vibration diaphragm is released, and a larger height size can be set for the magnetic circuit under the vibration diaphragm, thereby improving magnetic induction strength of the electroacoustic transducer, and improving sensitivity of the electroacoustic transducer.

In an optional embodiment, the flexible printed circuit board includes a body, a first stub, and a second stub. The body is fixedly connected to the second face of the frame. The first stub includes a head end, a tail end, and a connection section connected between the head end and the tail end. The second stub includes a head end, a tail end, and a connection section connected between the head end and the tail end. The head end of the first stub and the head end of the second stub are both connected to a middle part of the body. The tail end of the first stub is fixedly connected to a corner of the voice coil, and the tail end of the second stub is fixedly connected to another corner of the voice coil. The head end of the first stub and the head end of the second stub are disposed directly opposite to the second side magnet. The first stub and the second stub are spaced from the second side magnet and the first side magnet.

When the voice coil vibrates, the tail end of the first stub and the tail end of the second stub vibrate with the voice coil, amplitudes gradually decrease from the tail end of the first stub to the connection section of the first stub to the head end of the first stub, amplitudes gradually decrease from the tail end of the second stub to the connection section of the second stub to the head end of the second stub, and amplitudes of the head end of the first stub and the head end of the second stub are quite small. In this embodiment, the second side magnet directly faces the head end of the first stub and the head end of the second stub, so that the second side magnet can have a comparatively large height or a comparatively large local height, to improve magnetic induction strength of the magnetic circuit of the electroacoustic transducer.

In some embodiments, a part that is of the connection section of the first stub and that is close to the head end may be disposed directly opposite to the second side magnet, and a part that is of the connection section of the second stub and that is close to the head end may be disposed directly opposite to the second side magnet. The middle part of the body may also be disposed directly opposite to the second side magnet.

In this embodiment, the second side magnet is disposed directly opposite to the head end of the first stub, the head end of the second stub, and the middle part of the body. Therefore, the second side magnet can fully utilize a space under the flexible printed circuit board in the length direction of the electroacoustic transducer, so that the second side magnet has a comparatively large size, to effectively improve magnetic induction strength of the magnetic circuit.

The second side magnet directly faces the head end of the first stub with a comparatively small amplitude, a part of connection section that is close to the head end of the first stub, the head end of the second stub, and a part of connection section that is close to the head end of the second stub. Therefore, the second side magnet can fully utilize a space under the flexible printed circuit board in the width direction of the electroacoustic transducer, so that the second side magnet has a comparatively large size, to effectively improve magnetic induction strength of the magnetic circuit.

For example, the head end of the first stub is connected to the head end of the second stub, and then the two connected head ends are connected to the middle part of the body. In some other embodiments, the head end of the first stub and the head end of the second stub each are connected to a different location in the middle part of the body, and a gap is formed between the two head ends.

For example, the first stub and the second stub of the flexible printed circuit board are symmetrically disposed. In this case, when the voice coil vibrates, two locations at which the voice coil is connected to the flexible printed circuit board are subject to comparatively uniform stress, thereby facilitating steady vibration of the voice coil.

In an optional embodiment, the first stub includes a bent section and a straight section. One end of the bent section is connected to the tail end of the first stub, the other end of the bent section is connected to one end of the straight section, and the other end of the straight section is connected to the head end of the first stub. The bent section includes one or more arc sections, and each arc section is convex in a direction away from the center magnet.

In this embodiment, because the arc section of the bent section is convex in the direction away from the center magnet, when the voice coil drives the flexible printed circuit board to vibrate, a shape of the flexible printed circuit board can better adapt to deformation and displacement requirements, so that the flexible printed circuit board has higher reliability and a longer service life. In addition, the bent section can further fully utilize a space on an outer side of a corner of the voice coil, to route a longer wire, so that when the flexible printed circuit board vibrates with the voice coil at a large amplitude, stress is comparatively small, and the flexible printed circuit board has higher reliability. In addition, when a length of a bent part meets a requirement and a comparatively small space is occupied, an end part, arranged close to the bent part, of the body may have a comparatively large area, and the end part of the body not only has a sufficient area for fixing with an auxiliary vibration diaphragm (for details, refer to the following descriptions), but also has a sufficient area for fixing with an external structure of the electroacoustic transducer.

In an optional embodiment, the voice coil is in a rounded rectangular shape, the tail end of the first stub is fixedly connected to a round corner of the voice coil, and each arc section is disposed coaxially with the round corner, connected to the first stub, of the voice coil.

In this embodiment, because the arc section of the bent section is disposed coaxially with the round corner of the voice coil, when the voice coil drives the flexible printed circuit board to vibrate, a shape of the flexible printed circuit board can better adapt to deformation and displacement requirements, so that the flexible printed circuit board has higher reliability and a longer service life.

An extension direction of the straight section of the first stub may be roughly parallel to the width direction of the electroacoustic transducer. In this case, the straight section is comparatively long, so that the flexible printed circuit board is comparatively long, and a large amplitude is more easily implemented. In addition, the straight section occupies a comparatively small space in the length direction of the electroacoustic transducer, thereby helping suppress spatial extrusion against the magnetic circuit by the flexible printed circuit board, so that the magnetic circuit has a larger arrangement space, to ensure magnetic induction strength and sensitivity of the electroacoustic transducer.

The bent section of the first stub further includes a plurality of transition sections, and the transition section may be arranged between adjacent arc sections, or may be arranged between the arc section and the straight section, or may be arranged between the arc section and the tail end of the first stub.

In an optional embodiment, the electroacoustic transducer further includes four auxiliary vibration diaphragms. The four auxiliary vibration diaphragms are arranged at intervals on sides, away from the voice coil, of the two flexible printed circuit boards. One end of each of the four auxiliary vibration diaphragms is fixedly connected to each of tail ends of first stubs of the two flexible printed circuit boards and tail ends of second stubs of the two flexible printed circuit boards, and the other end of the auxiliary vibration diaphragm is fixedly connected to an end of a body of an adjacent flexible printed circuit board. Two ends of each auxiliary vibration diaphragm can move relative to each other.

In this embodiment, the electroacoustic transducer includes two compliant systems, the voice diaphragm is a first compliant system located above the voice coil, and the flexible printed circuit board and the auxiliary vibration diaphragm are a second compliant system located under the voice coil. The two compliant systems vibrate with the voice coil, to suppress rolling vibration of the voice coil, and ensure comparatively good sound quality of the electroacoustic transducer.

For example, the auxiliary vibration diaphragm is roughly in a fan shape. The auxiliary vibration diaphragm includes a first fixed part, a vibrating part, and a second fixed part that are connected in sequence. The first fixed part is located on an inner side of the vibrating part, and the second fixed part is located on an outer side of the vibrating part. The first fixed part is fixedly connected to a tail end of a stub of the flexible printed circuit board, and the second fixed part is fixedly connected to an end of the body of the flexible printed circuit board. A cross-sectional shape of the vibrating part of the auxiliary vibration diaphragm is an arc or approximately arc shape, and an extension track of the vibrating part is in an arc shape. The vibrating part of the auxiliary vibration diaphragm is concave. To be specific, the vibrating part is concave in a direction away from a top face of the first fixed part and a top face of the second fixed part. The first fixed part of the auxiliary vibration diaphragm is in a fan shape. A notch is formed on a side, away from the first fixed part, of the second fixed part of the auxiliary vibration diaphragm. When the vibrating part of the auxiliary vibration diaphragm is subject to an external force, the vibrating part can deform, so that the first fixed part and the second fixed part move relative to each other.

For example, a part of the flexible printed circuit board is exposed at an end at which the auxiliary vibration diaphragm is fixed to the flexible printed circuit board. In other words, an end part of the body of the flexible printed circuit board may be exposed through the notch of the second fixed part of the auxiliary vibration diaphragm. An exposed region of the end part of the body of the flexible printed circuit board relative to the auxiliary vibration diaphragm may be used for connecting another component of the electroacoustic transducer.

For example, the extension track of the vibrating part of the auxiliary vibration diaphragm is disposed coaxially with a round corner, connected to the auxiliary vibration diaphragm, of the voice coil. In this embodiment, when the first fixed part of the auxiliary vibration diaphragm vibrates with the voice coil, a shape of the vibrating part of the auxiliary vibration diaphragm can better adapt to deformation and displacement requirements, so that the auxiliary vibration diaphragm has higher reliability and a longer service life. In addition, because an arc section of a bent section of the stub of the flexible printed circuit board is also disposed coaxially with the round corner of the voice coil, the bent section of the stub of the flexible printed circuit board and the vibrating part of the auxiliary vibration diaphragm have similar deformation trends in a process of vibrating with the voice coil, so that a risk of collision between the bent section and the vibrating part can be reduced, and the electroacoustic transducer has higher reliability.

In an optional embodiment, in a thickness direction of the center magnet, a height of the first side magnet is greater than a height of the second side magnet. The thickness direction of the center magnet is parallel to the thickness direction of the electroacoustic transducer.

In this embodiment, because the first side magnet and the flexible printed circuit board are not stacked in the thickness direction of the electroacoustic transducer, the height of the first side magnet may be greater than the height of the second side magnet, to fully utilize a space and improve magnetic induction strength of the magnetic circuit, so that the electroacoustic transducer has comparatively high sensitivity.

In some embodiments, in the thickness direction of the electroacoustic transducer, the height of the first side magnet may be greater than a sum of the height of the second side magnet, a height of the flexible printed circuit board, and a spacing between the second side magnet and the flexible printed circuit board.

In an optional embodiment, the second side magnet includes a first surface and a second surface that are disposed opposite to each other, and the first surface faces the flexible printed circuit board. The first surface includes a first plane, a first inclined plane, and a second inclined plane. The first plane is parallel to the second surface. One end of the first inclined plane is connected to one end of the first plane, the other end of the first inclined plane extends in a direction toward the second surface, one end of the second inclined plane is connected to the other end of the first plane, and the other end of the second inclined plane extends in a direction toward the second surface.

In this embodiment, the second side magnet has a structure in which the middle is high and heights on two sides gradually decrease. A location in the middle that is high may directly face a part, with a small amplitude, of the flexible printed circuit board. A location on the two sides on which the heights gradually decrease may directly face a part, with a gradually increasing amplitude, of the flexible printed circuit board. Therefore, an abundant vibration space can be reserved for the flexible printed circuit board, and further, a non-interfering height can be fully utilized, and a magnet size can be increased, so that the electroacoustic transducer has higher magnetic induction strength. For example, a size of the second side magnet in the width direction of the electroacoustic transducer may range from 2 millimeters to 10 millimeters.

For example, the first plane directly faces the head end of the first stub and the head end of the second stub. Alternatively, the first plane may directly face another part, with a comparatively small amplitude, of the flexible printed circuit board, for example, the part that is of the connection section of the first stub and that is close to the head end, and the part that is of the connection section of the second stub and that is close to the head end. In this case, the second side magnet has a larger volume, and magnetic induction strength of the electroacoustic transducer can be improved.

For example, the second inclined plane and the first inclined plane may be symmetrically disposed, and the symmetrical planes are perpendicular to the second surface. Because the first stub and the second stub of the flexible printed circuit board are symmetrically disposed, and vibration amplitudes of the first stub and the second stub are symmetrical, the second inclined plane and the first inclined plane that are symmetrically disposed can better match vibration statuses of the first stub and the second stub.

In some embodiments, the first side magnet and the second side magnet are designed in a separated manner, and may be fixed to each other by bonding adjacent surfaces. Because the second side magnet and the first side magnet have different shapes on a YZ plane (that is, a plane on which the width direction and the thickness direction of the electroacoustic transducer are located), the second side magnet and the first side magnet are separately molded and then assembled to form an integrated structure, so that costs can be reduced, and costs of the electroacoustic transducer are lower.

In some other embodiments, the first side magnet and the second side magnet may be alternatively an integrated irregularly-shaped magnet.

In an optional embodiment, the second side magnet, the first side magnet, and the center magnet are arranged in a first direction. A size of the first side magnet in a second direction is a first width. The second direction is perpendicular to the first direction and the thickness direction of the center magnet. A size of the second side magnet in the second direction is a second width. The second width is less than the first width.

In this embodiment, a width of the second side magnet in the width direction of the electroacoustic transducer is comparatively small, and the second side magnet directly faces a part, with a small amplitude, of the flexible printed circuit board, for example, the head end of the first stub and the head end of the second stub. Spaces on two sides of the second side magnet in the width direction of the electroacoustic transducer may be used as vibration spaces for the flexible printed circuit board, and directly face a part, with a comparatively large amplitude, of the flexible printed circuit board, for example, the connection section of the first stub and the connection section of the second stub.

Alternatively, the second side magnet may directly face another part, with a comparatively small amplitude, of the flexible printed circuit board, for example, the part that is of the connection section of the first stub and that is close to the head end, and the part that is of the connection section of the second stub and that is close to the head end, to have a larger volume.

In some embodiments, when vibration space requirements of the first stub and the second stub are met, the second width of the second side magnet may be appropriately increased, or a height of the second side magnet may be reduced and the second width of the second side magnet may be greatly increased (in this case, the second width may be greater than or equal to the first width of the first side magnet), so that the second side magnet has a larger volume.

In an optional embodiment, the first surface of the second side magnet is parallel to the second surface. The first surface directly faces the head end of the first stub of the flexible printed circuit board and the head end of the second stub of the flexible printed circuit board. The second side magnet further includes a first side face and a second side face. The first side face connects one end of the first surface to one end of the second surface. The second side face connects the other end of the first surface to the other end of the second surface. The first side face directly faces the connection section of the first stub. The second side face directly faces the connection section of the second stub.

In this embodiment, the second side magnet fully utilizes a space under the flexible printed circuit board, so that the electroacoustic transducer has higher magnetic induction strength.

In an optional embodiment, the first side magnet and the second side magnet are integrated, thereby helping simplify an assembly process of the electroacoustic transducer and improve assembly precision.

In an embodiment, the second side magnet, the first side magnet, and the center magnet are arranged in a first direction. A cross-sectional shape of the first side magnet is the same as a cross-sectional shape of the second side magnet. A cross section of the first side magnet and a cross section of the second side magnet are both perpendicular to the first direction. In this case, the cross section of the second side magnet may be in an irregular shape, to have a comparatively large area while a vibration space is reserved for the flexible printed circuit board, so that volumes of the second side magnet and the first side magnet are comparatively large.

In another embodiment, the second side magnet, the first side magnet, and the center magnet are arranged in a first direction. In a thickness direction of the center magnet, a height of the first side magnet is the same as a height of the second side magnet. A size of the first side magnet in a second direction is a first width. The second direction is perpendicular to the first direction and the thickness direction of the center magnet. A size of the second side magnet in the second direction is a second width. The second width is less than the first width. In this case, shapes of the second side magnet and the first side magnet may be comparatively regular cuboids, to reduce processing difficulty and costs.

In an optional embodiment, the second side magnet includes a first magnetic part and a second magnetic part. The first magnetic part is located between the second magnetic part and the first side magnet. The second magnetic part is disposed directly opposite to the body of the flexible printed circuit board. The first magnetic part is disposed directly opposite to the head end of the first stub of the flexible printed circuit board and the head end of the second stub of the flexible printed circuit board. Alternatively, the first magnetic part may be disposed directly opposite to the part that is of the connection section of the first stub and that is close to the head end, and the part that is of the connection section of the second stub and that is close to the head end.

A length of the first magnetic part in the length direction of the electroacoustic transducer is less than that of the second side magnet in the foregoing embodiment. For other structures and parameter designs of the first magnetic part, refer to the second side magnet in the foregoing embodiment.

In the thickness direction of the electroacoustic transducer, a height of the second magnetic part is greater than a height of the first magnetic part, and the height of the second magnetic part is less than the height of the first side magnet. For example, in the electroacoustic transducer, a top face of the second magnetic part may be in contact with the body of the flexible printed circuit board, to fully utilize a space under the flexible printed circuit board.

The first magnetic part and the second magnetic part may be integrated, or may be assembled (for example, bonded) to form an integrated structure.

In an optional embodiment, the flexible printed circuit board includes a body, a first stub, and a second stub. The body is fixedly connected to the second face of the frame. A head end of the first stub and a head end of the second stub are respectively connected to two end parts of the body. A tail end of the first stub is fixedly connected to a corner of the voice coil, and a tail end of the second stub is fixedly connected to another corner of the voice coil.

In this embodiment, because the first stub and the second stub of the flexible printed circuit board are connected to the two end parts of the body, a space on an inner side of a middle part of the body is released. Compared with the foregoing embodiments, in this embodiment, in the length direction of the electroacoustic transducer, a length of the second side magnet is reduced, and a length of the first side magnet is increased, so that the magnetic circuit has higher magnetic induction strength. For example, in the length direction of the electroacoustic transducer, the length of the first side magnet may be greater than the length of the second side magnet.

In an optional embodiment, in a thickness direction of the center magnet, a height of the first side magnet is greater than a height of the second side magnet. The thickness direction of the center magnet is parallel to the thickness direction of the electroacoustic transducer.

In this embodiment, because the first side magnet and the flexible printed circuit board are not stacked in the thickness direction of the electroacoustic transducer, the height of the first side magnet may be greater than the height of the second side magnet, to fully utilize a space and improve magnetic induction strength of the magnetic circuit, so that the electroacoustic transducer has comparatively high sensitivity.

For example, the first side magnet is in a cuboid shape, and the second side magnet is in a cuboid shape. In the thickness direction of the electroacoustic transducer, the height of the first side magnet may be greater than the height of the second side magnet. In the width direction of the electroacoustic transducer, a width of the second side magnet may be greater than a width of the first side magnet.

In an optional embodiment, the basin stand further includes a plurality of legs. The plurality of legs are fixed to the second face of the frame at intervals. The electroacoustic transducer further includes a lower electrode plate. The lower electrode plate is fixedly connected to the plurality of legs and is spaced from the frame. The center magnet, the two first side magnets, and the two second side magnets are all fixed to a side, facing the frame, of the lower electrode plate.

In this embodiment, the electroacoustic transducer is supported between the frame and the lower electrode plate by the plurality of legs, and the plurality of legs can play a supporting and connecting role while occupying a quite small space between the frame and the lower electrode plate, so that a comparatively large magnetic circuit arrangement space is formed between the frame and the lower electrode plate, and the space can be fully utilized for the magnetic circuit to arrange magnets, thereby achieving comparatively high magnetic induction strength and comparatively high sensitivity of the electroacoustic transducer.

In addition, the lower electrode plate can not only serve as a magnetic conductive piece to seal a magnetic field to reduce adverse impact of the magnetic field of the electroacoustic transducer on a surrounding environment, but also serve as a carrier to fix the center magnet, the two first side magnets, and the two second side magnets, so that a relative location relationship between the plurality of magnets is stable and reliable, and the electroacoustic transducer has comparatively high reliability.

In an optional embodiment, the electroacoustic transducer further includes a center electrode plate and a side electrode plate. The center electrode plate is fixed to a side, away from the lower electrode plate, of the center magnet. The side electrode plate is fixed to the inner side of the frame, and is spaced from the flexible printed circuit board. The side electrode plate includes a first electrode plate part. The first electrode plate part is disposed directly opposite to the first side magnet and the second side magnet. A second gap is formed between the first electrode plate part and the center electrode plate. The second gap is connected to the first gap. The voice coil is partially located in the second gap.

For example, the body of the flexible printed circuit board and the side electrode plate may be stacked at intervals in the thickness direction of the electroacoustic transducer, and the body of the flexible printed circuit board and the side electrode plate that are fixed to the basin stand are separated by some structures of the basin stand. For example, a fixing groove is formed on the inner side of the frame, and the fixing groove is provided around the space on the inner side of the frame. An opening of the fixing groove is located on an inner side face of the frame, and the fixing groove is concave in a direction toward an outer side face. A connection frame part of the side electrode plate may be clamped into the fixing groove of the frame. The connection frame part is partially located in the fixing groove and partially located outside the fixing groove. The first electrode plate part and a second electrode plate part of the side electrode plate are located outside the fixing groove.

In some embodiments, the first electrode plate part is roughly in a T shape, the first electrode plate part includes a first part and a second part, and the second part connects the first part to the connection frame part. Avoidance gaps are formed on two sides of the second part of the first electrode plate part, and the avoidance gaps are located between the first part of the first electrode plate part and the connection frame part. Four corners on an inner side of the connection frame part form corner gaps. The corner gaps connect adjacent avoidance gaps.

The first part of the first electrode plate part is disposed directly opposite to the first side magnet. The second part of the first electrode plate part is disposed directly opposite to the second side magnet. A straight-side part, connected to the second part of the first electrode plate part, of the connection frame part of the side electrode plate is disposed directly opposite to the second side magnet. The first part of the first electrode plate part may be fixed to the first side magnet through bonding. A gap is formed between the second side magnet, and the second part of the first electrode plate part and the connection frame part. A second gap is formed between the first electrode plate part and the center electrode plate. The second gap is connected to the first gap.

The head end of the first stub of the flexible printed circuit board directly faces the second part of the first electrode plate part of the side electrode plate. The head end of the first stub and the second part of the first electrode plate part are spaced from each other in the thickness direction of the electroacoustic transducer. The connection section and the tail end of the first stub directly face an avoidance gap and a corner gap on one side of the second part of the first electrode plate part. When the first stub vibrates under driving by the voice coil, an amplitude of the first stub gradually decreases from the tail end to the head end, and an amplitude of the head end of the first stub is quite small, or the head end does not vibrate. Therefore, the first stub can fully utilize the gaps of the side electrode plate for vibration. In addition, the first stub does not collide with the side electrode plate during vibration, thereby helping improve reliability of the electroacoustic transducer.

The head end of the second stub of the flexible printed circuit board directly faces the second part of the first electrode plate part of the side electrode plate. The head end of the second stub and the second part of the first electrode plate part are spaced from each other in the thickness direction of the electroacoustic transducer. The connection section and the tail end of the second stub directly face an avoidance gap and a corner gap on the other side of the second part of the first electrode plate part. When the second stub vibrates under driving by the voice coil, an amplitude of the second stub gradually decreases from the tail end to the head end, and an amplitude of the head end of the second stub is quite small, or the head end does not vibrate. Therefore, the second stub can fully utilize the gaps of the side electrode plate for vibration. In addition, the second stub does not collide with the side electrode plate during vibration, thereby helping improve reliability of the electroacoustic transducer.

In an optional embodiment, the electroacoustic transducer further includes two third side magnets. The two third side magnets are fixed to a side, facing the frame, of the lower electrode plate, and are symmetrically arranged on the other two sides of the center magnet. A third gap is formed between the third side magnet and the center magnet. The side electrode plate further includes a second electrode plate part. The second electrode plate part directly faces the third side magnet. A fourth gap is formed between the second electrode plate part and the center electrode plate. The fourth gap is connected to the third gap. The voice coil is partially located in the fourth gap and partially located in the third gap.

In some embodiments, the third side magnet is spaced from the flexible printed circuit board. For example, each of two ends of the third side magnet is close to a tail end of a stub of the flexible printed circuit board. An end face of each of the two ends of the third side magnet is partially concave to form an avoidance region. The avoidance region is connected to the third gap. The tail end of the stub of the flexible printed circuit board is partially located in the avoidance region, and forms a gap with a wall surface of the avoidance region.

In some embodiments, a straight-side part, connected to the second electrode plate part, of the connection frame part of the side electrode plate is disposed directly opposite to the third side magnet. In this case, the third side magnet fully utilizes a space between the side electrode plate and the lower electrode plate, to have a larger size in the width direction of the electroacoustic transducer, so that the magnetic circuit has higher magnetic induction strength.

In an optional embodiment, the electroacoustic transducer further includes a connection frame. The connection frame is located between the voice coil and the voice diaphragm. One end of the connection frame is fixedly connected to the voice coil, and the other end of the connection frame is fixedly connected to the voice diaphragm.

In this embodiment, the connection frame separates the voice coil from the voice diaphragm, so that the voice diaphragm is away from the voice coil. In addition, the connection frame may perform heat dissipation for the voice coil, thereby reducing a risk of damaging the voice diaphragm due to overheating of the voice coil. In addition, the voice coil is connected to the voice diaphragm through the connection frame. Therefore, a spacing between the voice diaphragm and an end part, away from the voice diaphragm, of the voice coil is comparatively large, so that the voice coil can be fully inserted in the magnetic circuit, and a magnetic field generated by the magnetic circuit effectively acts on the voice coil. In addition, a spacing between the voice diaphragm and the magnetic circuit is comparatively large, and a vibration space for the voice diaphragm is comparatively large, thereby helping the voice diaphragm implement large-amplitude vibration.

For example, a cross-sectional shape of the connection frame is roughly a Z shape, and an extension track of the connection frame is in a rounded rectangular shape. The connection frame includes a main part, an outer extension part, and an inner extension part. The outer extension part is connected to a bottom face of the main part and extends toward an outer side of the main part. An area of a bottom face of the outer extension part is larger than an area of the bottom face of the main part, to increase a connection area between the connection frame and other components. The inner extension part is connected to a top face of the main part and extends toward an inner side of the main part. An area of a top face of the inner extension part is greater than an area of the top face of the main part, to increase a connection area between the connection frame and other components.

In this embodiment, end faces of two ends of the connection frame (that is, the bottom face of the outer extension part and the top face of the inner extension part) have comparatively large areas, so that a connection area between the connection frame and an external structure is comparatively large, and a connection relationship is more stable. The connection frame may be integrated.

In some other embodiments, the cross-sectional shape of the connection frame may be alternatively a vertical bar shape, an L shape, an inverted L shape, a T shape, an inverted T shape, a “匚” shape, or the like.

According to a second aspect, an embodiment of this application further provides a speaker module. The speaker module includes an upper module housing and the electroacoustic transducer according to any one of the foregoing implementations. The electroacoustic transducer serves as a speaker core of the speaker module. The electroacoustic transducer is fixedly connected to the upper module housing, and a front speaker box is formed between a voice diaphragm and the upper module housing. The upper module housing is provided with a sound outlet hole. The sound outlet hole connects the front speaker box to an outer side of the speaker module.

In this embodiment, the electroacoustic transducer has comparatively high magnetic field strength and comparatively high sensitivity, so that the speaker module has a larger sound volume, to have a wider application scope.

In an optional embodiment, the speaker module further includes a lower module housing. The lower module housing is fixed to the upper module housing. The electroacoustic transducer is located inside the lower module housing and the upper module housing. A rear speaker box is formed on a side, away from the front speaker box, of the voice diaphragm. The lower module housing is provided with a leakage hole. The leakage hole connects the rear speaker box to the outer side of the speaker module.

In this embodiment, the speaker module forms a modular structure through sealing by the lower module housing and the upper module housing. The lower module housing and the upper module housing can not only fully protect the electroacoustic transducer located inside the lower module housing and the upper module housing, but also help simplify an assembly structure for the speaker module and other components.

The speaker module further includes a buffer piece. The buffer piece is fixed between the lower module housing and the electroacoustic transducer, so that the electroacoustic transducer is firmly connected to the upper module housing, thereby avoiding a risk of shaking of the electroacoustic transducer, and improving reliability of the speaker module.

According to a third aspect, an embodiment of this application further provides an electronic device. The electronic device includes a housing and the speaker module according to any one of the foregoing implementations. The speaker module is accommodated in the housing. The housing is provided with a speaker hole. The speaker hole connects a sound outlet hole to an outer side of the electronic device.

In this embodiment, the speaker module can produce a comparatively large sound volume, so that sound play performance of the electronic device is better, thereby helping improve user experience.

According to a fourth aspect, an embodiment of this application further provides an electronic device. The electronic device includes a housing, a display module, and a receiver. The display module includes a cover plate and a display panel. The cover plate is fixed to the housing. The display panel is fixed to an inner surface, facing the housing, of the cover plate. The receiver is accommodated in the housing, and the receiver is the electroacoustic transducer according to any one of the foregoing implementations. The cover plate is provided with a receiver hole, or a receiver hole is formed between an edge of the cover plate and the housing, or the housing is provided with a receiver hole. Sound output by the receiver is transmitted to an outer side of the electronic device through the receiver hole.

In this embodiment, the electroacoustic transducer has comparatively high magnetic field strength and comparatively high sensitivity. Therefore, an earpiece using the electroacoustic transducer can produce a comparatively large sound volume, so that sound play performance of the electronic device is better, thereby helping improve user experience.

DETAILED DESCRIPTION OF ILLUSTRATIVE EMBODIMENTS

The following describes the embodiments of this application with reference to the accompanying drawings in the embodiments of this application.

An embodiment of this application provides an electroacoustic transducer. The electroacoustic transducer is configured to convert an electrical signal into a sound signal. In the electroacoustic transducer, structures of a magnetic circuit assembly and a flexible printed circuit board are optimized to ensure a driving force for the magnetic circuit assembly, so that the electroacoustic transducer has comparatively high sensitivity. An embodiment of this application further provides an electronic device including the electroacoustic transducer. The electronic device may be a product with a sound play function, for example, a mobile phone, a tablet computer, a notebook computer, a wearable device, or a personal stereo. The wearable device may be a smart band, a smart watch, a smart head-mounted display, smart glasses, or the like. For example, the electroacoustic transducer may be used for the electronic device as a speaker core of a speaker module (also referred to as a loudspeaker), or may be used for the electronic device as a receiver (also referred to as an earpiece).

Figure 1:
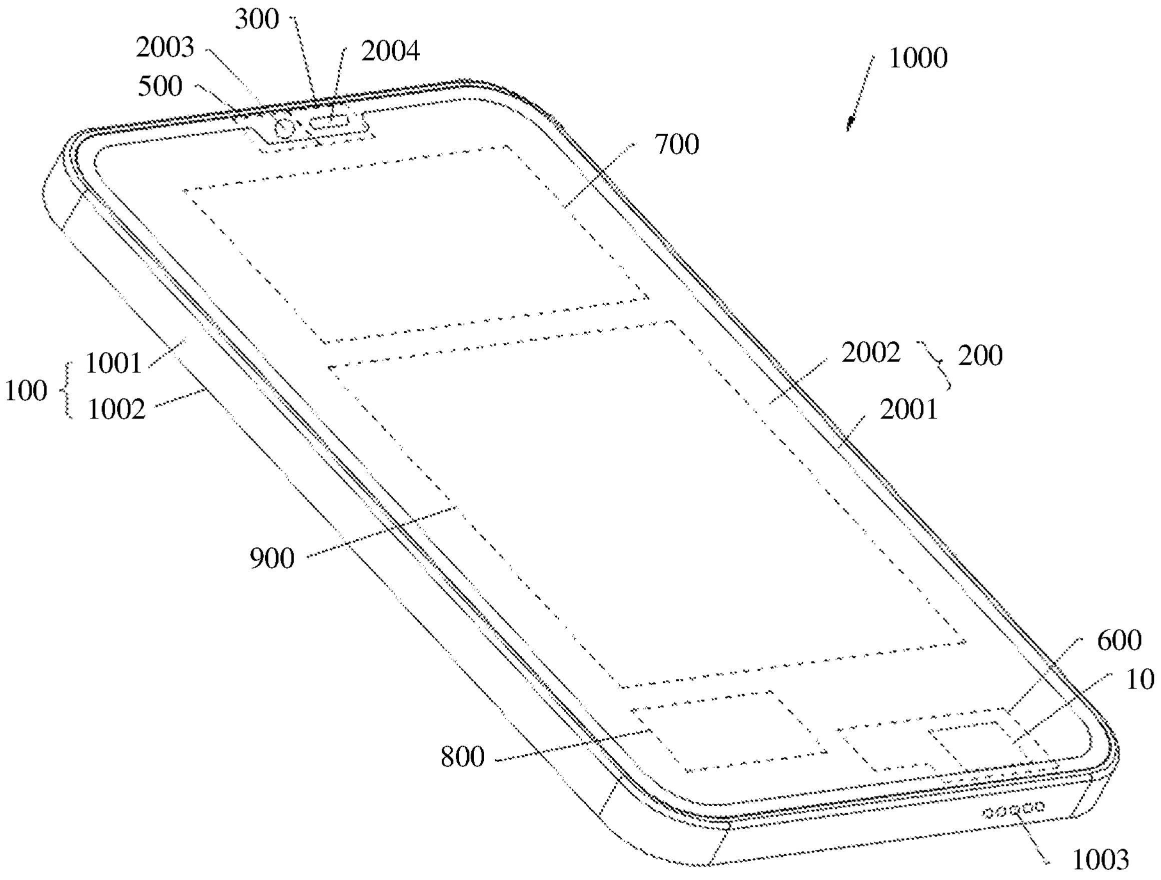
FIG. 1 is a schematic structural diagram of an electronic device according to an embodiment of this application.

FIG. 1 is a schematic structural diagram of an electronic device 1000 according to an embodiment of this application. The electronic device 1000 shown in FIG. 1 is described by using a mobile phone as an example.

The electronic device 1000 includes a housing 100, a display module 200, a receiver 300, a camera module 500, a speaker module 600, a first circuit board 700, a second circuit board 800, and a battery 900.

The housing 100 includes a frame 1001 and a back housing 1002. The frame 1001 is connected to a periphery of the back housing 1002. The frame 1001 and the back housing 1002 may be of an integrated structure, or may be assembled to form an integrated structure. The housing 100 is provided with a speaker hole 1003. There may be one or more speaker holes 1003. For example, there are a plurality of speaker holes 1003, and the plurality of speaker holes 1003 are provided on the frame 1001. The speaker hole 1003 connects an inner side of the electronic device 1000 to an outer side of the electronic device 1000.

The display module 200 includes a cover plate 2001 and a display panel 2002. The cover plate 2001 is fixed to the housing 100. For example, the cover plate 2001 is fixed to a side, away from the back housing 1002, of the frame 1001. The display panel 2002 is fixed to an inner surface, facing the back housing 1002, of the cover plate 2001. The cover plate 2001 is configured to protect the display panel 2002. The display panel 2002 is configured to display an image, and the display panel 2002 may be further integrated with a touch function. The cover plate 2001 is provided with a light transmission part 2003 and a receiver hole 2004. The light transmission part 2003 is a region allowing light to pass. For example, an ink layer of the cover plate 2001 is hollowed out in the light transmission part 2003. The receiver hole 2004 is a through-hole penetrating the cover plate 2001. A projection of the display panel 2002 on the cover plate 2001, the light transmission part 2003, and the receiver hole 2004 are staggered.

In some other embodiments, a receiver hole is formed between an edge of the cover plate 2001 and the housing 100. For example, a receiver hole is formed between an edge, at the top of the electronic device 1000, of the cover plate 2001 and an edge, at the top of the electronic device 1000, of the frame 1001 of the housing 100. In some other embodiments, the housing 100 is provided with a receiver hole. For example, a receiver hole is formed in a region, at the top of the electronic device 1000, of the frame 1001 of the housing 100. A specific formation structure and location of the receiver hole are not strictly limited in this application.

The receiver 300 is accommodated in the housing 100. The receiver 300 is located between the display module 200 and the back housing 1002. Sound output by the receiver 300 is transmitted to the outer side of the electronic device 1000 through the receiver hole 2004, to implement a sound play function of the electronic device 1000. For example, the receiver 300 may be an electroacoustic transducer described in the following embodiments. In another embodiment, the receiver 300 may be alternatively an electroacoustic transducer with another structure.

The camera module 500 is accommodated in the housing 100. The camera module 500 is located between the display module 200 and the back housing 1002. The camera module 500 collects light through the light transmission part 2003 of the cover plate 2001, to perform photographing. The electronic device 1000 may further include another camera module accommodated in the housing 100. A photographing through-hole may be provided on the back housing 1002. The another camera module may collect light through the photographing through-hole, to perform photographing.

The speaker module 600 is accommodated in the housing 100. The speaker module 600 is located between the display module 200 and the back housing 1002. Sound output by the speaker module 600 can be transmitted to the outer side of the electronic device 1000 through the speaker hole 1003, to implement the sound play function of the electronic device 1000. The speaker module 600 includes a speaker core. The speaker core may be the electroacoustic transducer described in the following embodiments. In another embodiment, the speaker core may be alternatively an electroacoustic transducer with another structure.

The first circuit board 700, the second circuit board 800, and the battery 900 are all accommodated in the housing 100. The first circuit board 700 and the second circuit board 800 are respectively located on two sides of the battery 900. For example, the first circuit board 700 is located at the top of the electronic device 1000, the battery 900 is located in the middle of the electronic device 1000, and the second circuit board 800 is located at the bottom of the electronic device 1000. A plurality of devices may be fixed to the first circuit board 700 and the second circuit board 800. The devices include but are not limited to a processor, a memory, and the like. Functional modules of the electronic device 1000, for example, the display module 200, the camera module 500, the speaker module 600, and the receiver 300, are coupled to the processor. Specific devices fixed to the first circuit board 700 and the second circuit board 800 are not strictly limited in this application. The first circuit board 700 and the second circuit board 800 may be connected by using a wire such as a flexible printed circuit board or a coaxial line, to implement an electrical connection between the first circuit board 700 and the second circuit board 800. The battery 900 is configured to supply power to the electronic device 1000. In another embodiment, the first circuit board 700 or the second circuit board 800 may be alternatively omitted from the electronic device 1000, and a device that needs to be fixed to a circuit board may be fixed to a retained circuit board.

Figure 2:
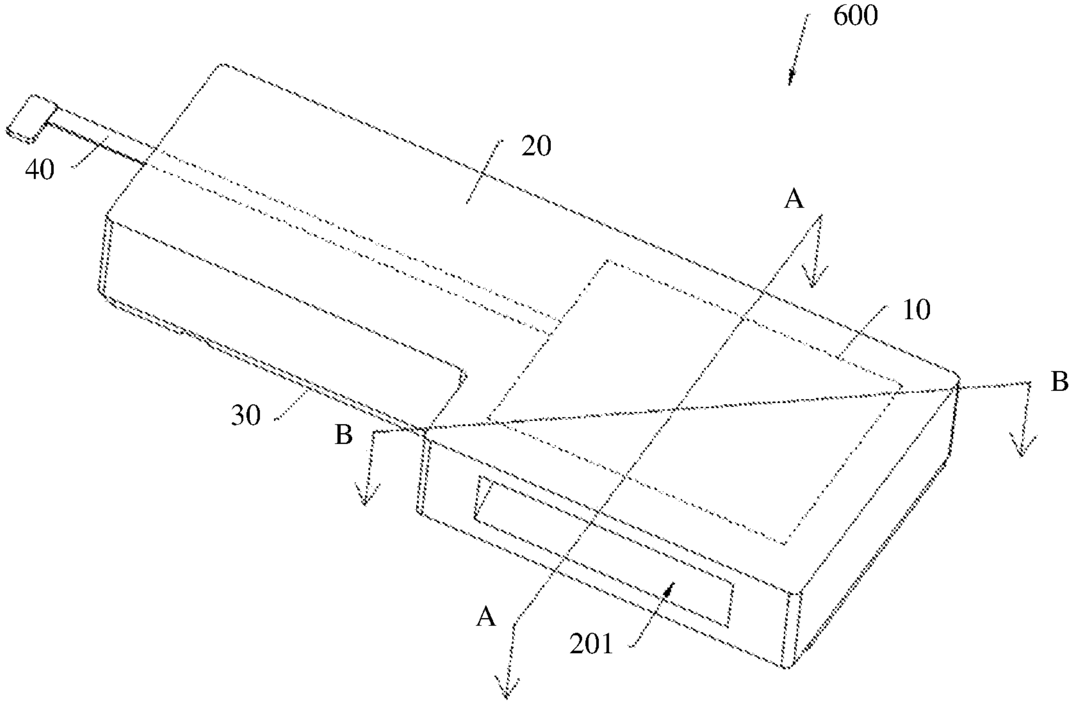
FIG. 2 is a schematic structural diagram of a speaker module of an electronic device shown in FIG. 1.

FIG. 2 is a schematic structural diagram of the speaker module 600 of the electronic device 1000 shown in FIG. 1.

The speaker module 600 includes an electroacoustic transducer 10, an upper module housing 20, a lower module housing 30, and a circuit board 40. The upper module housing 20 and the lower module housing 30 are fixed to each other to form a sound box. The electroacoustic transducer 10 is located inside the sound box. One end of the circuit board 40 is located inside the sound box, to connect to the electroacoustic transducer 10. The other end of the circuit board 40 is located outside the sound box, to electrically connect the electroacoustic transducer 10 to an external device of the speaker module 600. For example, the end of the circuit board 40 that is located outside the sound box may be fixed and electrically connected to the second circuit board 800.

The upper module housing 20 is provided with a sound outlet hole 201, and the sound outlet hole 201 connects an inner side of the sound box to an outer side of the sound box. Sound output by the electroacoustic transducer 10 can be transmitted to the outer side of the sound box through the sound outlet hole 201. Referring to both FIG. 1 and FIG. 2, the speaker hole 1003 of the housing 100 connects the sound outlet hole 201 of the electroacoustic transducer 10 to the outer side of the electronic device 1000. The sound output by the electroacoustic transducer 10 can be transmitted to the outer side of the electronic device 1000 through the sound outlet hole 201 and the speaker hole 1003.

Figure 3:
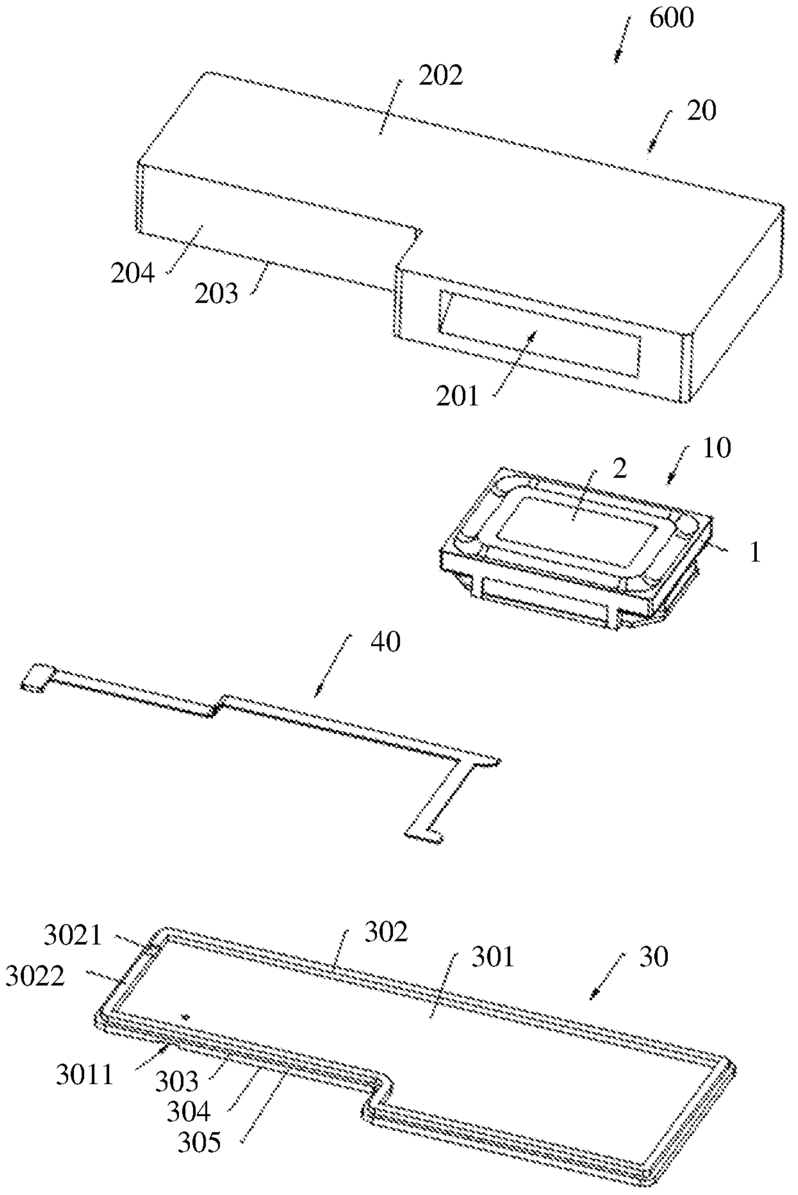
FIG. 3 is a schematic exploded view of a speaker module shown in FIG. 2.
Figure 4:
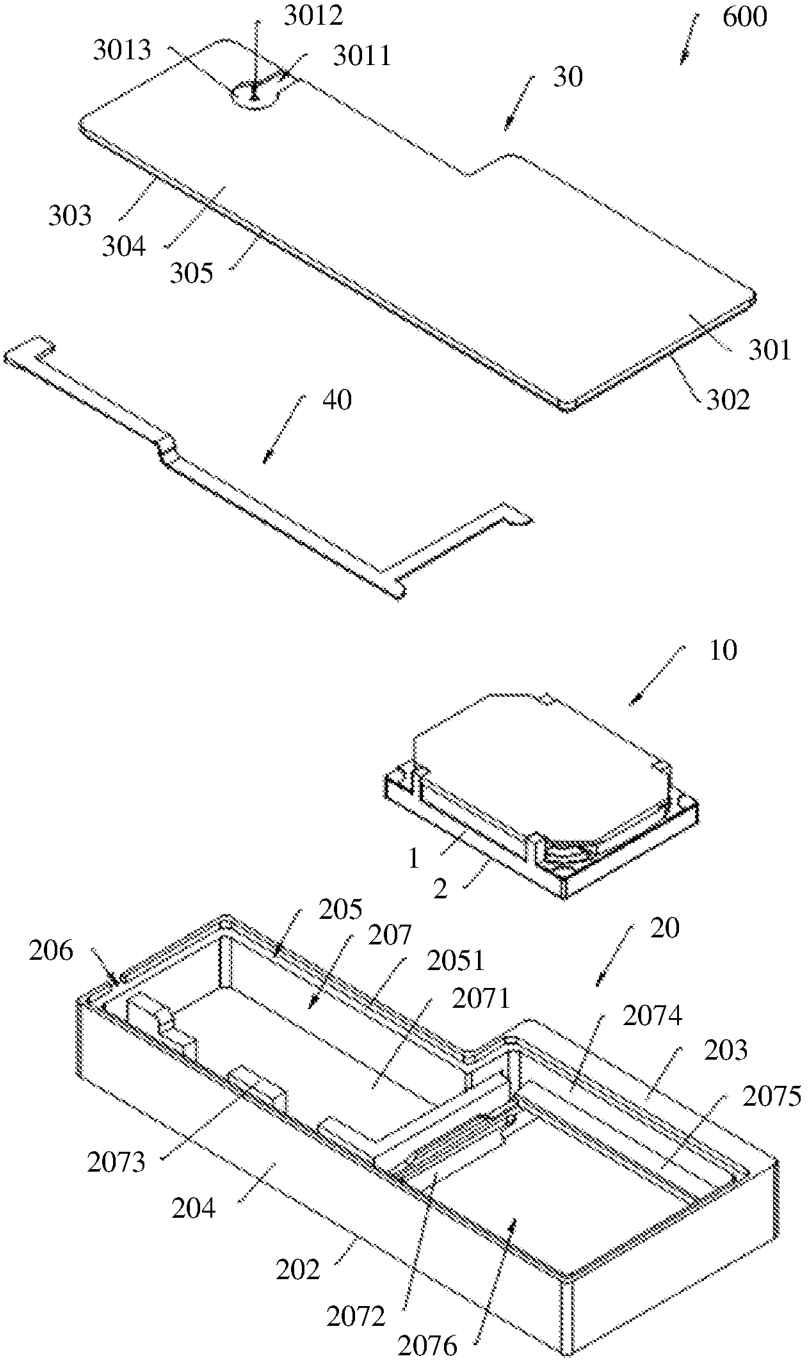
FIG. 4 is a schematic structural diagram of a speaker module shown in FIG. 3 from another angle.

Refer to both FIG. 3 and FIG. 4. FIG. 3 is a schematic exploded view of the speaker module 600 shown in FIG. 2, and FIG. 4 is a schematic structural diagram of the speaker module 600 shown in FIG. 3 from another angle.

The upper module housing 20 includes a top face 202 and a bottom face 203 that are disposed opposite to each other, and a peripheral side face 204 connected between the top face 202 and the bottom face 203. An opening of the sound outlet hole 201 is provided on the peripheral side face 204 of the upper module housing 20. The upper module housing 20 further includes a positioning groove 205, a first notch 206, and an accommodation groove 207. An opening of the positioning groove 205 is provided on the bottom face 203 of the upper module housing 20. The first notch 206 penetrates a side wall of the positioning groove 205 until the peripheral side face 204 of the upper module housing 20, and extends to the bottom face 203 of the upper module housing 20. An opening of the accommodation groove 207 is provided on a bottom wall 2051 of the positioning groove 205. A first protrusion 2072 and a second protrusion 2073 protrude from a bottom wall 2071 of the accommodation groove 207. The first protrusion 2072 may be arranged roughly in a U shape to form an enclosed region 2076, and the enclosed region 2076 is connected to the sound outlet hole 201. A third protrusion 2075 protrudes from a side wall 2074 of the accommodation groove 207, and the third protrusion 2075 is connected to two ends of the first protrusion 2072. The second protrusion 2073 may include a continuous unbroken protrusion strip, or may include a plurality of broken protrusion strips. One end of the second protrusion 2073 is disposed close to the first protrusion 2072, and the other end is disposed close to the first notch 206. It can be understood that orientation terms such as "top" and "bottom" used for the speaker module 600 in this embodiment of this application are mainly intended for description based on a display orientation of the speaker module 600 in FIG. 3, and do not limit an orientation of the speaker module 600 in an actual application scenario.

The electroacoustic transducer 10 includes a basin stand 1 and a voice diaphragm 2 fixed to the basin stand 1. The electroacoustic transducer 10 outputs sound through vibration of the voice diaphragm 2. The circuit board 40 may be a flexible printed circuit board. One end of the circuit board 40 includes two branches, and connection ends can be formed at tail ends of the two branches.

The lower module housing 30 includes a substrate 301 and a limiting protrusion strip 302. The substrate 301 includes a top face 303 and a bottom face 304 that are disposed opposite to each other, and a peripheral side face 305 connected between the top face 303 and the bottom face 304. The limiting protrusion strip 302 is fixed to the top face 303 of the substrate 301, and is disposed around a periphery of the top face 303 of the substrate 301. A second notch 3021 may be provided on the limiting protrusion strip 302. The second notch 3021 is concave in a direction from a top face 3022 of the limiting protrusion strip 302 toward the top face 303 of the substrate 301, and connects a space on an inner side of the limiting protrusion strip 302 to a space on an outer side of the limiting protrusion strip 302. After the lower module housing 30 and the upper module housing 20 are assembled, the second notch 3021 directly faces the first notch 206, to form a notch with a comparatively large diameter. In some other embodiments, the second notch 3021 may be alternatively omitted from the lower module housing 30.

The substrate 301 is provided with a connection groove 3011 and a leakage hole 3012. An opening of the connection groove 3011 is provided on the bottom face 304 of the substrate 301, and extends to the peripheral side face 305 of the substrate 301. Openings at two ends of the leakage hole 3012 are respectively provided on a bottom wall 3013 of the connection groove 3011 and the top face 303 of the substrate 301. The leakage hole 3012 connects a space at the top of the substrate 301, spaces at the bottom of the connection groove 3011 and the substrate 301, and a peripheral space of the substrate 301. In some other embodiments, the leakage hole 3012 of the substrate 301 penetrates the bottom face 304 of the substrate 301 until the top face 303 of the substrate 301, and the substrate 301 is not provided with the connection groove 3011.

Figure 5:
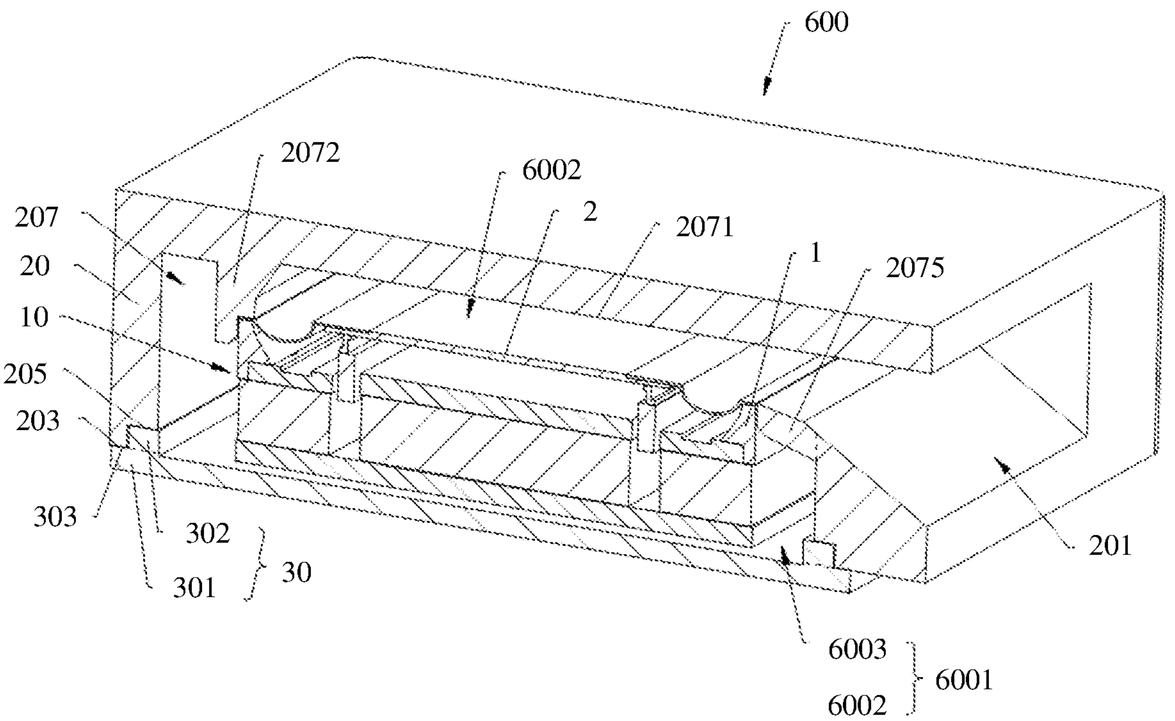
FIG. 5 is a schematic structural diagram of a speaker module shown in FIG. 2 that is cut along A-A.
Figure 6:
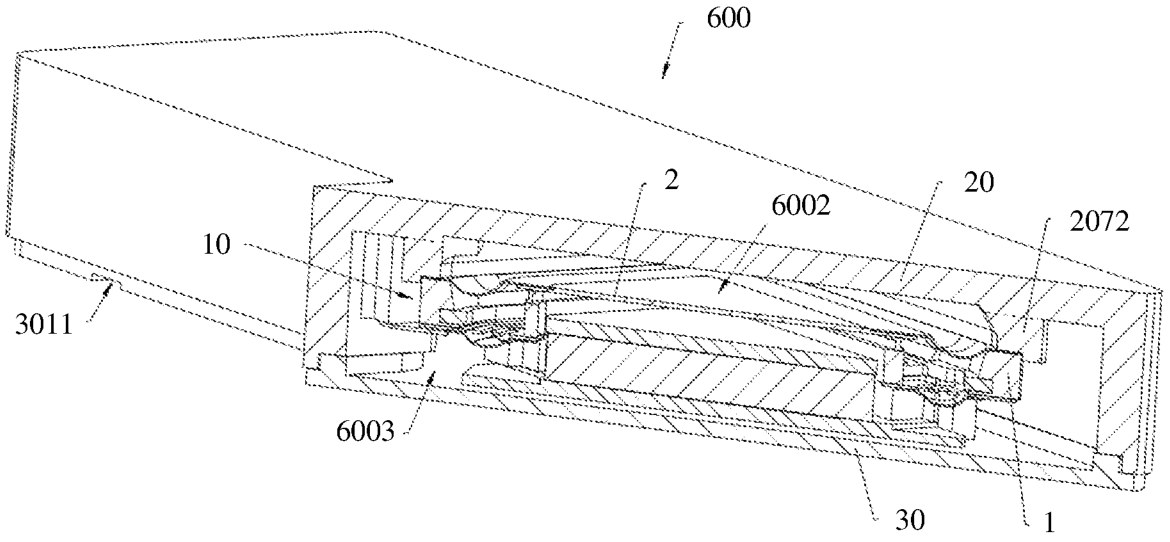
FIG. 6 is a schematic structural diagram of a speaker module shown in FIG. 2 that is cut along B-B.

Refer to both FIG. 5 and FIG. 6. FIG. 5 is a schematic structural diagram of the speaker module 600 shown in FIG. 2 that is cut along A-A, and FIG. 6 is a schematic structural diagram of the speaker module 600 shown in FIG. 2 that is cut along B-B. In the accompanying drawings of this application, "cutting along A-A" means cutting along a plane on which a line A-A and arrows at two ends of the line A-A are located, and "cutting along B-B" means cutting along a plane on which a line B-B and arrows at two ends of the line B-B are located. The following descriptions of the accompanying drawings are understood in the same way.

The lower module housing 30 is buckled to the upper module housing 20. The top face 303 of the substrate 301 of the lower module housing 30 is in contact with the bottom face 203 of the upper module housing 20. The limiting protrusion strip 302 of the lower module housing 30 is clamped into the positioning groove 205 of the upper module housing 20, and a concave-convex fit structure is formed between the limiting protrusion strip 302 and the positioning groove 205, so that the lower module housing 30 and the upper module housing 20 are fixed to each other. The lower module housing 30 and the upper module housing 20 jointly encircle a speaker box space 6001.

The electroacoustic transducer 10 is accommodated in the speaker box space 6001. To be specific, the electroacoustic transducer 10 is located inside the lower module housing 30 and the upper module housing 20. The upper module housing 20 is fixedly connected to the basin stand 1 of the electroacoustic transducer 10. The basin stand 1 is partially clamped into the enclosed region 2076 (as shown in FIG. 4), and the first protrusion 2072 and the third protrusion 2075 continuously abut against a periphery of the basin stand 1. The voice diaphragm 2 of the electroacoustic transducer 10 is located in the enclosed region 2076. The voice diaphragm 2 divides the speaker box space 6001 into a front speaker box 6002 and a rear speaker box 6003. The front speaker box 6002 is formed between the upper module housing 20 and the voice diaphragm 2. To be specific, the bottom wall 2071 of the accommodation groove 207 of the upper module housing 20, the first protrusion 2072, the voice diaphragm 2, and the third protrusion 2075 jointly encircle the front speaker box 6002. The sound outlet hole 201 connects the front speaker box 6002 to an outer side of the speaker module 600. The rear speaker box 6003 is located on a side, away from the front speaker box 6002, of the voice diaphragm 2. The rear speaker box 6003 is connected to the outer side of the speaker module 600 through the leakage hole 3012 and the connection groove 3011.

Figure 7:
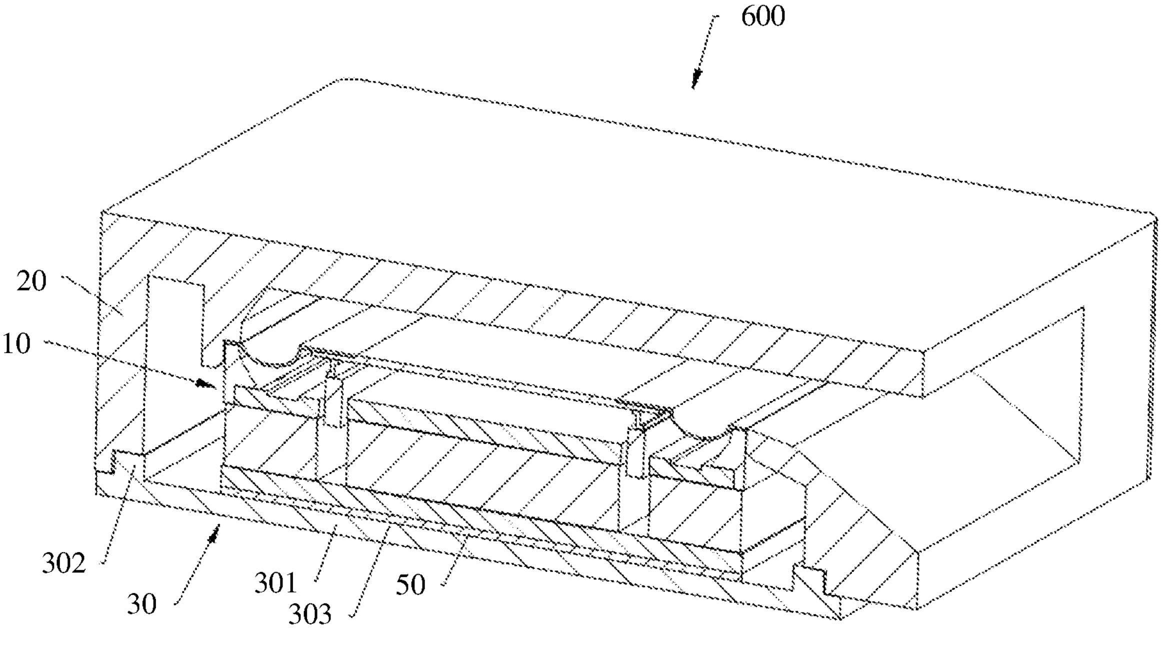
FIG. 7 is a schematic structural diagram of a speaker module shown in FIG. 2 that is cut along A-A according to another embodiment.

FIG. 7 is a schematic structural diagram of the speaker module 600 shown in FIG. 2 that is cut along A-A according to another embodiment.

The speaker module boo may further include a buffer piece 50. The buffer piece 50 is fixed to the top face 303 of the substrate 301 of the lower module housing 30. The buffer piece 50 is located on the inner side of the limiting protrusion strip 302. A side, away from the substrate 301, of the buffer piece 50 abuts against the electroacoustic transducer 10, so that the electroacoustic transducer 10 is firmly connected to the upper module housing 20, thereby avoiding a risk of shaking of the electroacoustic transducer 10, and improving reliability of the speaker module 600.

Figure 8:
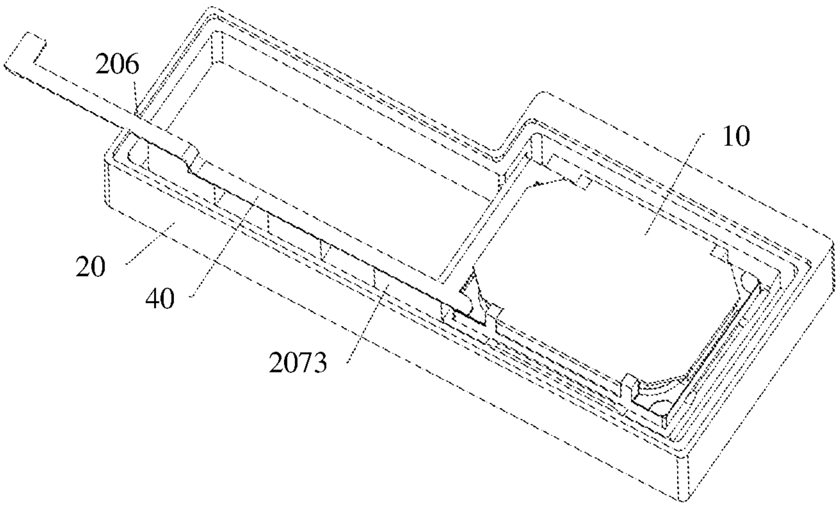
FIG. 8 is a partial schematic structural diagram of a speaker module shown in FIG. 2.

FIG. 8 is a partial schematic structural diagram of the speaker module 600 shown in FIG. 2.

One end of the circuit board 40 is located inside the upper module housing 20, and the other end extends out of the upper module housing 20 through the first notch 206. A part of the circuit board 40 that is located inside the upper module housing 20 is disposed on the second protrusion 2073. For example, the part of the circuit board 40 that is located inside the upper module housing 20 is fixedly connected (for example, bonded) to an end face of the second protrusion 2073. In this case, the circuit board 40 is firmly fixed to the upper module housing 20, so that a risk of damage due to shaking can be reduced. End parts of the two branches of the circuit board 40 are respectively fixed to two corners of the electroacoustic transducer 10, to electrically connect to the electroacoustic transducer 10.

It can be understood that structures and shapes of the upper module housing 20, the lower module housing 30, and the circuit board 40 of the speaker module 600 may be alternatively designed into other solutions according to actual requirements (for example, a requirement for a mounting environment and a requirement for a use scenario) of the speaker module 600.

Figure 9:
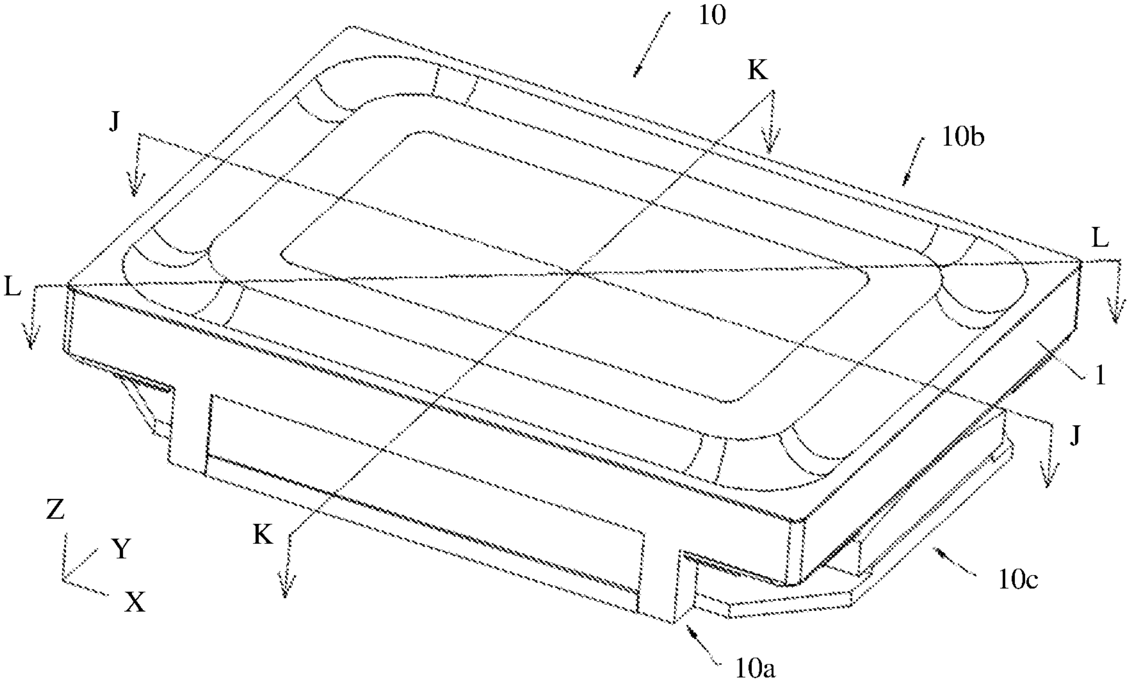
FIG. 9 is a structural diagram of an electroacoustic transducer shown in FIG. 3.
Figure 10:
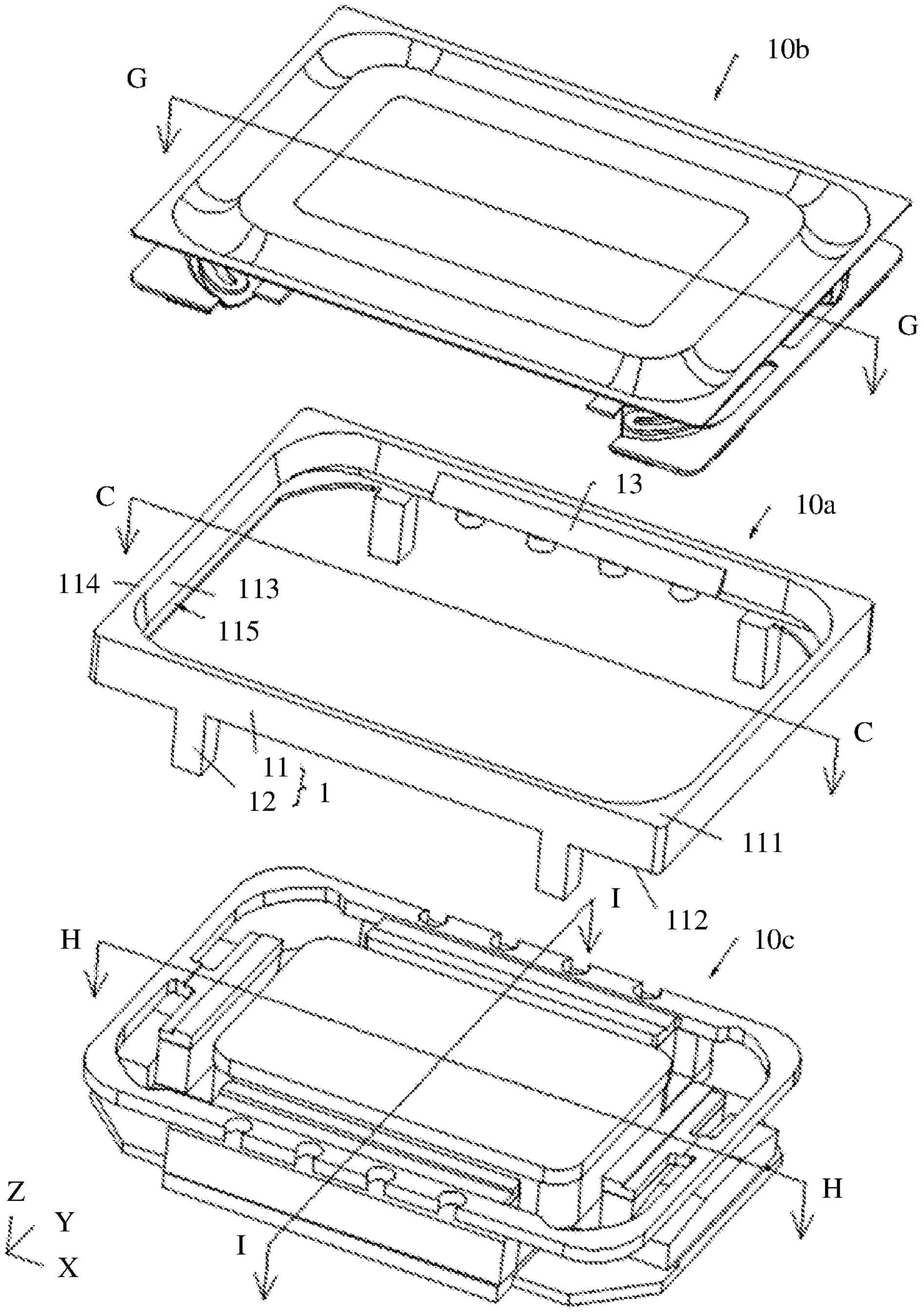
FIG. 10 is a partial schematic exploded view of an electroacoustic transducer shown in FIG. 9.

Refer to both FIG. 9 and FIG. 10. FIG. 9 is a structural diagram of the electroacoustic transducer 10 shown in FIG. 3, and FIG. 10 is a partial schematic exploded view of the electroacoustic transducer 10 shown in FIG. 9. In this embodiment of this application, an X direction is a length direction of the electroacoustic transducer 10, a Y direction is a width direction of the electroacoustic transducer 10, and a Z direction is a thickness direction of the electroacoustic transducer 10. It can be understood that orientation terms such as "top" and "bottom" used for the electroacoustic transducer 10 in this embodiment of this application are mainly intended for description based on a display orientation of the electroacoustic transducer 10 in FIG. 9, and do not limit an orientation of the electroacoustic transducer 10 in an actual application scenario.

In this embodiment of this application, a plurality of components of the electroacoustic transducer 10 are symmetrically disposed. That two components are symmetrically disposed means that the two components are in an axially symmetrical relationship relative to a reference plane, and a slight deviation caused by a manufacturing tolerance, an assembly tolerance, or the like is allowed. Some components may be symmetrical relative to a first reference plane, some components may be symmetrical relative to a second reference plane, and the second reference plane intersects with the first reference plane. For example, as shown in FIG. 9, the first reference plane may pass through a line K-K and be parallel to a YZ plane, where the YZ plane is a plane on which the width direction Y of the electroacoustic transducer 10 and the thickness direction Z of the electroacoustic transducer 10 are located; the second reference plane may pass through a line J-J and be parallel to an XZ plane, where the XZ plane is a plane on which the length direction X of the electroacoustic transducer 10 and the thickness direction Z of the electroacoustic transducer 10 are located.

The electroacoustic transducer 10 includes a support assembly **10*a*, a vibration assembly 10*b*, and a magnetic circuit assembly 10*c*. The support assembly 10*a* includes the basin stand 1. The vibration assembly 10*b* and the magnetic circuit assembly 10*c* are mounted to the basin stand 1. A part, fixed to the basin stand 1, of each component of the vibration assembly 10*b* does not move relative to the basin stand 1, and a rest part may vibrate relative to the basin stand 1. The magnetic circuit assembly 10*c* is fixed relative to the basin stand 1, and the magnetic circuit assembly 10*c* is configured to provide a driving magnetic field for the vibration assembly 10*b***.

Figure 11:
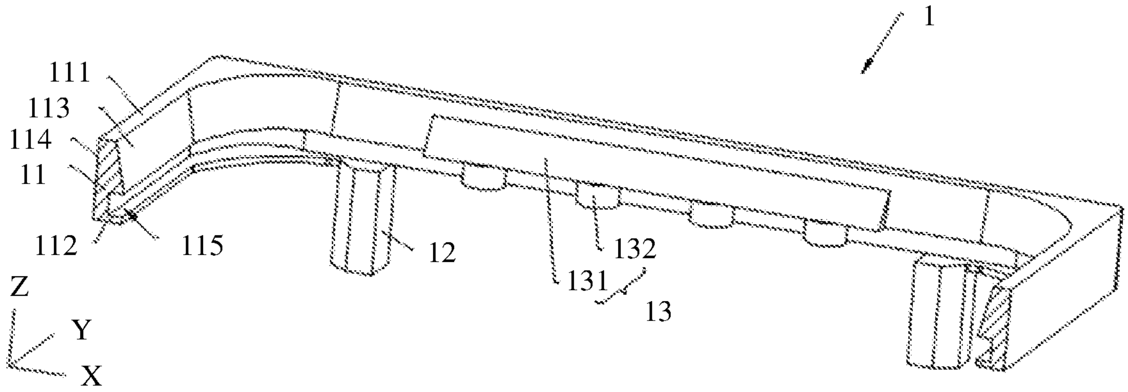
FIG. 11 is a schematic structural diagram of a basin stand shown in FIG. 10 that is cut along C-C.

Refer to both FIG. 10 and FIG. 11. FIG. 11 is a schematic structural diagram of the basin stand 1 shown in FIG. 10 that is cut along C-C.

The basin stand 1 includes a frame 11 and a plurality of legs 12. The frame 11 is roughly a rectangular frame. The frame 11 includes a first face 111 and a second face 112 that are opposite to each other. The plurality of legs 12 are fixed to the second face 112 at intervals. In this embodiment of this application, that two components are spaced from each other or are disposed at intervals means that there is a gap between the two components. A quantity of the plurality of legs 12 may be 4, and the legs 12 are symmetrically fixed to two side edges of the frame 11. The plurality of legs 12 may be symmetrical relative to the first reference plane, or may be symmetrical relative to the second reference plane.

The frame 11 further includes an inner side face 113 and an outer side face 114 that are disposed opposite to each other. The inner side face 113 and the outer side face 114 are connected between the first face 111 and the second face 112. For example, the inner side face 113 is disposed obliquely relative to the outer side face 114, and a spacing between the inner side face 113 and the outer side face 114 decreases in a direction toward the first face 111, so that a space on an inner side of the frame 11 can form a shape that is narrow at the bottom and wide at the top. A fixing groove 115 is formed on the inner side of the frame 11, and the fixing groove 115 is provided around the space on the inner side of the frame 11. An opening of the fixing groove 115 is located on the inner side face 113 of the frame 11, and the fixing groove 115 is concave in a direction toward the outer side face 114.

For example, the basin stand 1 further includes two limiting blocks 13, and the two limiting blocks 13 are symmetrically fixed to inner sides of the two side edges of the frame 11. The two limiting blocks 13 are symmetrical relative to the second reference plane. The limiting block 13 includes a limiting strip 131 and at least one limiting leg 132. The limiting strip 131 is fixed to the inner side face 113 of the frame 11, and a bottom face of the limiting strip 131 is disposed in a coplanar manner with a side wall of the fixing groove 115. The at least one limiting leg 132 is fixed to the bottom face of the limiting strip 131 and extends into the fixing groove 115. For example, the limiting strip 131 includes a side surface connecting the bottom face of the limiting strip 131 to the side wall of the fixing groove 115, and the side surface of the limiting strip 131 is disposed obliquely relative to the inner side face 113 of the frame 11.

For example, the basin stand 1 is of an integrated structure. In some other embodiments, structures of the basin stand 1 may be alternatively assembled (for example, bonded or clamped) to form an integrated structure.

It can be understood that the basin stand 1 of the electroacoustic transducer 10 is configured to fix and support other components of the electroacoustic transducer 10. If this requirement is met, the basin stand 1 may alternatively have another design shape, and is not limited to this embodiment.

Figure 12:
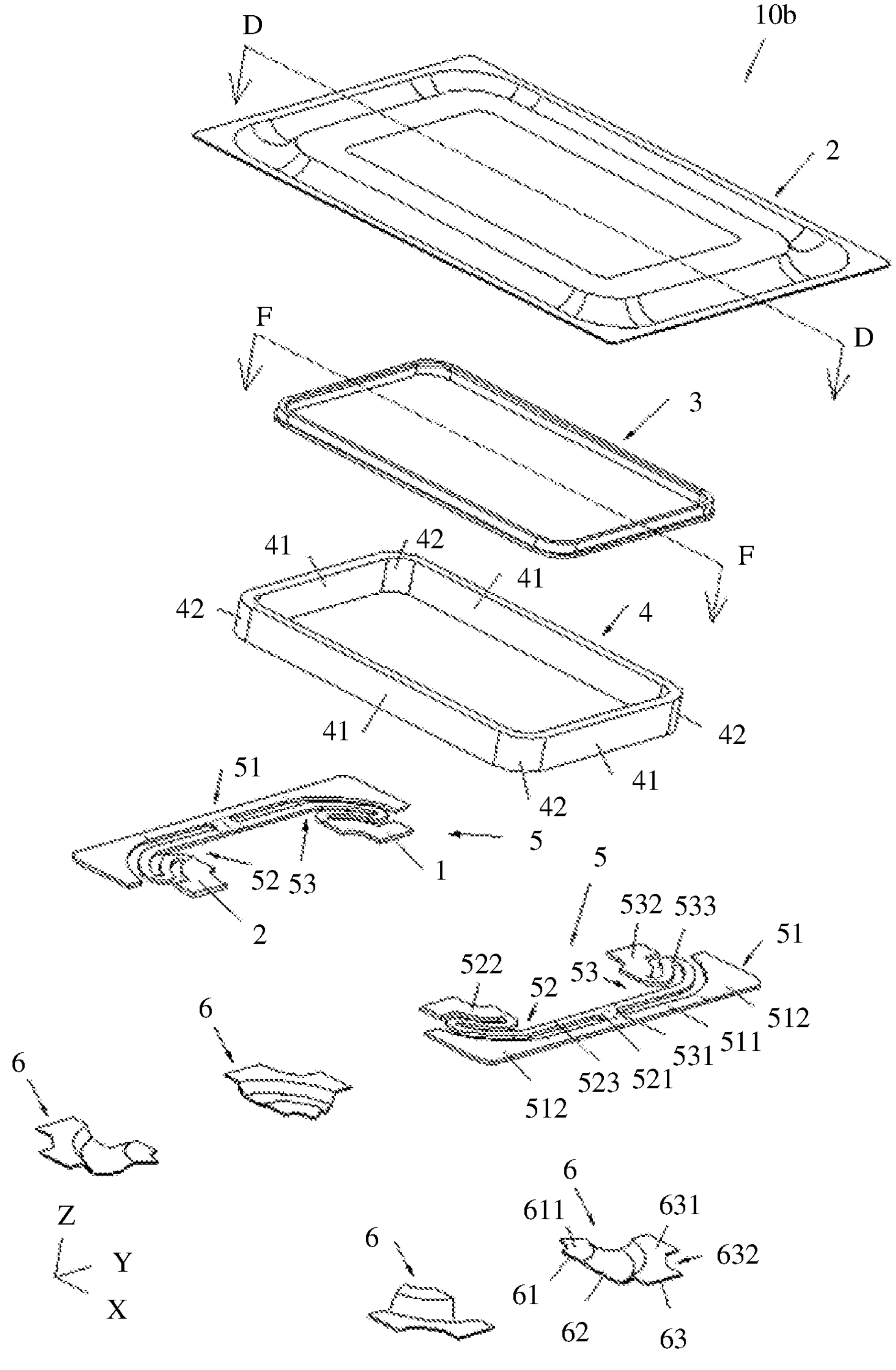
FIG. 12 is a schematic exploded view of a vibration assembly shown in FIG. 11.

FIG. 12 is a schematic exploded view of the vibration assembly **10*b* shown in FIG. 11**.

The vibration assembly **10*b* of the electroacoustic transducer 10 includes the voice diaphragm 2, a connection frame 3, a voice coil 4, two flexible printed circuit boards 5, and four auxiliary vibration diaphragms 6. The voice coil 4 is in a rounded rectangular shape. To be specific, the voice coil 4 includes four straight edges 41 and four round corners 42, and one round corner 42 is connected between two adjacent straight edges 41. Shapes of the voice diaphragm 2, the connection frame 3, the two flexible printed circuit boards 5, and the four auxiliary vibration diaphragms 6 are designed based on the shape of the voice coil 4. It can be understood that a length relationship between two adjacent straight edges 41 of the voice coil 4 is not strictly limited in this application. A length of a straight edge 41 may be greater than, equal to, or less than a length of an adjacent straight edge 41. In this embodiment, the voice coil 4 is inserted in the magnetic circuit assembly 10***c*, and the magnetic circuit assembly 10*c* provides a magnetic field for driving the voice coil 4 to vibrate. When the voice coil 4 is electrically connected, the voice coil 4 drives other components of the vibration assembly 10*b* to vibrate.

In some other embodiments, the voice coil 4 may be alternatively in a rectangular shape, and the following descriptions of the round corner 42 of the voice coil 4 correspond to the four corners of the voice coil 4. Certainly, the voice coil 4 may alternatively have another shape, and a specific shape of the voice coil 4 is not strictly limited in this application.

Figure 13:
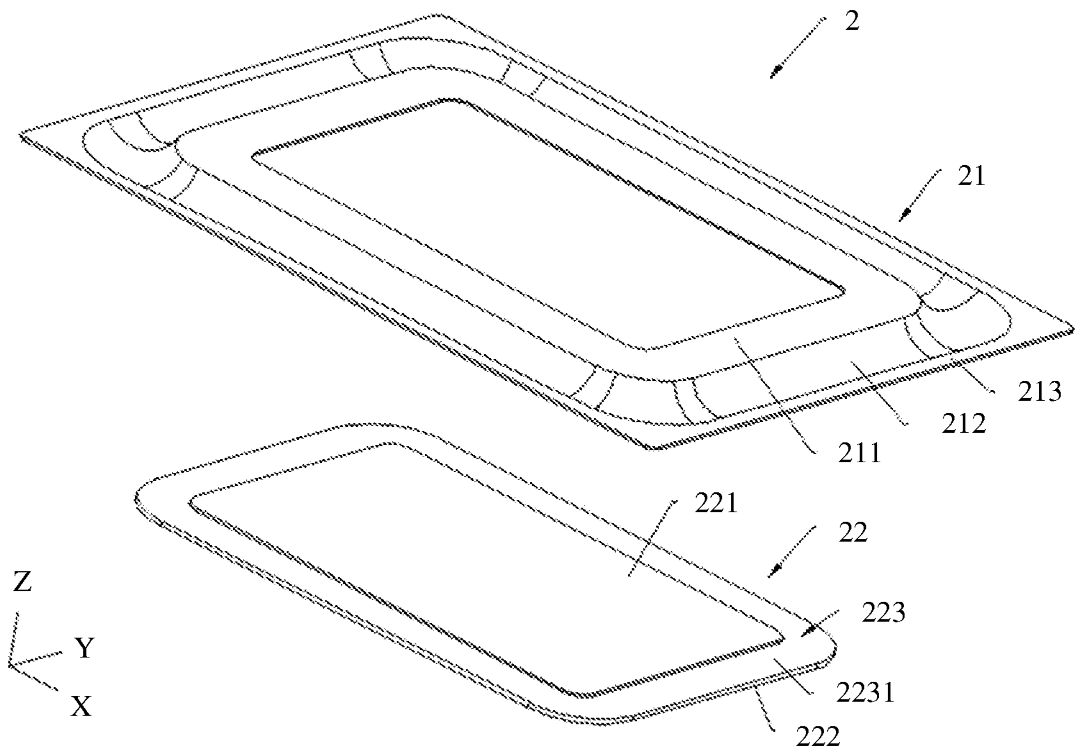
FIG. 13 is a schematic exploded view of a voice diaphragm shown in FIG. 12.
Figure 14:
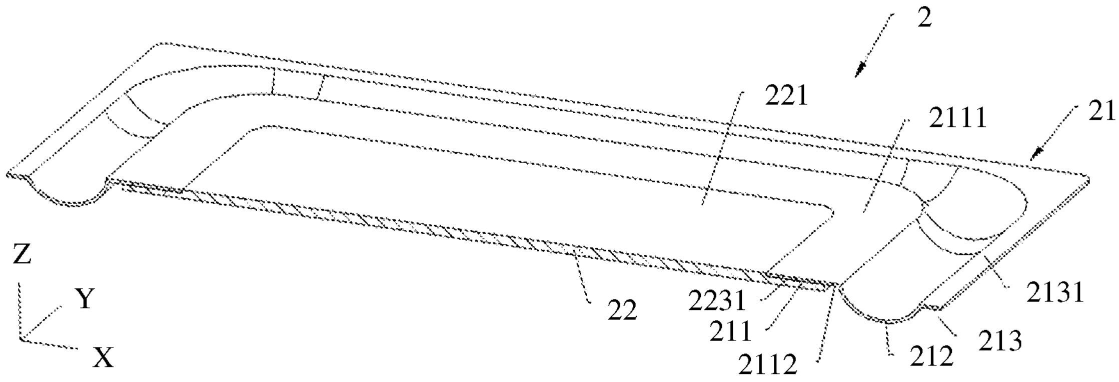
FIG. 14 is a schematic structural diagram of a voice diaphragm shown in FIG. 12 that is cut along D-D.

Refer to both FIG. 13 and FIG. 14. FIG. 13 is a schematic exploded view of the voice diaphragm 2 shown in FIG. 12, and FIG. 14 is a schematic structural diagram of the voice diaphragm 2 shown in FIG. 12 that is cut along D-D.

The voice diaphragm 2 includes a vibration diaphragm 21 and a dome 22. The dome 22 is roughly in a rectangular plate shape. The dome 22 includes a top face 221 and a bottom face 222 that are disposed opposite to each other, and a peripheral region of the top face 221 of the dome 22 is concave to form a limiting groove 223. The vibration diaphragm 21 is roughly in a rectangular ring shape. The vibration diaphragm 21 includes a first fixed part 211, a vibrating part 212, and a second fixed part 213 that are connected in sequence. The first fixed part 211 is located on an inner side of the vibrating part 212, and the second fixed part 213 is located on an outer side of the vibrating part 212. The first fixed part 211 of the vibration diaphragm 21 is partially accommodated in the limiting groove 223 of the dome 22, and is fixed to the dome 22. A bottom face 2112 of the first fixed part 211 of the vibration diaphragm 21 is in contact with a bottom wall 2231 of the limiting groove 223 of the dome 22. For example, a top face 2111 of the first fixed part 211 of the vibration diaphragm 21 is flush with the top face 221 of the dome 22. A cross-sectional shape of the vibrating part 212 of the vibration diaphragm 21 is an arc or approximately arc shape, and an extension track of the vibrating part 212 is in a rounded rectangular shape. The vibrating part 212 of the vibration diaphragm 21 is concave. To be specific, the vibrating part 212 is concave in a direction away from the top face 2111 of the first fixed part 211 of the vibration diaphragm 21 and a top face 2131 of the second fixed part 213 of the vibration diaphragm 21. When the vibrating part 212 of the vibration diaphragm 21 is subject to an external force, the vibrating part 212 can deform, so that the first fixed part 211 and the second fixed part 213 move relative to each other, and the dome 22 and the second fixed part 213 move relative to each other.

In this embodiment of this application, because the vibrating part 212 of the vibration diaphragm 21 is concave, an upper space of the electroacoustic transducer 10 can be saved, and after the vibration diaphragm 21 deforms under an influence of water pressure or air pressure, the vibration diaphragm 21 can easily restore.

Figure 15:
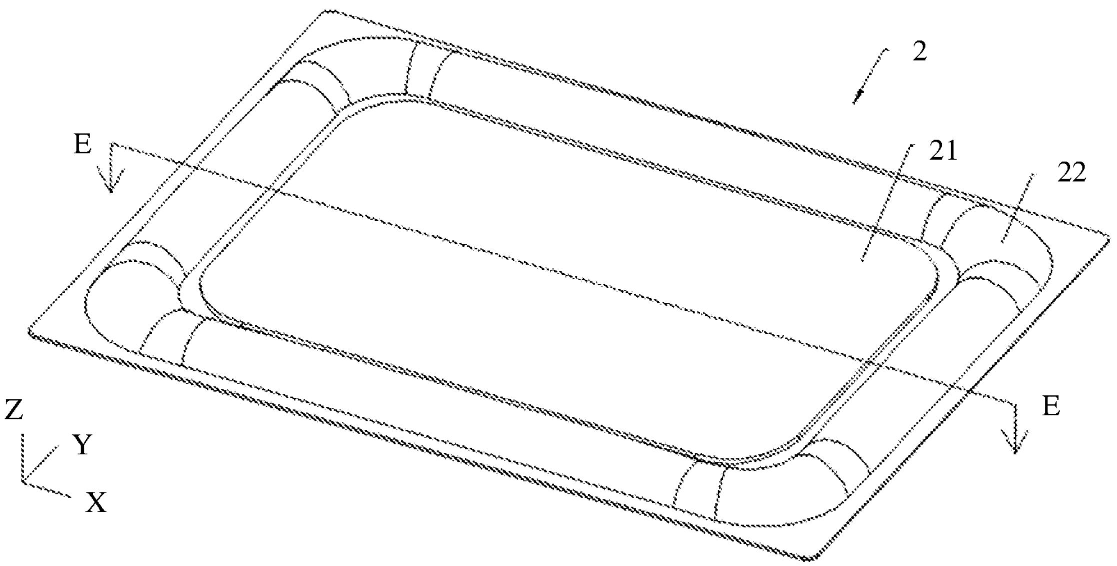
FIG. 15 is a schematic structural diagram of a voice diaphragm in FIG. 12 according to another embodiment.
Figure 16:
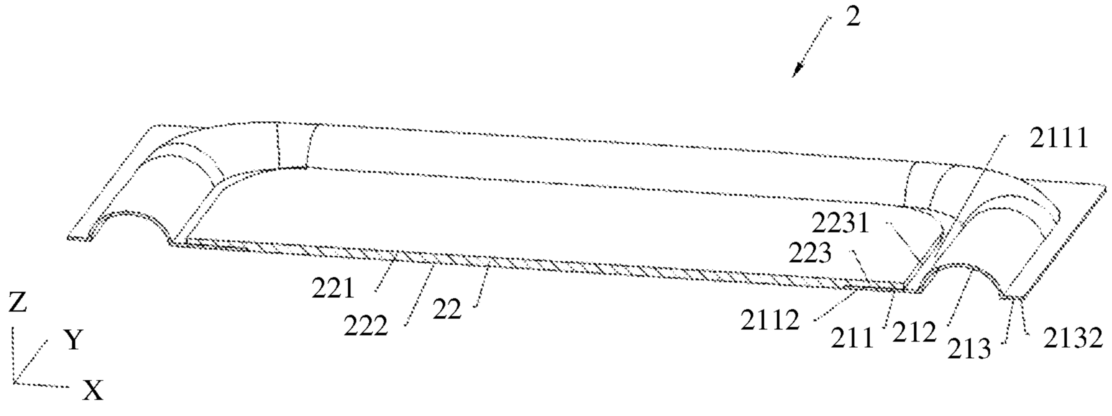
FIG. 16 is a schematic structural diagram of a voice diaphragm shown in FIG. 15 that is cut along E-E.

Refer to both FIG. 15 and FIG. 16. FIG. 15 is a schematic structural diagram of the voice diaphragm 2 in FIG. 12 according to another embodiment, and FIG. 16 is a schematic structural diagram of the voice diaphragm 2 shown in FIG. 15 that is cut along E-E.

The voice diaphragm 2 includes a vibration diaphragm 21 and a dome 22. The dome 22 is roughly in a rectangular plate shape. The dome 22 includes a top face 221 and a bottom face 222 that are disposed opposite to each other, and a peripheral region of the bottom face 222 of the dome 22 is convex to form a limiting groove 223. The vibration diaphragm 21 is roughly in a rectangular ring shape. The vibration diaphragm 21 includes a first fixed part 211, a vibrating part 212, and a second fixed part 213 that are connected in sequence. The first fixed part 211 is located on an inner side of the vibrating part 212, and the second fixed part 213 is located on an outer side of the vibrating part 212. The first fixed part 211 of the vibration diaphragm 21 is partially accommodated in the limiting groove 223 of the dome 22, and is fixed to the dome 22. A top face 2111 of the first fixed part 211 of the vibration diaphragm 21 is in contact with a bottom wall 2231 of the limiting groove 223 of the dome 22. For example, a bottom face 2112 of the first fixed part 211 of the vibration diaphragm 21 is flush with the bottom face 222 of the dome 22. A cross-sectional shape of the vibrating part 212 of the vibration diaphragm 21 is an arc or approximately arc shape, and an extension track of the vibrating part 212 is in a rounded rectangular shape. The vibrating part 212 of the vibration diaphragm 21 is convex. To be specific, the vibrating part 212 is convex in a direction away from the bottom face 2112 of the first fixed part 211 of the vibration diaphragm 21 and a bottom face 2132 of the second fixed part 213 of the vibration diaphragm 21. When the vibrating part 212 of the vibration diaphragm 21 is subject to an external force, the vibrating part 212 can deform, so that the first fixed part 211 and the second fixed part 213 move relative to each other, and the dome 22 and the second fixed part 213 move relative to each other.

In this embodiment of this application, because the vibrating part 212 of the vibration diaphragm 21 is convex, a space under the vibration diaphragm 21 is released, and a larger height size can be set for the magnetic circuit assembly 10*c* under the vibration diaphragm 21, thereby improving magnetic induction strength of the electroacoustic transducer 10, and improving sensitivity of the electroacoustic transducer 10.

Figure 17:
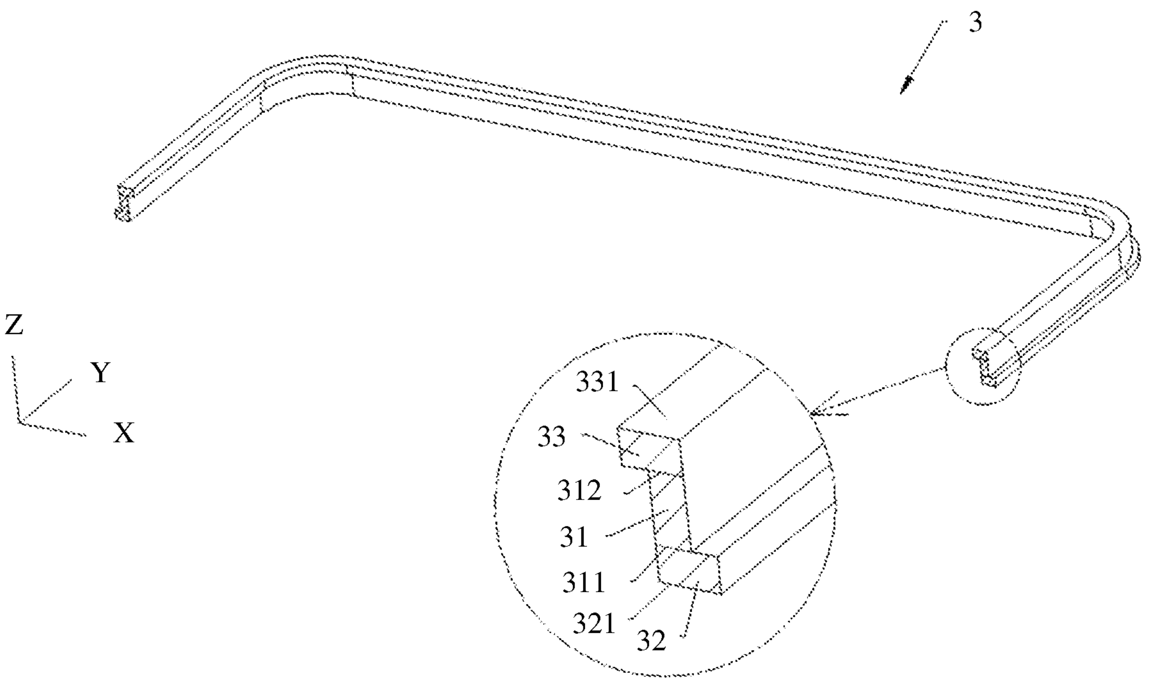
FIG. 17 is a schematic structural diagram of a connection frame shown in FIG. 12 that is cut along F-F.

Refer to both FIG. 12 and FIG. 17. FIG. 17 is a schematic structural diagram of the connection frame 3 shown in FIG. 12 that is cut along F-F.

For example, a cross-sectional shape of the connection frame 3 is roughly a Z shape, and an extension track of the connection frame 3 is in a rounded rectangular shape. The connection frame 3 includes a main part 31, an outer extension part 32, and an inner extension part 33. The outer extension part 32 is connected to a bottom face 311 of the main part 31 and extends toward an outer side of the main part 31. An area of a bottom face 321 of the outer extension part 32 is larger than an area of the bottom face 311 of the main part 31, to increase a connection area between the connection frame 3 and other components. The inner extension part 33 is connected to a top face 312 of the main part 31 and extends toward an inner side of the main part 31. An area of a top face 331 of the inner extension part 33 is greater than an area of the top face 312 of the main part 31, to increase a connection area between the connection frame 3 and other components. In this embodiment, end faces of two ends of the connection frame 3 (that is, the bottom face 321 of the outer extension part 32 and the top face 331 of the inner extension part 33) have comparatively large areas, so that a connection area between the connection frame 3 and an external structure is comparatively large, and a connection relationship is more stable. The connection frame 3 may be integrated.

In some other embodiments, the cross-sectional shape of the connection frame 3 may be alternatively a vertical bar shape, an L shape, an inverted L shape, a T shape, an inverted T shape, a "匚" shape, or the like. The cross-sectional shape of the connection frame 3 is not strictly limited in this application.

Still referring to FIG. 12, structures of the two flexible printed circuit boards 5 are the same. The flexible printed circuit board 5 includes a body 51, a first stub 52, and a second stub 53. The body 51 includes a middle part 511 and two end parts 512 respectively connected to two sides of the middle part 511. The first stub 52 includes a head end 521, a tail end 522, and a connection section 523 connected between the head end 521 and the tail end 522. The second stub 53 includes a head end 531, a tail end 532, and a connection section 533 connected between the head end 531 and the tail end 532.

The head end 521 of the first stub 52 and the head end 531 of the second stub 53 are both connected to the middle part 511 of the body 51. For example, the head end 521 of the first stub 52 is connected to the head end 531 of the second stub 53, and then the two connected head ends are connected to the middle part 511 of the body 51. In some other embodiments, the head end 521 of the first stub 52 and the head end 531 of the second stub 53 each are connected to a different location in the middle part 511 of the body 51, and a gap is formed between the two head ends.

The tail end 522 of the first stub 52 and the tail end 532 of the second stub 53 are spaced from each other, and are spaced from the body 51. The tail end 522 of the first stub 52 and the tail end 532 of the second stub 53 are movable end parts, and may move relative to the body 51. When the tail end 522 of the first stub 52 moves relative to the body 51 under a force, the connection section 523 of the first stub 52 may be driven to move relative to the body 51. When the tail end 532 of the second stub 53 moves relative to the body 51 under a force, the connection section 533 of the second stub 53 may be driven to move relative to the body 51.

As shown in FIG. 12, structures of the four auxiliary vibration diaphragms 6 are the same. The auxiliary vibration diaphragm 6 is roughly in a fan shape. The auxiliary vibration diaphragm 6 includes a first fixed part 61, a vibrating part 62, and a second fixed part 63 that are connected in sequence. The first fixed part 61 is located on an inner side of the vibrating part 62, and the second fixed part 63 is located on an outer side of the vibrating part 62. A cross-sectional shape of the vibrating part 62 of the auxiliary vibration diaphragm 6 is an arc or approximately arc shape, and an extension track of the vibrating part 212 is in an arc shape. The vibrating part 62 of the auxiliary vibration diaphragm 6 is concave. To be specific, the vibrating part 62 is concave in a direction away from a top face 611 of the first fixed part 61 and a top face 631 of the second fixed part 63. The first fixed part 61 of the auxiliary vibration diaphragm 6 is in a fan shape. A notch 632 is formed on a side, away from the first fixed part 61, of the second fixed part 63 of the auxiliary vibration diaphragm 6. When the vibrating part 62 of the auxiliary vibration diaphragm 6 is subject to an external force, the vibrating part 62 can deform, so that the first fixed part 61 and the second fixed part 63 move relative to each other.

Figure 18:
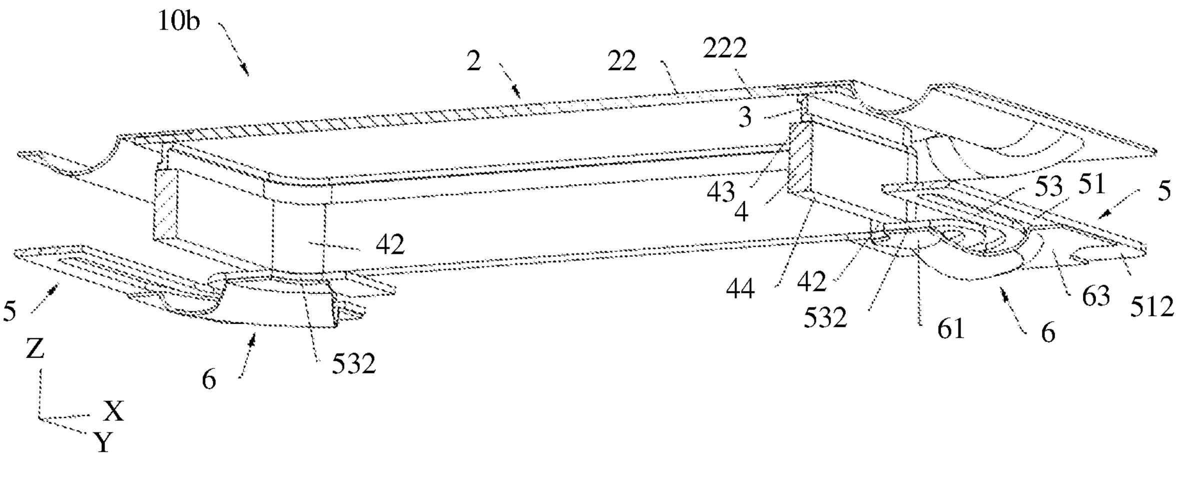
FIG. 18 is a schematic structural diagram of a vibration assembly shown in FIG. 10 that is cut along G-G.
Figure 19:
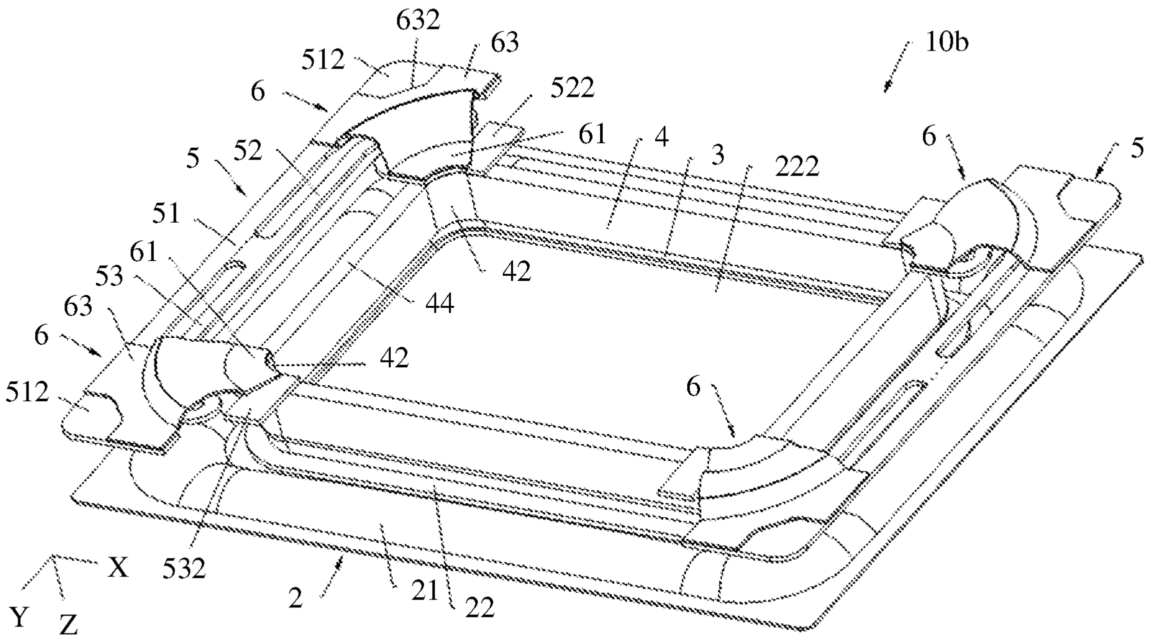
FIG. 19 is a schematic structural diagram of a vibration assembly shown in FIG. 10 from another angle.

Refer to both FIG. 18 and FIG. 19. FIG. 18 is a schematic structural diagram of the vibration assembly **10*b* shown in FIG. 10 that is cut along G-G, and FIG. 19 is a schematic structural diagram of the vibration assembly 10*b* shown in FIG. 10** from another angle.

One end of the voice coil 4 is fixedly connected to the voice diaphragm 2. For example, the voice coil 4 is indirectly connected to the voice diaphragm 2 through the connection frame 3. For example, the connection frame 3 is located between the voice coil 4 and the voice diaphragm 2. One end of the connection frame 3 is fixedly connected to the voice coil 4, and the other end of the connection frame 3 is fixedly connected to the voice diaphragm 2. Referring to both FIG. 17 and FIG. 18, the top face 331 of the inner extension part 33 of the connection frame 3 is in contact with the bottom face 222 of the dome 22 of the voice diaphragm 2, and the top face 331 and the bottom face 222 may be fixed to each other through bonding. The bottom face 321 of the outer extension part 32 of the connection frame 3 is in contact with the top face 43 of the voice coil 4, and the bottom face 321 and the top face 43 may be fixed to each other through bonding. An area of the bottom face 321 of the outer extension part 32 of the connection frame 3 may be smaller than an area of the top face 43 of the voice coil 4.

In this embodiment, the connection frame 3 separates the voice coil 4 from the voice diaphragm 2, so that the voice diaphragm 2 is away from the voice coil 4. In addition, the connection frame 3 may perform heat dissipation for the voice coil 4, thereby reducing a risk of damaging the voice diaphragm 2 due to overheating of the voice coil 4. In some other embodiments, the connection frame 3 is omitted from the electroacoustic transducer 10, and the voice coil 4 is directly connected to the voice diaphragm 2, to simplify a structure of the electroacoustic transducer 10.

As shown in FIG. 18 and FIG. 19, the two flexible printed circuit boards 5 are symmetrically arranged at intervals. The two flexible printed circuit boards 5 may be symmetrical relative to the first reference plane. The two flexible printed circuit boards 5 are located on outer sides of two edges of the voice coil 4. Tail ends (522 and 532) of two stubs of each flexible printed circuit board 5 are fixedly connected to two round corners 42 of the voice coil 4 respectively. In one flexible printed circuit board 5, the tail end 522 of the first stub 52 is fixedly connected to a round corner 42 of the voice coil 4, and the tail end 532 of the second stub 53 is fixedly connected to another round corner 42 of the voice coil 4.

For example, the voice coil 4 includes a left edge and a right edge arranged in the length direction X of the electroacoustic transducer 10, two left round corners connecting two ends of the left edge, and two right round corners connecting two ends of the right edge. The two flexible printed circuit boards 5 include a first flexible printed circuit board and a second flexible printed circuit board. The first flexible printed circuit board is located on an outer side of the left edge of the voice coil 4, and the second flexible printed circuit board is located on an outer side of the right edge of the voice coil 4. A tail end of a first stub of the first flexible printed circuit board and a tail end of a second stub of the first flexible printed circuit board are respectively connected to the two left round corners of the voice coil 4. A tail end of a first stub of the second flexible printed circuit board and a tail end of a second stub of the second flexible printed circuit board are respectively connected to the two right round corners of the voice coil 4.

The tail ends (522 and 532) of the stubs of the flexible printed circuit board 5 are fixed to the bottom face 44 of the voice coil 4. The tail ends (522 and 532) of the stubs of the flexible printed circuit board 5 and the round corners 42 of the voice coil 4 may be fixed to each other through bonding. For example, the voice coil 4 includes two sub-voice coils, and the two sub-voice coils are stacked in the thickness direction Z of the electroacoustic transducer 10. Two ends of a lead of one sub-voice coil each are electrically connected to a tail end of one stub of each of the two flexible printed circuit boards 5. Two ends of a lead of the other sub-voice coil each are electrically connected to a tail end of the other stub of each of the two flexible printed circuit boards 5.

For example, the two sub-voice coils include a first sub-voice coil and a second sub-voice coil. The tail end of the first stub of the first flexible printed circuit board is connected to one end of a lead of the first sub-voice coil, the tail end of the first stub of the second flexible printed circuit board is connected to the other end of the lead of the first sub-voice coil, the tail end of the second stub of the second flexible printed circuit board is connected to one end of a lead of the second sub-voice coil, and the tail end of the second stub of the first flexible printed circuit board is connected to the other end of the lead of the second sub-voice coil. A current may flow along the following track: "the tail end of the first stub of the first flexible printed circuit board—one end of the lead of the first sub-voice coil—the other end of the lead of the first sub-voice coil—the tail end of the first stub of the second flexible printed circuit board—the tail end of the second stub of the second flexible printed circuit board—one end of the lead of the second sub-voice coil—the other end of the lead of the second sub-voice coil—the tail end of the second stub of the first flexible printed circuit board".

In some other embodiments, a connection relationship between the two sub-voice coils and the tail ends (522 and 532) of the two stubs of each of the two flexible printed circuit boards 5 may be alternatively different from that in the foregoing embodiment. This is not strictly limited in this embodiment of this application. In some other embodiments, the voice coil 4 may alternatively include more sub-voice coils. The voice coil 4 may further include a voice coil carrier, and a plurality of sub-voice coils are fixed to the voice coil carrier through winding. One end of the voice coil carrier is fixedly connected to the voice diaphragm, and the other end is partially inserted in the magnetic circuit assembly.

As shown in FIG. 18 and FIG. 19, the four auxiliary vibration diaphragms 6 are respectively located on outer sides of the four round corners 42 of the voice coil 4. The four auxiliary vibration diaphragms 6 are arranged at intervals on sides, away from the voice coil 4, of the two flexible printed circuit boards 5. One end (that is, the first fixed part 61) of each of the four auxiliary vibration diaphragms 6 is fixedly connected to each of tail ends 522 of first stubs 52 of the two flexible printed circuit boards 5 and tail ends 532 of second stubs 53 of the two flexible printed circuit boards 5. The other end (that is, the second fixed part 63) of each auxiliary vibration diaphragm 6 is fixedly connected to an end part 512 of a body 51 of an adjacent flexible printed circuit board 5. Two ends of each auxiliary vibration diaphragm 6 can move relative to each other.

For example, the four auxiliary vibration diaphragms 6 include a first auxiliary vibration diaphragm and a second auxiliary vibration diaphragm that are located on outer sides of the left round corners the voice coil 4, and further include a third auxiliary vibration diaphragm and a fourth auxiliary vibration diaphragm that are located on outer sides of the right round corners of the voice coil 4. A first fixed part of the first auxiliary vibration diaphragm and a first fixed part of the second auxiliary vibration diaphragm are fixedly connected to the tail end of the first stub of the first flexible printed circuit board and the tail end of the second stub of the first flexible printed circuit board, respectively. A second fixed part of the first auxiliary vibration diaphragm and a second fixed part of the second auxiliary vibration diaphragm are fixedly connected to two end parts of a body of the first flexible printed circuit board respectively. A first fixed part of the third auxiliary vibration diaphragm and a first fixed part of the fourth auxiliary vibration diaphragm are fixedly connected to the tail end of the first stub of the second flexible printed circuit board and the tail end of the second stub of the second flexible printed circuit board, respectively. A second fixed part of the third auxiliary vibration diaphragm and a second fixed part of the fourth auxiliary vibration diaphragm are fixedly connected to two end parts of a body of the second flexible printed circuit board respectively.

A part of the flexible printed circuit board 5 is exposed at an end at which the auxiliary vibration diaphragm 6 is fixed to the flexible printed circuit board 5. In other words, the end part 512 of the body 51 of the flexible printed circuit board 5 may be exposed through the notch 632 of the second fixed part 63 of the auxiliary vibration diaphragm 6. An exposed region of the end part 512 of the body 51 of the flexible printed circuit board 5 relative to the auxiliary vibration diaphragm 6 may be used for connecting another component of the electroacoustic transducer 10. For example, as shown in FIG. 8, exposed regions of the two end parts 512 of the body 51 of the flexible printed circuit board 5 may be used for fixing (for example, welding) the tail ends of the two branches of the circuit board 40, to implement an electrical connection between the electroacoustic transducer 10 and an external device.

Figure 20:
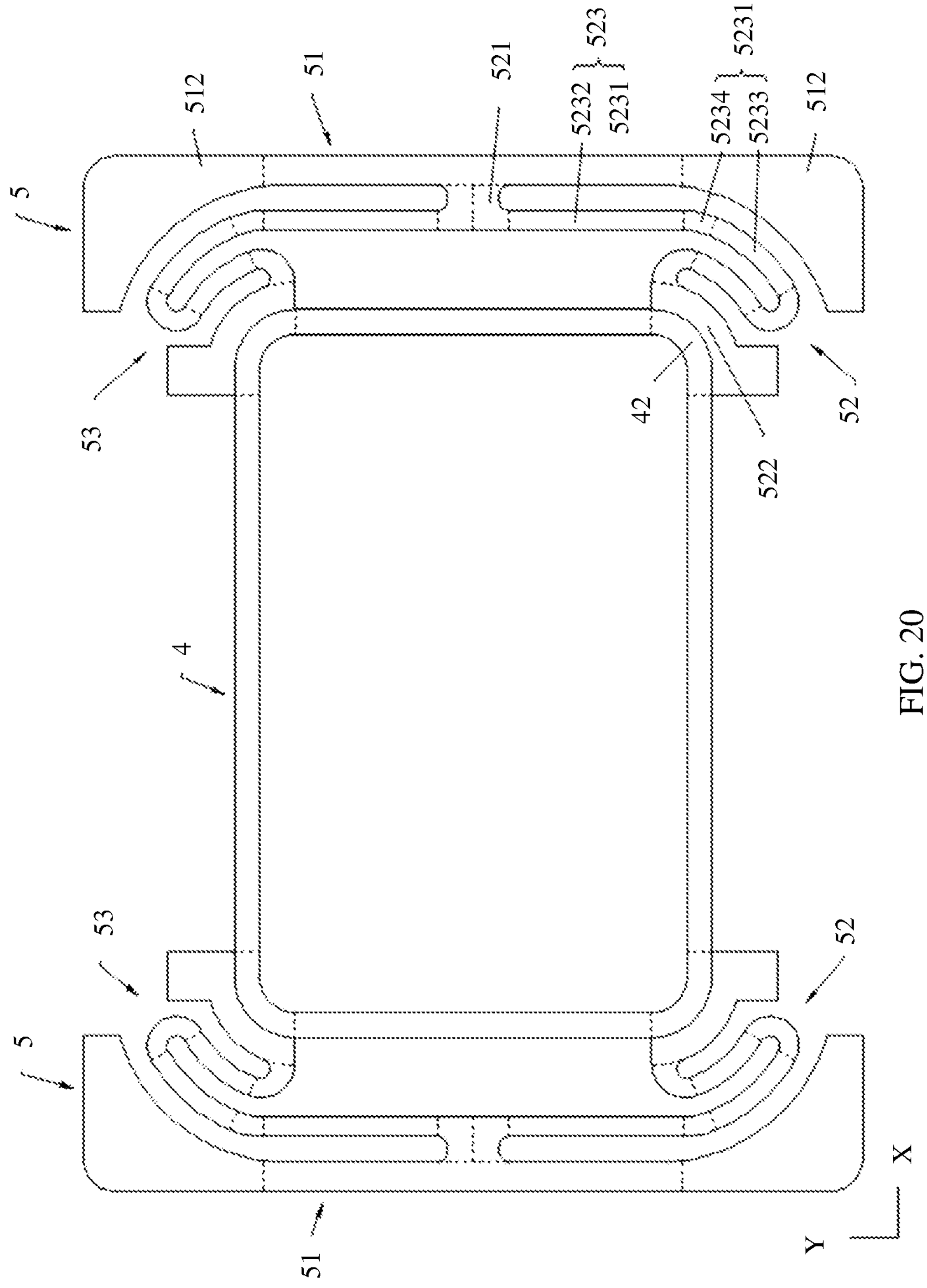
FIG. 20 is a schematic structural assembly diagram of a flexible printed circuit board and a voice coil of a vibration assembly shown in FIG. 10.

FIG. 20 is a schematic structural assembly diagram of the flexible printed circuit board 5 and the voice coil 4 of the vibration assembly **10*b* shown in FIG. 10**.

For example, the first stub 52 and the second stub 53 of the flexible printed circuit board 5 are symmetrically disposed. The first stub 52 and the second stub 53 may be symmetrical relative to the second reference plane. The connection section 523 of the first stub 52 includes a bent section 5231 and a straight section 5232. One end of the bent section 5231 is connected to the tail end 522 of the first stub 52, the other end of the bent section 5231 is connected to one end of the straight section 5232, and the other end of the straight section 5232 is connected to the head end 521 of the first stub 52. The bent section 5231 includes one or more arc sections 5233, and each arc section 5233 is disposed coaxially with a round corner 42, connected to the first stub 52, of the voice coil 4. In this embodiment of this application, that two structures are coaxially disposed means that central lines (or referred to as center lines) of the two structures overlap, and a slight deviation caused by a manufacturing tolerance, an assembly tolerance, or the like is allowed.

In this embodiment, because the arc section 5233 of the bent section 5231 is disposed coaxially with the round corner 42 of the voice coil 4, when the voice coil 4 drives the flexible printed circuit board 5 to vibrate, a shape of the flexible printed circuit board 5 can better adapt to deformation and displacement requirements, so that the flexible printed circuit board 5 has higher reliability and a longer service life. In addition, the arc section 5233 is disposed coaxially with the round corner 42 of the voice coil 4, so that the bent section 5231 can fully utilize a space on an outer side of the round corner 42 of the voice coil 4, to route a longer wire, and when the flexible printed circuit board 5 vibrates with the voice coil 4 at a large amplitude, stress is comparatively small, and the flexible printed circuit board 5 has higher reliability.

In addition, when a length of a bent part meets a requirement and a comparatively small space is occupied, an end part 512, arranged close to the bent part, of the body 51 may have a comparatively large area, and the end part 512 of the body 51 not only has a sufficient area for fixing with the auxiliary vibration diaphragm 6, but also has a sufficient area for fixing with an external structure of the electroacoustic transducer 10.

An extension direction of the straight section 5232 of the first stub 52 may be roughly parallel to the width direction Y of the electroacoustic transducer 10. In this case, the straight section 5232 is comparatively long, so that the flexible printed circuit board 5 is comparatively long, and a large amplitude is more easily implemented. In addition, the straight section 5232 occupies a comparatively small space in the length direction X of the electroacoustic transducer 10, thereby helping suppress spatial extrusion against the magnetic circuit assembly 10*c* by the flexible printed circuit board 5, so that the magnetic circuit assembly 10*c* has a larger arrangement space, to ensure magnetic induction strength and sensitivity of the electroacoustic transducer 10.

The bent section 5231 of the first stub 52 further includes a plurality of transition sections 5234, and the transition section 5234 may be arranged between adjacent arc sections 5233, or may be arranged between the arc section 5233 and the straight section 5232, or may be arranged between the arc section 5233 and the tail end 522 of the first stub 52.

Figure 21:
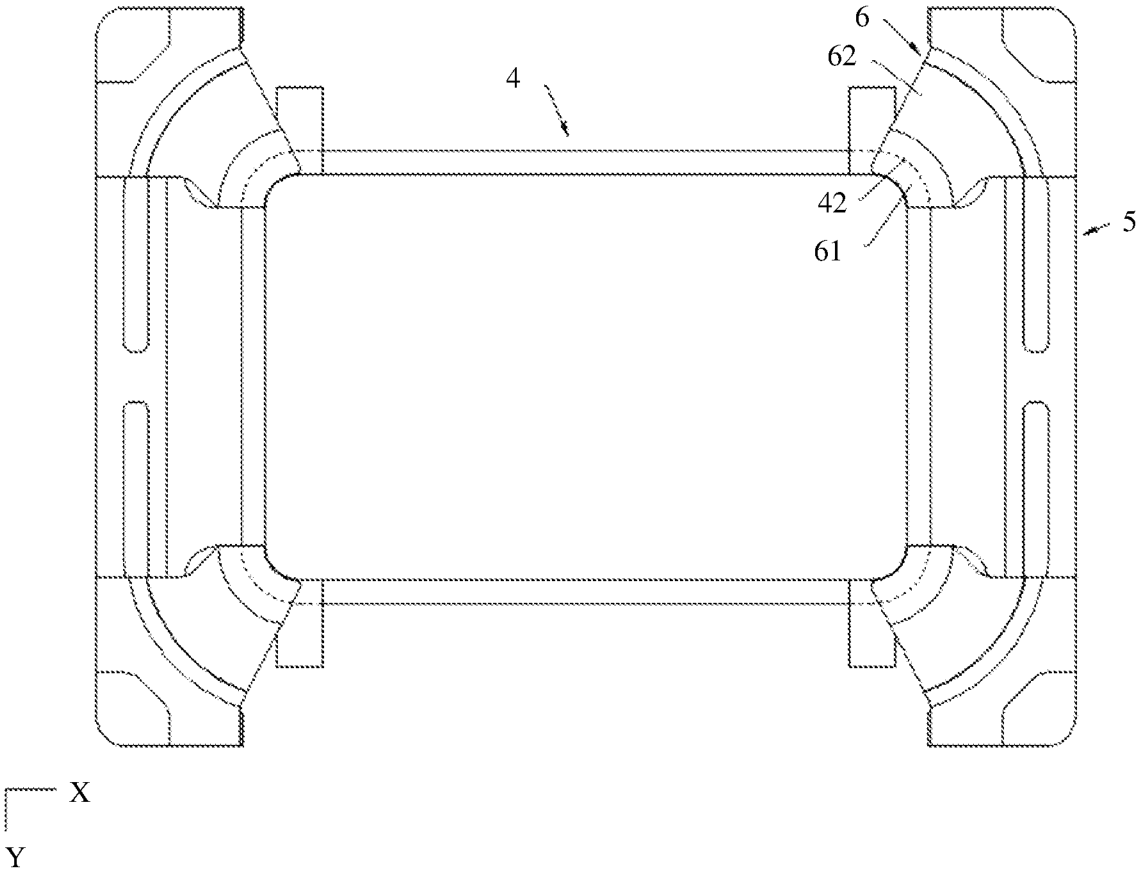
FIG. 21 is a schematic structural assembly diagram of an auxiliary vibration diaphragm, a flexible printed circuit board, and a voice coil of a vibration assembly shown in FIG. 10.

FIG. 21 is a schematic structural assembly diagram of the auxiliary vibration diaphragm 6, the flexible printed circuit board 5, and the voice coil 4 of the vibration assembly 10*b* shown in FIG. 10.

For example, an extension track of the vibrating part 62 of the auxiliary vibration diaphragm 6 is disposed coaxially with a round corner 42, connected to the auxiliary vibration diaphragm 6, of the voice coil 4. In this embodiment, when the first fixed part 61 of the auxiliary vibration diaphragm 6 vibrates with the voice coil 4, a shape of the vibrating part 62 of the auxiliary vibration diaphragm 6 can better adapt to deformation and displacement requirements, so that the auxiliary vibration diaphragm 6 has higher reliability and a longer service life. In addition, because the arc section 5233 of the bent section 5231 of the stub of the flexible printed circuit board 5 is also disposed coaxially with the round corner 42 of the voice coil 4 (refer to FIG. 20), the bent section 5231 of the stub of the flexible printed circuit board 5 and the vibrating part 62 of the auxiliary vibration diaphragm 6 have similar deformation trends in a process of vibrating with the voice coil 4, so that a risk of collision between the bent section 5231 and the vibrating part 62 can be reduced, and the electroacoustic transducer 10 has higher reliability.

Figure 22:
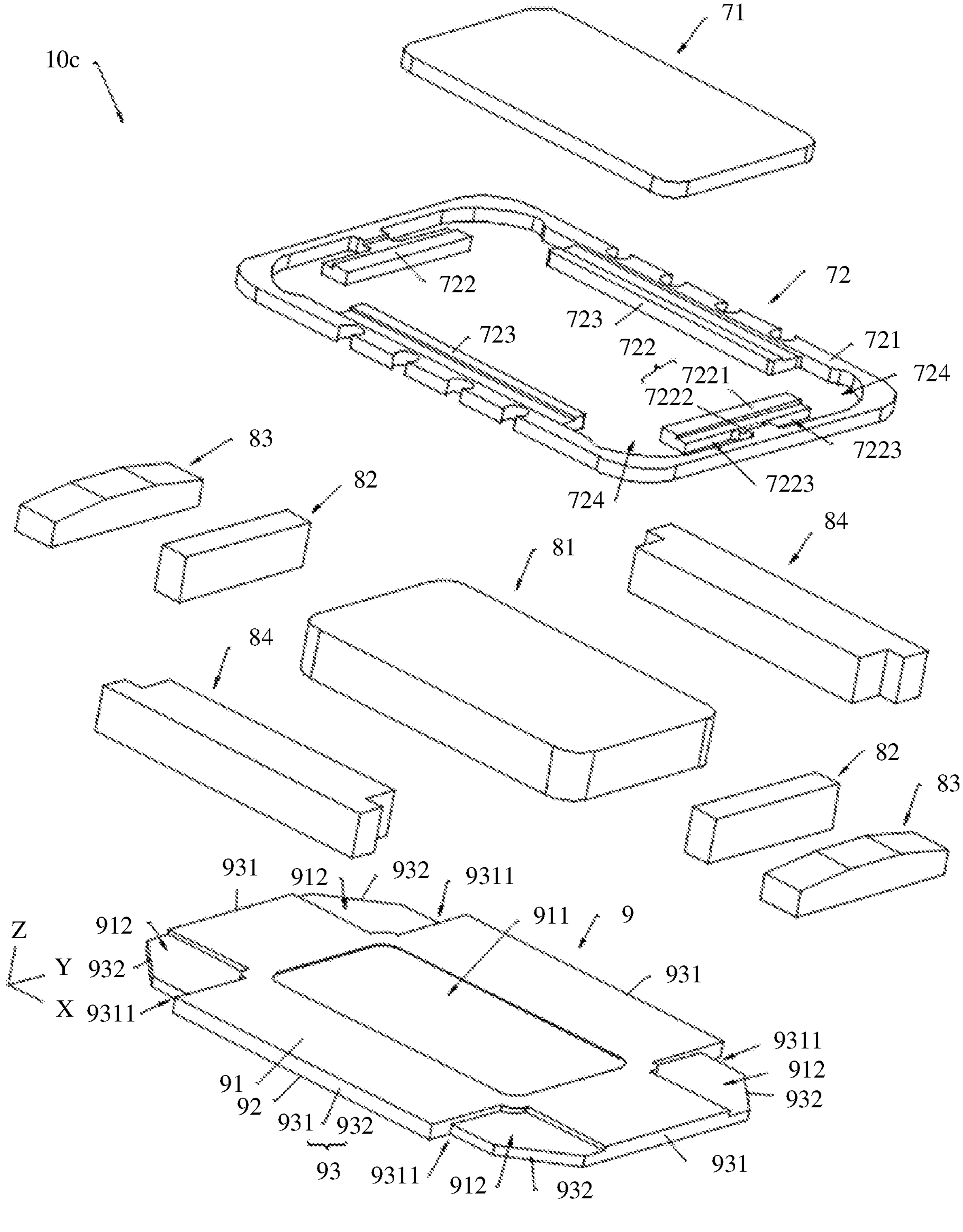
FIG. 22 is a schematic exploded view of a magnetic circuit assembly shown in FIG. 10.
Figure 23:
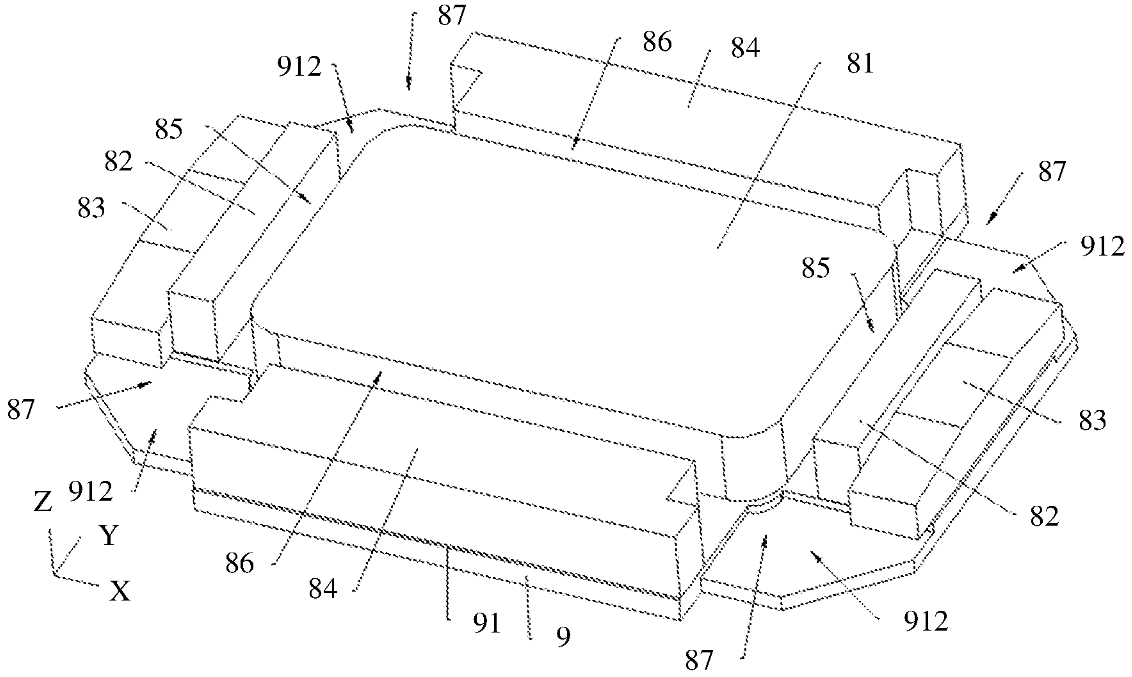
FIG. 23 is a partial schematic structural diagram of a magnetic circuit assembly shown in FIG. 10.

Refer to both FIG. 22 and FIG. 23. FIG. 22 is a schematic exploded view of the magnetic circuit assembly 10*c* shown in FIG. 10, and FIG. 23 is a partial schematic structural diagram of the magnetic circuit assembly 10*c* shown in FIG. 10.

The magnetic circuit assembly 10*c* of the electroacoustic transducer 10 includes a center electrode plate 71, a side electrode plate 72, a center magnet 81, two first side magnets 82, two second side magnets 83, two third side magnets 84, and a lower electrode plate 9. The center electrode plate 71, the side electrode plate 72, and the lower electrode plate 9 are magnetic conductive pieces. The center magnet 81, the two first side magnets 82, the two second side magnets 83, and the two third side magnets 84 are permanent magnets, and jointly form a magnet group.

For example, the lower electrode plate 9 is roughly in a chamfered rectangular shape. The lower electrode plate 9 includes a top face 91 and a bottom face 92 that are disposed opposite to each other, and a peripheral side face 93 connected between the top face 91 and the bottom face 92. The peripheral side face 93 includes four side edge faces 931 and four chamfered faces 932, and one chamfered face 932 is connected between two adjacent side edge faces 931. Two ends of each of two side edge faces 931 that are disposed opposite to each other are concave to form clamping spaces 9311. The lower electrode plate 9 forms four symmetrical clamping spaces 9311. The four clamping spaces 9311 may be symmetrical relative to the first reference plane, or may be symmetrical relative to the second reference plane. The top face 91 of the lower electrode plate 9 is provided with a center groove 911 and four corner grooves 912. The four corner grooves 912 are provided around the center groove 911, and are spaced from the center groove 911. The four corner grooves 912 are respectively located at four corners of the top face 303, and each corner groove 912 extends to a corresponding chamfered face 932 and side edge face 931.

The center magnet 81, the two first side magnets 82, the two second side magnets 83, and the two third side magnets 84 are all fixed to the top face 91 of the lower electrode plate 9. For example, the magnets may be fixed to the top face 91 of the lower electrode plate 9 through bonding. The lower electrode plate 9 is perpendicular to the thickness direction Z of the electroacoustic transducer 10. A thickness direction of the center magnet 81 is parallel to the thickness direction Z of the electroacoustic transducer 10.

The center magnet 81 is roughly in a rounded rectangular shape or a rectangular shape. The center magnet 81 covers the center groove 911 of the lower electrode plate 9. The setting of the center groove 911 can not only reduce a weight of the lower electrode plate 9, but also reduce a connection area between a lower surface of the center magnet 81 and the top face 91 of the lower electrode plate 9, so that a face-to-face connection is easier to implement, and connection quality is higher. In some other embodiments, the center groove 911 may be alternatively omitted from the lower electrode plate 9.

The two first side magnets 82 are symmetrically arranged on two sides of the center magnet 81, and a first gap 85 is formed between the first side magnet 82 and the center magnet 81. The two first side magnets 82 may be symmetrical relative to the first reference plane. The two second side magnets 83 are symmetrically arranged on two sides of the center magnet 81, and the second side magnet 83 is located on a side, away from the center magnet 81, of the first side magnet 82. The two second side magnets 83 may be symmetrical relative to the first reference plane. The second side magnet 83, the first side magnet 82, and the center magnet 81 are arranged in a first direction (that is, the length direction X of the electroacoustic transducer 10). For example, a second side magnet 83 and a first side magnet 82 that are located on one side of the center magnet 81 are fixed to each other. For example, two side faces, facing each other, of the second side magnet 83 and the first side magnet 82 are bonded to each other, to ensure reliability of the magnetic circuit assembly 10*c*.

The two third side magnets 84 are symmetrically arranged on the other two sides of the center magnet 81, and a third gap 86 is formed between the third side magnet 84 and the center magnet 81. The two third side magnets 84 may be symmetrical relative to the second reference plane. The third side magnet 84 and the center magnet 81 are arranged in a second direction (that is, the width direction Y of the electroacoustic transducer 10). In this embodiment, four connection spaces 87 are respectively formed on outer sides of four corners of the center magnet 81. Each connection space 87 connects a first gap 85 and a third gap 86 that are adjacent to each other, and is further connected to an outer side of the magnetic circuit assembly 10*c*. The four corner grooves 912 of the lower electrode plate 9 are connected to the four connection spaces 87 in a one-to-one correspondence, to form a space with a larger volume.

As shown in FIG. 22, for example, the side electrode plate 72 includes a connection frame part 721, and two first electrode plate parts 722 and two second electrode plate parts 723 that are located on an inner side of the connection frame part 721. The two first electrode plate parts 722 are symmetrically connected to two straight edges of the connection frame part 721. The two second electrode plate parts 723 are symmetrically connected to the other two straight edges of the connection frame part 721. The two first electrode plate parts 722 may be symmetrical relative to the first reference plane, and the two second electrode plate parts 723 may be symmetrical relative to the second reference plane.

The first electrode plate part 722 is roughly in a T shape. The first electrode plate part 722 includes a first part 7221 and a second part 7222. The second part 7222 connects the first part 7221 to the connection frame part 721. Avoidance gaps 7223 are formed on two sides of the second part 7222 of the first electrode plate part 722, and the avoidance gaps 7223 are located between the first part 7221 of the first electrode plate part 722 and the connection frame part 721.

Four corners of a space on the inner side of the connection frame part 721 form corner gaps 724. Each corner gap 724 is located between a first electrode plate part 722 and a second electrode plate part 723 that are adjacent to each other. Each corner gap 724 is connected to an adjacent avoidance gap 7223. At least one limiting hole 725 is formed on outer sides of two straight edges of the connection frame part 721. For example, a straight edge at which the limiting hole 725 is provided is the same as a straight edge connected to the second electrode plate part 723.

Figure 24:
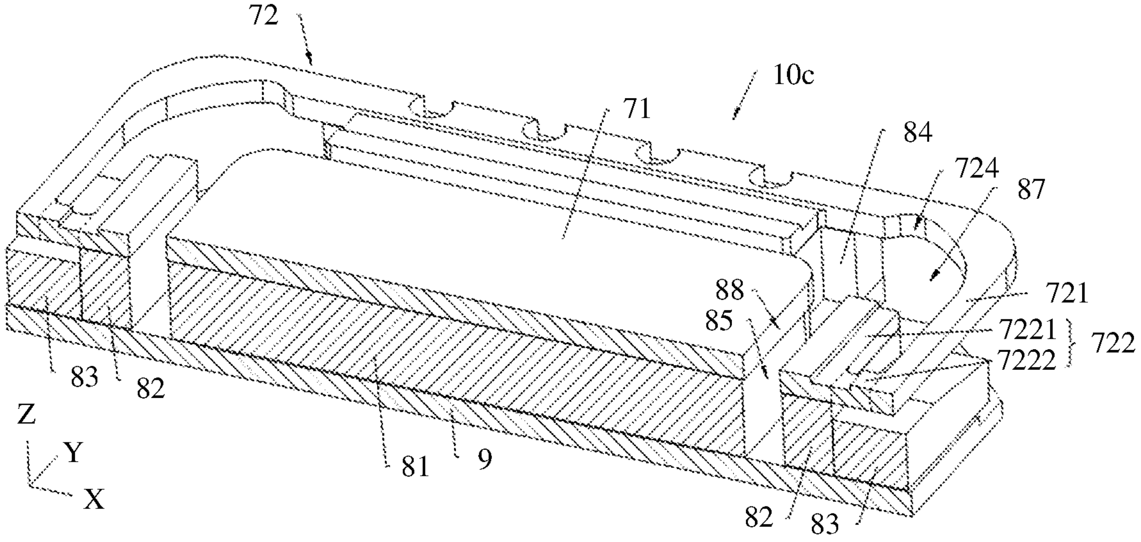
FIG. 24 is a schematic structural diagram of a magnetic circuit assembly shown in FIG. 10 that is cut along H-H.

Refer to both FIG. 10 and FIG. 24. FIG. 24 is a schematic structural diagram of the magnetic circuit assembly 10*c* shown in FIG. 10 that is cut along H-H.

The center electrode plate 71 is fixed to a side, away from the lower electrode plate 9, of the center magnet 81. The center electrode plate 71 may be fixed to the center magnet 81 through bonding. The side electrode plate 72 is located on a side, away from the lower electrode plate 9, of the first side magnet 82, the second side magnet 83, and the third side magnet 84. The side electrode plate 72 is disposed around the center electrode plate 71. The corner gaps 724 of the side electrode plate 72 are connected to the connection spaces 87 on the outer sides of the four corners of the center magnet 81.

The first electrode plate part 722 of the side electrode plate 72 is disposed directly opposite to the first side magnet 82 and the second side magnet 83. For example, the first part 7221 of the first electrode plate part 722 is disposed directly opposite to the first side magnet 82, the second part 7222 of the first electrode plate part 722 is disposed directly opposite to the second side magnet 83, and a straight-edge part, connected to the second part 7222 of the first electrode plate part 722, of the connection frame part 721 of the side electrode plate 72 is disposed directly opposite to the second side magnet 83. The first part 7221 of the first electrode plate part 722 may be fixed to the first side magnet 82 through bonding. A gap is formed between the second side magnet 83, and the second part 7222 of the first electrode plate part 722 and the connection frame part 721. A second gap 88 is formed between the first electrode plate part 722 and the center electrode plate 71. The second gap 88 is connected to the first gap 85. The second gap 88 is further connected to the corner gap 724 of the side electrode plate 72.

Figure 25:
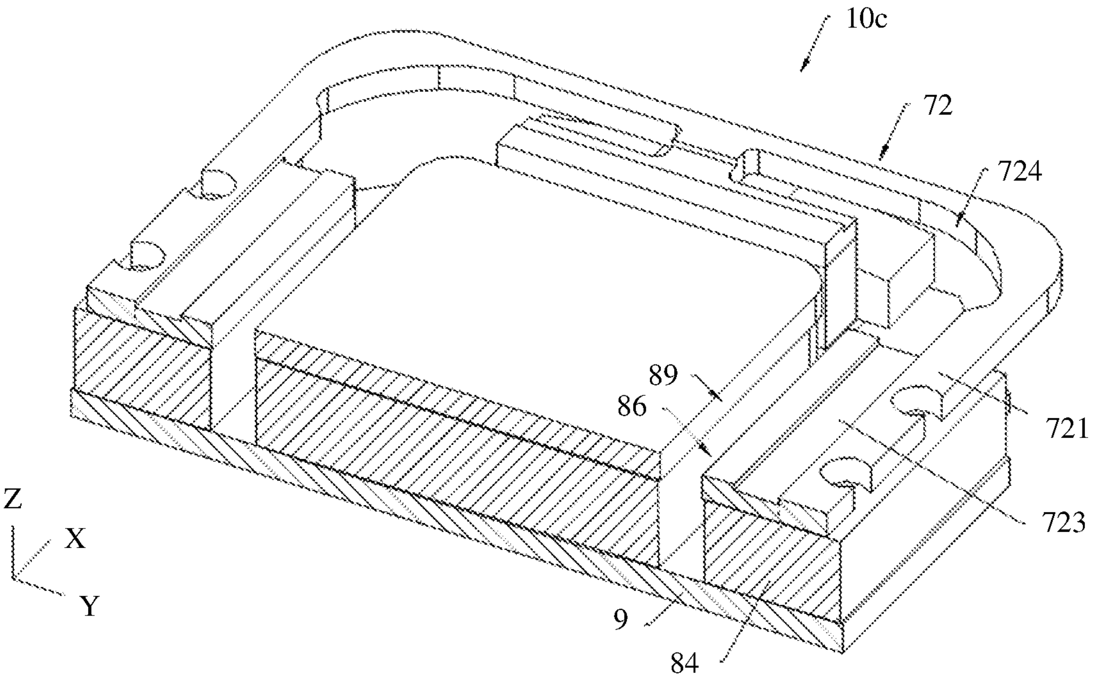
FIG. 25 is a schematic structural diagram of a magnetic circuit assembly shown in FIG. 10 that is cut along I-I.

Refer to both FIG. 10 and FIG. 25. FIG. 25 is a schematic structural diagram of the magnetic circuit assembly 10*c* shown in FIG. 10 that is cut along I-I.

The second electrode plate part 723 of the side electrode plate 72 is disposed directly opposite to the third side magnet 84. A fourth gap 89 is formed between the second electrode plate part 723 and the center electrode plate 71. The fourth gap 89 is connected to the third gap 86. The fourth gap 89 is further connected to the corner gap 724 of the side electrode plate 72. A straight-side part, connected to the second electrode plate part 723, of the connection frame part 721 of the side electrode plate 72 is disposed directly opposite to the third side magnet 84. In this case, the third side magnet 84 fully utilizes a space between the side electrode plate 72 and the lower electrode plate 9, to have a larger size in the width direction Y of the electroacoustic transducer 10, so that the magnetic circuit assembly 10*c* has higher magnetic induction strength.

The following describes a specific location relationship and connection relationship between the basin stand 1 and the components of the vibration assembly 10*b* and the magnetic circuit assembly 10*c* of the electroacoustic transducer 10. It can be understood that the components of the electroacoustic transducer 10 may be arranged as compactly as possible while meeting a requirement for a relative location relationship to meet a performance requirement for the electroacoustic transducer 10, so as to facilitate miniaturization, micro-miniaturization, and portability of the electroacoustic transducer 10.

Figure 26:
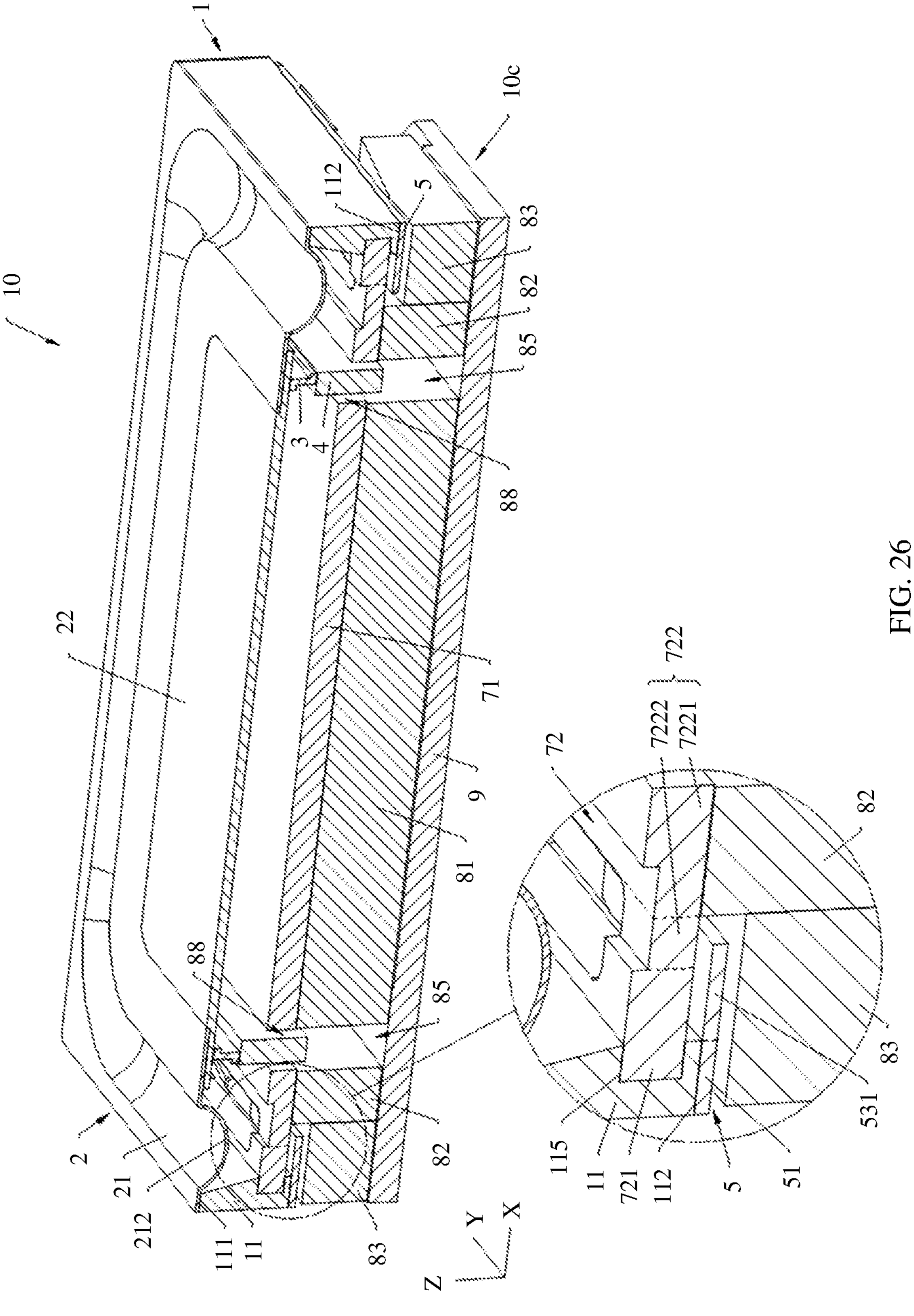
FIG. 26 is a schematic structural diagram of an electroacoustic transducer shown in FIG. 9 that is cut along J-J.
Figure 27:
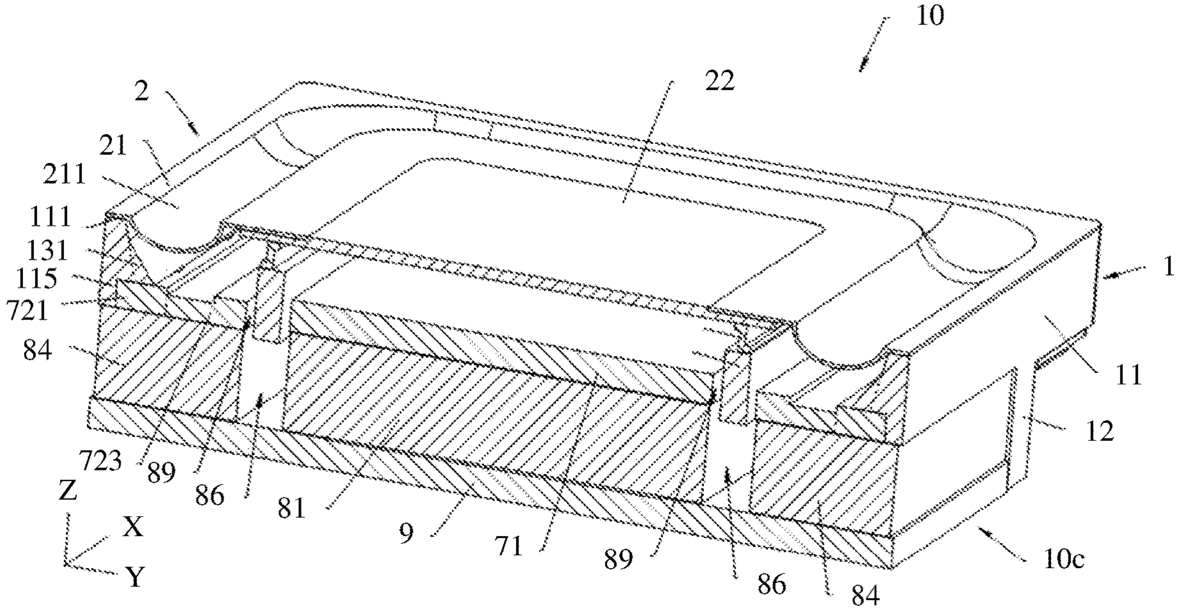
FIG. 27 is a schematic structural diagram of an electroacoustic transducer shown in FIG. 9 that is cut along K-K.

Refer to both FIG. 26 and FIG. 27. FIG. 26 is a schematic structural diagram of the electroacoustic transducer 10 shown in FIG. 9 that is cut along J-J, and FIG. 27 is a schematic structural diagram of the electroacoustic transducer 10 shown in FIG. 9 that is cut along K-K.

A periphery of the voice diaphragm 2 is fixed to the first face 111 of the frame 11 of the basin stand 1. For example, the vibration diaphragm 21 of the voice diaphragm 2 may be fixed to the first face 111 of the frame 11 of the basin stand 1 through bonding. A vibration direction of the voice diaphragm 2 is parallel to the thickness direction Z of the electroacoustic transducer 10. A space on an inner side of the frame 11 forms a shape that is narrow at the bottom and wide at the top, so that the vibrating part 212 of the vibration diaphragm 21 has a larger vibration space, thereby helping the voice diaphragm 2 implement large-amplitude vibration. The voice coil 4 is located on the inner side of the frame 11, and one end of the voice coil 4 is fixedly connected to the voice diaphragm 2. For example, the voice coil 4 is connected to the voice diaphragm 2 through the connection frame 3. The connection frame 3 is fixedly connected to the dome 22 of the voice diaphragm 2. When the structure shown in FIG. 15 is used for the voice diaphragm 2, the connection frame 3 is fixedly connected to the vibration diaphragm 21.

The lower electrode plate 9 is fixedly connected to the plurality of legs 12 of the basin stand 1 and is spaced from the frame it Tail ends of the plurality of legs 12 of the basin stand 1 may be accommodated in the clamping spaces 9311 (as shown in FIG. 22) of the lower electrode plate 9, and are fixed, through bonding, to surfaces, facing the clamping spaces 9311, of the lower electrode plate 9. A vertical direction of the lower electrode plate 9 is parallel to the thickness direction of the electroacoustic transducer.

The center magnet 81, the two first side magnets 82, the two second side magnets 83, and the two third side magnets 84 are all fixed to a side, facing the frame 11, of the lower electrode plate 9. The two first side magnets 82 are located on two sides of the center magnet 81, the two second side magnets 83 are located on two sides of the center magnet 81, and the first side magnet 82 is located between the second side magnet 83 and the center magnet 81. An end, away from the voice diaphragm 2, of the voice coil 4 is partially located in the first gap 85 between the first side magnet 82 and the center magnet 81. The two third side magnets 84 are located on the other two sides of the center magnet 81. The end, away from the voice diaphragm 2, of the voice coil 4 is partially located in the third gap 86 between the third side magnet 84 and the center magnet 81. The center electrode plate 71 is fixed to a side, facing the voice diaphragm 2, of the center magnet 81. The center electrode plate 71 is located between the center magnet 81 and the voice diaphragm 2.

The electroacoustic transducer 10 is supported between the frame 11 and the lower electrode plate 9 by the plurality of legs 12. The plurality of legs 12 can play a supporting and connecting role while occupying a quite small space between the frame 11 and the lower electrode plate 9, so that a comparatively large magnetic circuit arrangement space is formed between the frame 11 and the lower electrode plate 9, and the space can be fully utilized for the magnetic circuit assembly 10*c* to arrange magnets, thereby achieving comparatively high magnetic induction strength and comparatively high sensitivity of the electroacoustic transducer 10.

Figure 28:
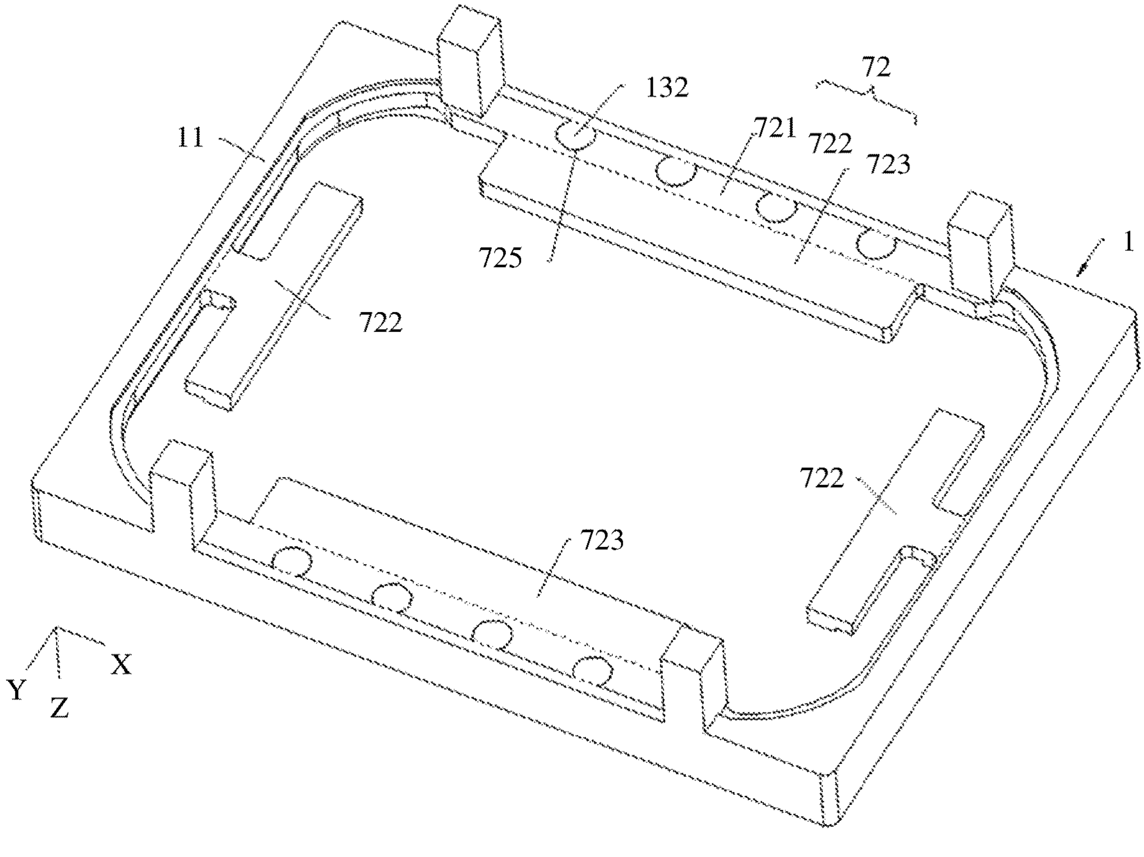
FIG. 28 is a schematic structural assembly diagram of a side electrode plate and a basin stand of an electroacoustic transducer shown in FIG. 9.

Refer to all of FIG. 26 to FIG. 28. FIG. 28 is a schematic structural assembly diagram of the side electrode plate 72 and the basin stand 1 of the electroacoustic transducer 10 shown in FIG. 9.

The side electrode plate 72 is fixed to the inner side of the frame 11. For example, the connection frame part 721 of the side electrode plate 72 may be clamped into the fixing groove 115 of the frame 11, the connection frame part 721 is partially located in the fixing groove 115 and partially located outside the fixing groove 115, and the first electrode plate part 722 and the second electrode plate part 723 of the side electrode plate 72 are located outside the fixing groove 115. As shown in FIG. 27, the limiting strip 131 of the limiting block 13 of the basin stand 1 abuts against the connection frame part 721 of the side electrode plate 72. As shown in FIG. 28, the at least one limiting leg 132 of the limiting block 13 is clamped into the at least one limiting hole 725 of the connection frame part 721 in a one-to-one correspondence.

As shown in FIG. 26, the two first electrode plate parts 722 of the side electrode plate 72 are respectively located on two sides of the center electrode plate 71, the second gap 88 is formed between the first electrode plate part 722 and the center electrode plate 71, the second gap 88 is connected to the first gap 85, and the voice coil 4 is partially located in the second gap 88. As shown in FIG. 27, the two second electrode plate parts 723 of the side electrode plate 72 are respectively located on the other two sides of the center electrode plate 71, the fourth gap 89 is formed between the second electrode plate part 723 and the center electrode plate 71, the fourth gap 89 is connected to the third gap 86, and the voice coil 4 is partially located in the fourth gap 89.

Figure 29:
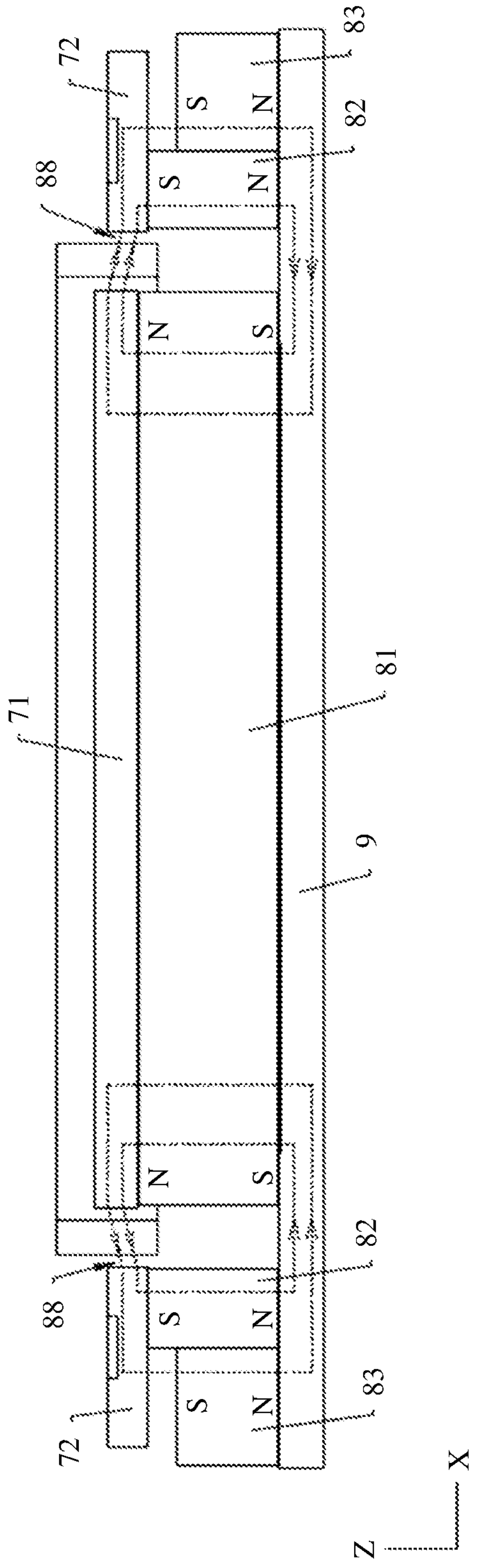
FIG. 29 is a schematic diagram of a magnetic circuit assembly and a voice coil shown in FIG. 26.
Figure 30:
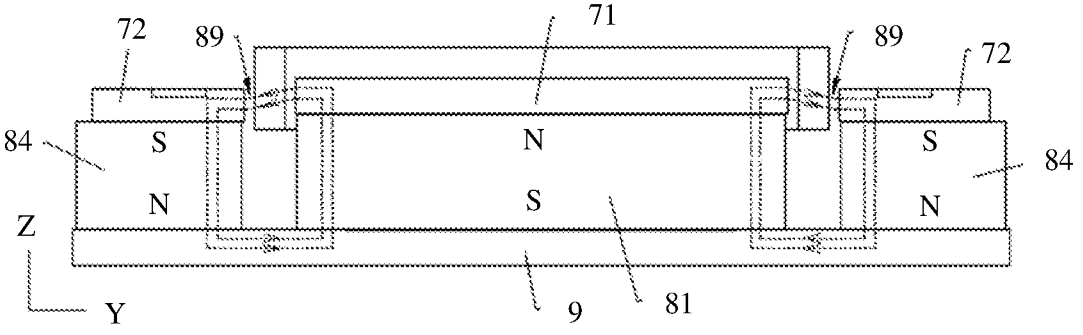
FIG. 30 is a schematic diagram of a magnetic circuit assembly and a voice coil shown in FIG. 27.

Refer to both FIG. 29 and FIG. 30. FIG. 29 is a schematic diagram of the magnetic circuit assembly 10*c* and the voice coil 4 shown in FIG. 26, and FIG. 30 is a schematic diagram of the magnetic circuit assembly 10*c* and the voice coil 4 shown in FIG. 27.

For example, an end, close to the center electrode plate 71, of the center magnet 81 is an N pole; and an end, close to the lower electrode plate 9, of the center magnet 81 is an S pole. An end, close to the side electrode plate 72, of each of the first side magnet 82, the second side magnet 83, and the third side magnet 84 is an S pole; and an end, close to the lower electrode plate 9, of each of the first side magnet 82, the second side magnet 83, and the third side magnet 84 is an N pole. Paths of magnetic lines (shown by dashed lines in FIG. 29 and FIG. 30) are as follows: "the N pole of the center magnet 81—the center electrode plate 71—the second gap 88—the side electrode plate 72—the S pole of the first side magnet 82—the N pole of the first side magnet 82—the lower electrode plate 9—the S pole of the center magnet 81", "the N pole of the center magnet 81—the center electrode plate 71—the second gap 88—the side electrode plate 72—the S pole of the second side magnet 83—the N pole of the second side magnet 83—the lower electrode plate 9—the S pole of the center magnet 81", and "the N pole of the center magnet 81—the center electrode plate 71—the fourth gap 89—the side electrode plate 72—the S pole of the third side magnet 84—the N pole of the third side magnet 84—the lower electrode plate 9—the S pole of the center magnet 81". The voice coil 4 is partially located in the second gap 88 and the fourth gap 89, and a magnetic assembly forms a magnetic field in the second gap 88 and the fourth gap 89. Therefore, when the voice coil 4 is electrically connected, an ampere force is produced to drive the voice coil 4 and the voice diaphragm 2 connected to the voice coil 4 to vibrate.

In this embodiment, the magnetic circuit assembly 10*c* is designed by using a structure with seven magnetic circuits, so that magnetic induction strength of the second gap 88 is quite high, and the magnetic circuit assembly 10*c* has sufficiently high magnetic induction strength, thereby increasing a driving force for the magnetic circuits. When the voice coil 4 is electrically connected, the voice coil 4 is subject to a larger ampere force, and the electroacoustic transducer 10 has higher sensitivity.

In some other embodiments, an end, close to the center electrode plate 71, of the center magnet 81 is an S pole; and an end, close to the lower electrode plate 9, of the center magnet 81 is an N pole. An end, close to the side electrode plate 72, of each of the first side magnet 82, the second side magnet 83, and the third side magnet 84 is an N pole; and an end, close to the lower electrode plate 9, of each of the first side magnet 82, the second side magnet 83, and the third side magnet 84 is an S pole.

Still referring to FIG. 26 and FIG. 27, the voice coil 4 is connected to the voice diaphragm 2 through the connection frame 3. Therefore, a spacing between the voice diaphragm 2 and an end part, away from the voice diaphragm 2, of the voice coil 4 is comparatively large, so that the voice coil 4 can be fully inserted in the magnetic circuit assembly 10*c*, and a magnetic field generated by the magnetic circuit assembly 10*c* effectively acts on the voice coil 4. In addition, a spacing between the voice diaphragm 2 and the magnetic circuit assembly 10*c* is comparatively large, and a vibration space for the voice diaphragm 2 is comparatively large, thereby helping the voice diaphragm 2 implement large-amplitude vibration.

Figure 31:
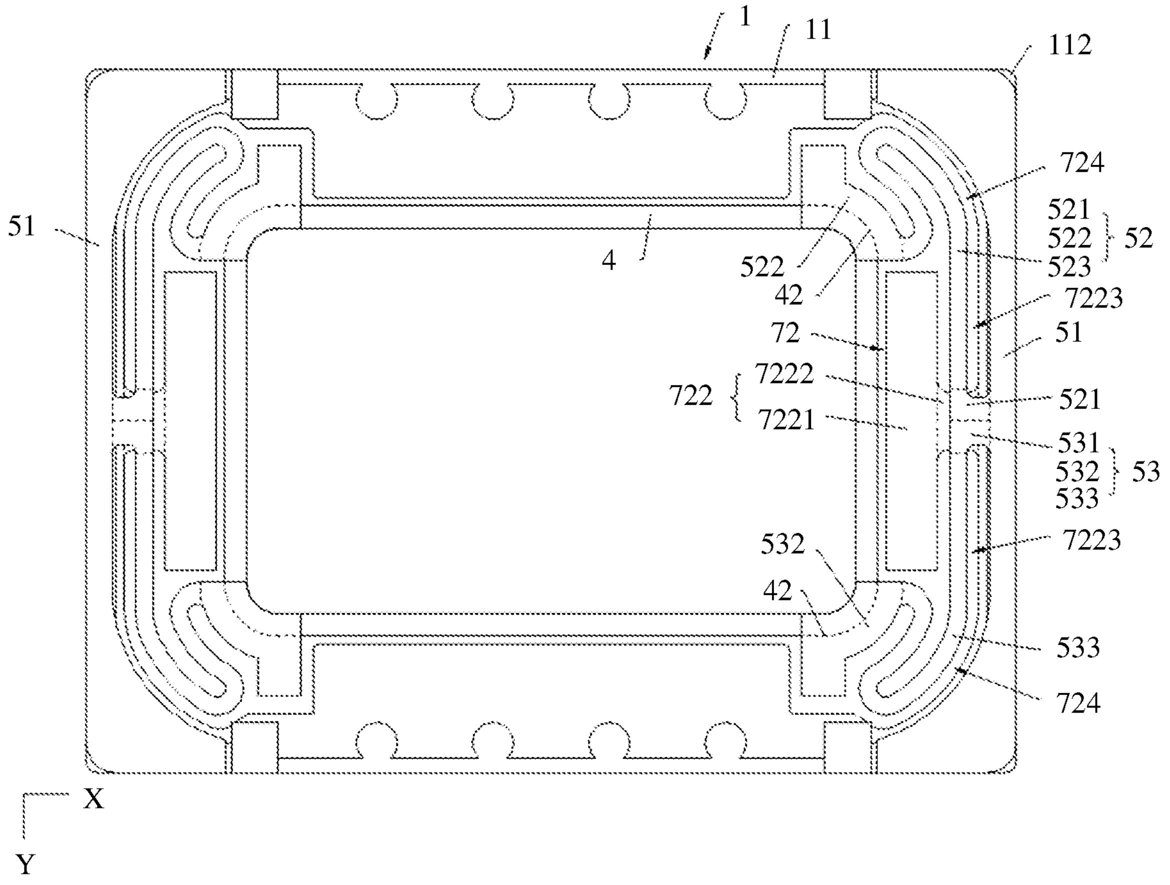
FIG. 31 is a partial schematic structural diagram of an electroacoustic transducer shown in FIG. 9.

Refer to both FIG. 26 and FIG. 31. FIG. 31 is a partial schematic structural diagram of the electroacoustic transducer 10 shown in FIG. 9. FIG. 31 shows a location relationship between the flexible printed circuit board 5, the basin stand 1, and the side electrode plate 72.

The two flexible printed circuit boards 5 are both partially fixed to the second face 112 of the frame 11 of the basin stand 1, and are symmetrically distributed at intervals. The tail ends (522 and 532) of the two stubs of the flexible printed circuit board 5 are fixedly connected to two round corners 42 of the voice coil 4 respectively. For example, the body 51 of the flexible printed circuit board 5 is fixedly connected to the second face 112 of the frame 11, the first stub 52 and the second stub 53 of the flexible printed circuit board 5 are suspended relative to the frame 11, and the tail end 522 of the first stub 52 of the flexible printed circuit board 5 and the tail end 532 of the second stub 53 of the flexible printed circuit board 5 are fixedly connected to two round corners 42 of the voice coil 4 respectively.

The flexible printed circuit board 5 and the side electrode plate 72 are spaced from each other. For example, the body 51 of the flexible printed circuit board 5 and the side electrode plate 72 may be stacked at intervals in the thickness direction Z of the electroacoustic transducer 10, and the body 51 of the flexible printed circuit board 5 and the side electrode plate 72 that are fixed to the basin stand 1 are separated by some structures of the basin stand 1.

The head end 521 of the first stub 52 of the flexible printed circuit board 5 directly faces the second part 7222 of the first electrode plate part 722 of the side electrode plate 72. The head end 521 of the first stub 52 and the second part 7222 of the first electrode plate pall 722 are spaced from each other in the thickness direction Z of the electroacoustic transducer 10. The connection section 523 and the tail end 522 of the first stub 52 directly face an avoidance gap 7223 and a corner gap 724 on one side of the second pall 7222 of the first electrode plate part 722. When the first stub 52 vibrates under driving by the voice coil 4, an amplitude of the first stub 52 gradually decreases from the tail end 522 to the head end 521, and an amplitude of the head end 521 of the first stub 52 is quite small, or the head end 521 does not vibrate. Therefore, the first stub 52 can fully utilize the gaps of the side electrode plate 72 for vibration. In addition, the first stub 52 does not collide with the side electrode plate 72 during vibration, thereby helping improve reliability of the electroacoustic transducer 10.

The head end 531 of the second stub 53 of the flexible printed circuit board 5 directly faces the second part 7222 of the first electrode plate part 722 of the side electrode plate 72. The head end 531 of the second stub 53 and the second part 7222 of the first electrode plate part 722 are spaced from each other in the thickness direction Z of the electroacoustic transducer 10. The connection section 533 and the tail end 532 of the second stub 53 directly face an avoidance gap 7223 and a corner gap 724 on the other side of the second part 7222 of the first electrode plate part 722. When the second stub 53 vibrates under driving by the voice coil 4, an amplitude of the second stub 53 gradually decreases from the tail end 532 to the head end 531, and an amplitude of the head end 531 of the second stub 53 is quite small, or the head end 531 does not vibrate. Therefore, the second stub 53 can fully utilize the gaps of the side electrode plate 72 for vibration. In addition, the second stub 53 does not collide with the side electrode plate 72 during vibration, thereby helping improve reliability of the electroacoustic transducer 10.

Figure 32:
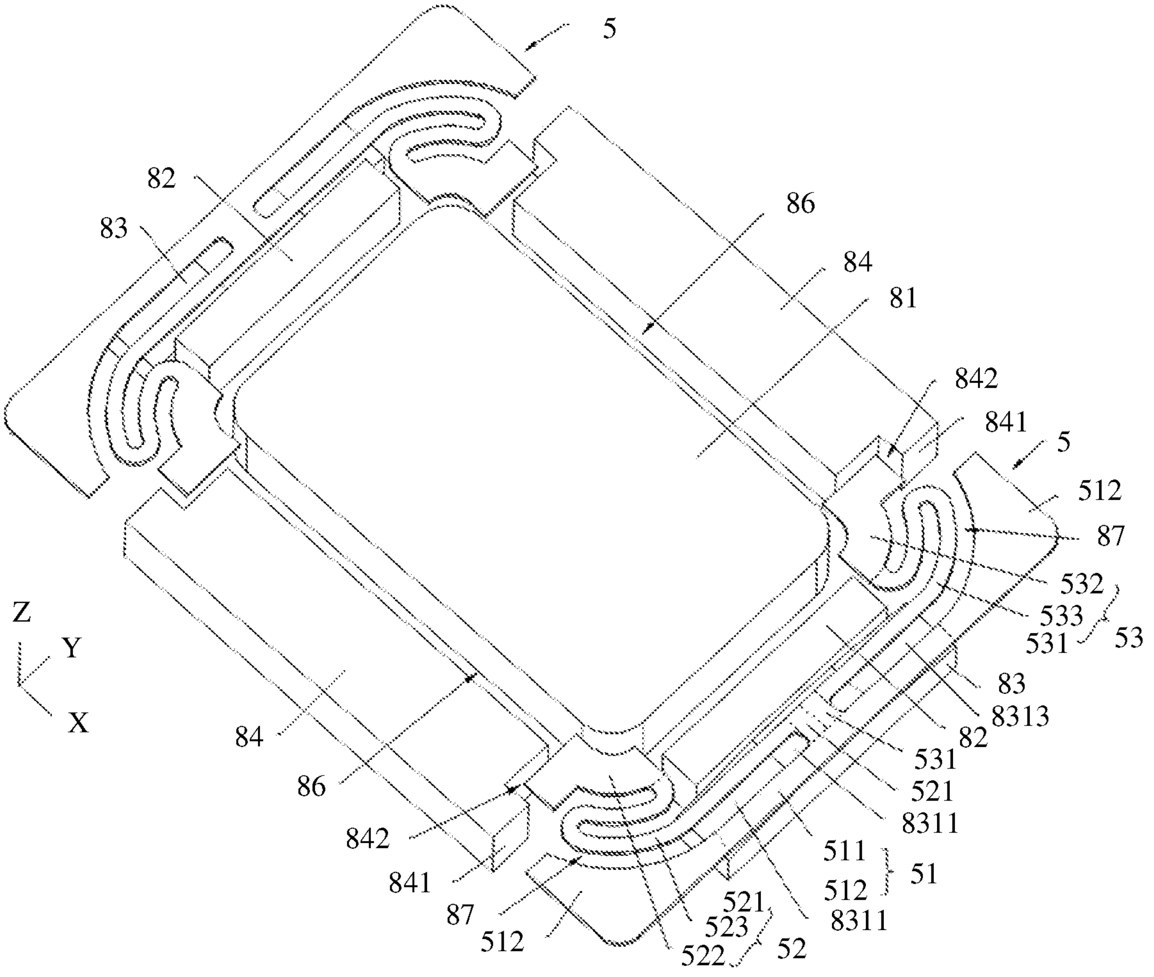
FIG. 32 is another partial schematic structural diagram of an electroacoustic transducer shown in FIG. 9.

Refer to both FIG. 26 and FIG. 32. FIG. 32 is another partial schematic structural diagram of the electroacoustic transducer 10 shown in FIG. 9. FIG. 32 shows a location relationship between the flexible printed circuit board 5 and the magnets of the magnetic circuit assembly 10*c*.

The two flexible printed circuit boards 5 are symmetrically arranged on two sides of the center magnet 81. The flexible printed circuit board 5 is located on a side, away from the center magnet 81, of the first side magnet 82. In other words, the first side magnet 82 is located between the flexible printed circuit board 5 and the center magnet 81. The flexible printed circuit board 5 is located between the second side magnet 83 and the voice diaphragm 2. In other words, the second side magnet 83 is located between the flexible printed circuit board 5 and the lower electrode plate 9.

Compared with a conventional electroacoustic transducer in which flexible printed circuit boards are arranged on a side magnet and a center magnet, in the electroacoustic transducer 10 in this embodiment, a relative location relationship between the flexible printed circuit board 5 and the first side magnet 82 is changed, so that the gap between the first side magnet 82 and the center magnet 81 is narrower, and the magnetic circuit assembly 10*c* has higher magnetic induction strength, thereby helping improve sensitivity of the electroacoustic transducer 10. In addition, in the electroacoustic transducer 10, a pair of second side magnets 83 is additionally disposed in a space between the flexible printed circuit board 5 and the lower electrode plate 9, so that magnetic induction strength of the magnetic circuit assembly 10*c* is effectively improved, a driving force for the magnetic circuit assembly ioc is significantly increased, and the electroacoustic transducer 10 has higher sensitivity.

Through simulation, in the electroacoustic transducer 10 in this embodiment of this application, a conventional structure with five magnetic circuits (including one center magnet and four side magnets) is modified into a structure with seven magnetic circuits. (including one center magnet and six side magnets), so that sensitivity of the electroacoustic transducer 10 can be improved by 0.2 dB to 0.8 dB.

In some embodiments, the first side magnet 82 is spaced from the flexible printed circuit board 5. For example, on an XY plane of the electroacoustic transducer 10 (that is, a plane on which the length direction X and the width direction Y are located), a spacing between the first side magnet 82 and the flexible printed circuit board 5 may range from 0.1 millimeters to 0.5 millimeters. The second side magnet 83 is spaced from the flexible printed circuit board 5. In the thickness direction Z of the electroacoustic transducer 10, a spacing between the flexible printed circuit board 5 and the second side magnet 83 may range from 0.1 millimeters to 0.7 millimeters. It can be understood that the spacing between the flexible printed circuit board 5 and the first side magnet 82 and the spacing between the flexible printed circuit board 5 and the second side magnet 83 may be designed according to a specific requirement of the electroacoustic transducer 10. This is not strictly limited in this embodiment of this application.

For example, in the thickness direction Z of the electroacoustic transducer 10, a height of the first side magnet 82 is greater than a height of the second side magnet 83. In this embodiment, because the first side magnet 82 and the flexible printed circuit board 5 are not stacked in the thickness direction Z of the electroacoustic transducer 10, the height of the first side magnet 82 may be greater than the height of the second side magnet 83, to fully utilize a space and improve magnetic induction strength of the magnetic circuit assembly 10*c*, so that the electroacoustic transducer 10 has comparatively high sensitivity. In some embodiments, in the thickness direction Z of the electroacoustic transducer 10, the height of the first side magnet 82 may be greater than a sum of the height of the second side magnet 83, a height of the flexible printed circuit board 5, and the spacing between the second side magnet 83 and the flexible printed circuit board 5.

In some embodiments, as shown in FIG. 32, the third side magnet 84 is spaced from the flexible printed circuit board 5. For example, each of two ends of the third side magnet 84 is close to a tail end (522 or 532) of a stub of the flexible printed circuit board 5. An end face 841 of each of the two ends of the third side magnet 84 is partially concave to form an avoidance region 842. The avoidance region 842 is connected to the third gap 86. The tail end (522 or 532) of the stub of the flexible printed circuit board 5 is partially located in the avoidance region 842, and forms a gap with a wall surface of the avoidance region 842.

Figure 33:
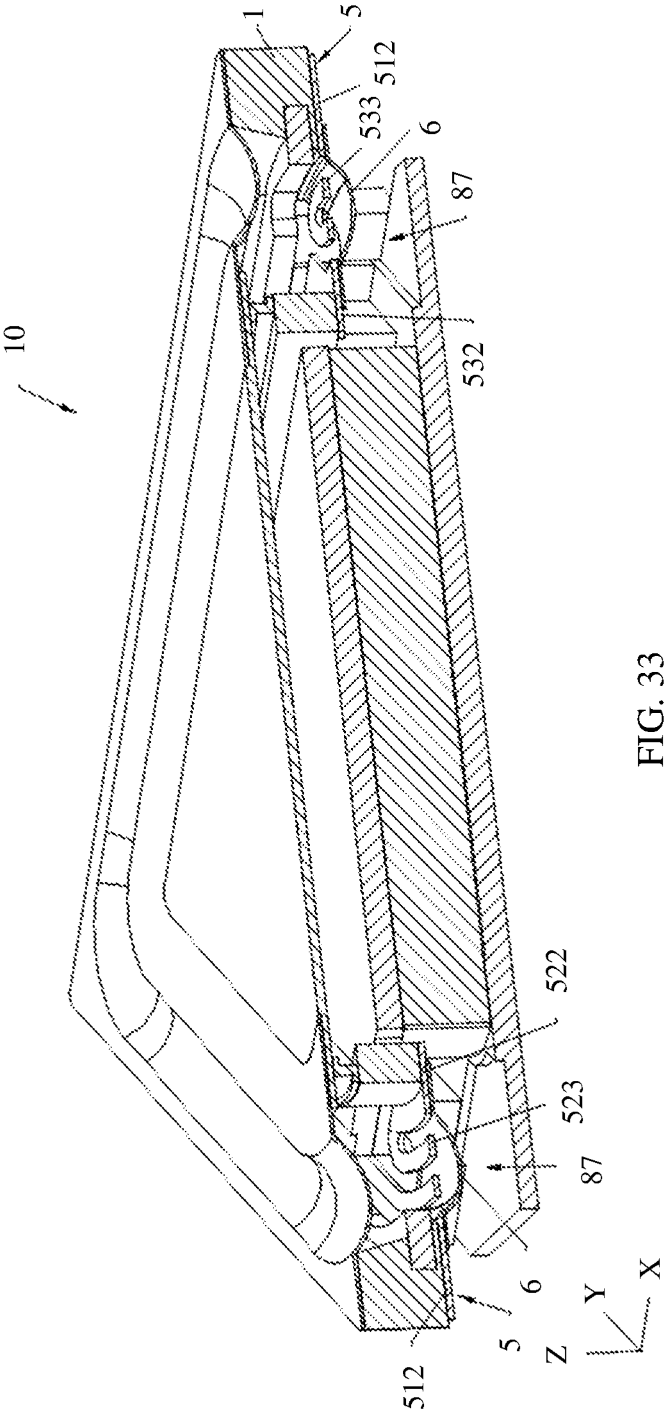
FIG. 33 is a schematic structural diagram of an electroacoustic transducer shown in FIG. 9 that is cut along L-L.

Refer to both FIG. 32 and FIG. 33. FIG. 33 is a schematic structural diagram of the electroacoustic transducer 10 shown in FIG. 9 that is cut along L-L.

For example, the body 51 of the flexible printed circuit board 5 is fixed to the basin stand 1, and the tail end 522 of the first stub 52 of the flexible printed circuit board 5 and the tail end 532 of the second stub 53 of the flexible printed circuit board 5 are fixedly connected to two round corners 42 of the voice coil 4 respectively. When the voice coil 4 vibrates, the tail end 522 of the first stub 52 and the tail end 532 of the second stub 53 vibrate with the voice coil 4, amplitudes gradually decrease from the tail end 522 of the first stub 52 to the connection section 523 of the first stub 52 to the head end 521 of the first stub 52, amplitudes gradually decrease from the tail end 532 of the second stub 53 to the connection section 533 of the second stub 53 to the head end 531 of the second stub 53, and amplitudes of the head end 521 of the first stub 52 and the head end 531 of the second stub 53 are quite small.

The two end parts 512 of the body 51 of the flexible printed circuit board 5 are disposed directly opposite to the connection spaces 87 of the magnetic circuit assembly 10*c*, and the middle part 511 of the body 51 is disposed directly opposite to the second side magnet 83. The head end 521 of the first stub 52 and the head end 531 of the second stub 53 are disposed directly opposite to the second side magnet 83. A part that is of the connection section 523 of the first stub 52 and that is close to the head end 521 is disposed directly opposite to the second side magnet 83, and a part that is of the connection section 523 of the first stub 52 and that is away from the head end 521 is disposed directly opposite to the connection space 87. A part that is of the connection section 533 of the second stub 53 and that is close to the head end 531 is disposed directly opposite to the second side magnet 83, and a part that is of the connection section 533 of the second stub 53 and that is away from the head end 531 is disposed directly opposite to the connection space 87. The tail end 522 of the first stub 52 and the tail end 532 of the second stub 53 are disposed directly opposite to the connection space 87. The first stub 52 and the second stub 53 of the flexible printed circuit board 5 can vibrate by using the connection space 87 of the magnetic circuit assembly 10*c*.

In this embodiment, the second side magnet 83 is disposed directly opposite to the head end 521 of the first stub 52, the head end 531 of the second stub 53, and the middle part 511 of the body 51. Therefore, the second side magnet 83 can fully utilize a space under the flexible printed circuit board 5 in the length direction X of the electroacoustic transducer 10, so that the second side magnet 83 has a comparatively large size, to effectively improve magnetic induction strength of the magnetic circuit assembly 10*c*.

The second side magnet 83 directly faces the head end 521 of the first stub 52 with a comparatively small amplitude, a part of the connection section 523 that is close to the head end 521, the head end 531 of the second stub 53, and a part of the connection section 533 that is close to the head end 531. Therefore, the second side magnet 83 can fully utilize a space under the flexible printed circuit board 5 in the width direction Y of the electroacoustic transducer 10, so that the second side magnet 83 has a comparatively large size, to effectively improve magnetic induction strength of the magnetic circuit assembly 10*c*.

As shown in FIG. 33, one end of the auxiliary vibration diaphragm 6 is connected to the end part 512 of the body 51 of the flexible printed circuit board 5, and the other end is connected to a tail end (522 or 532) of a stub of the flexible printed circuit board 5. The auxiliary vibration diaphragm 6 is located in the connection space 87 of the magnetic circuit assembly 10*c*, and vibrates in the connection space 87.

The electroacoustic transducer 10 includes two compliant systems. The voice diaphragm 2 is a first compliant system located above the voice coil 4, and the flexible printed circuit board 5 and the auxiliary vibration diaphragm 6 are a second compliant system located under the voice coil 4. The two compliant systems vibrate with the voice coil 4, to suppress rolling vibration of the voice coil 4, and ensure comparatively good sound quality of the electroacoustic transducer 10. A compliance coefficient of the compliant system is a reciprocal of an elasticity coefficient, and a component with a higher compliance coefficient is more likely to deform under a force.

For example, in the two compliant systems, the voice diaphragm 2 has comparatively high hardness and comparatively low compliance, so that the voice diaphragm 2 can smoothly push air to produce sound; and the flexible printed circuit board 5 and the auxiliary vibration diaphragm 6 have comparatively low hardness and comparatively high compliance, so that total hardness of the two compliant systems is appropriate, thereby ensuring a comparatively large sound volume of the electroacoustic transducer 10. Hardness of the auxiliary vibration diaphragm 6 is greater than hardness of the flexible printed circuit board 5, so that the second compliant system has comparatively high hardness and stability, to better suppress swinging of the voice coil 4, and reduce a rolling range of the voice coil 4.

Figure 34:
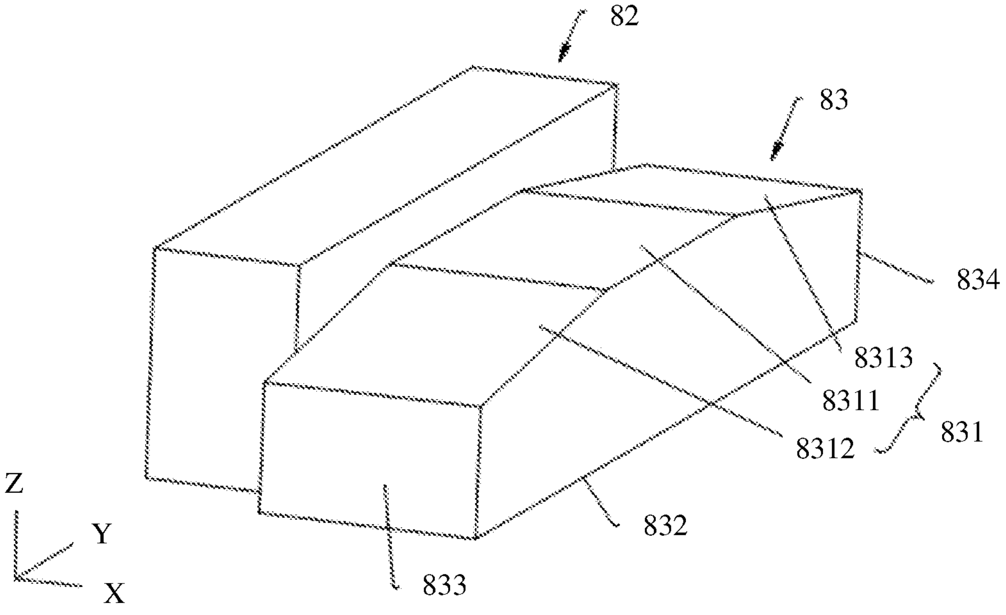
FIG. 34 is a schematic structural diagram of a first side magnet and a second side magnet shown in FIG. 32.

Refer to both FIG. 32 and FIG. 34. FIG. 34 is a schematic structural diagram of the first side magnet 82 and the second side magnet 83 shown in FIG. 32.

In this embodiment of this application, in the electroacoustic transducer 10, a shape of the second side magnet 83 is designed based on vibration amplitudes of the first stub 52 and the second stub 53 of the flexible printed circuit board 5. For example, the second side magnet 83 includes a first surface 831 and a second surface 832 that are disposed opposite to each other. The first surface 831 faces the flexible printed circuit board 5. The second surface 832 is fixed to the lower electrode plate 9 (as shown in FIG. 23), and the second surface 832 is planar. The first surface 831 includes a first plane 8311, a first inclined plane 8312, and a second inclined plane 8313. The first plane 8311 directly faces the head end 521 of the first stub 52 and the head end 531 of the second stub 53, and the first plane 8311 is parallel to the second surface 832. The first inclined plane 8312 faces the connection section 523 of the first stub 52, one end of the first inclined plane 8312 is connected to one end of the first plane 8311, and the other end of the first inclined plane 8312 extends in a direction toward the second surface 832. The second inclined plane 8313 faces the connection section 523 of the first stub 52, one end of the second inclined plane 8313 is connected to the other end of the first plane 8311, and the other end of the second inclined plane 8313 extends in a direction toward the second surface 832.

In other words, the second side magnet 83 has a structure in which the middle is high and heights on two sides gradually decrease. A location in the middle that is high directly faces a part, with a small amplitude, of the flexible printed circuit board 5. A location on the two sides on which the heights gradually decrease directly faces a part, with a gradually increasing amplitude, of the flexible printed circuit board 5. Therefore, an abundant vibration space can be reserved for the flexible printed circuit board 5, and further, a non-interfering height can be fully utilized, and a magnet size can be increased, so that the electroacoustic transducer 10 has higher magnetic induction strength. For example, a size of the second side magnet 83 in the width direction Y of the electroacoustic transducer 10 may range from 2 millimeters to 10 millimeters.

Alternatively, the first plane 8311 may directly face another part, with a comparatively small amplitude, of the flexible printed circuit board 5, for example, the part that is of the connection section 523 of the first stub 52 and that is close to the head end 521, and the part that is of the connection section 533 of the second stub 53 and that is close to the head end 531. In this case, the second side magnet 83 has a larger volume, and magnetic induction strength of the electroacoustic transducer 10 can be improved.

For example, the second inclined plane 8313 and the first inclined plane 8312 may be symmetrically disposed, and the symmetrical planes are perpendicular to the second surface 832. The second inclined plane 8313 and the first inclined plane 8312 may be symmetrical relative to the second reference plane. Because the first stub 52 and the second stub 53 of the flexible printed circuit board 5 are symmetrically disposed, and vibration amplitudes of the first stub 52 and the second stub 53 are symmetrical, the second inclined plane 8313 and the first inclined plane 8312 that are symmetrically disposed can better match vibration statuses of the first stub 52 and the second stub 53.

The first side magnet 82 is in a cuboid shape. The second side magnet 83 further includes two side surfaces (833 and 834) that are disposed opposite to each other. The side surface 833 connects one end of the second surface 832 to an end, away from the first plane 8311, of the first inclined plane 8312. The side surface 834 connects the other end of the second surface 832 to an end, away from the first plane 8311, of the second inclined plane 8313.

As shown in FIG. 34, in some embodiments, the first side magnet 82 and the second side magnet 83 are designed in a separated manner, and may be fixed to each other by bonding adjacent surfaces. Because the second side magnet 83 and the first side magnet 82 have different shapes on a YZ plane (that is, a plane on which the width direction Y and the thickness direction Z of the electroacoustic transducer 10 are located), the second side magnet 83 and the first side magnet 82 are separately molded and then assembled to form an integrated structure, so that costs can be reduced, and costs of the electroacoustic transducer 10 are lower.

In some other embodiments, the first side magnet 82 and the second side magnet 83 may be alternatively an integrated irregularly-shaped magnet.

Figure 35:
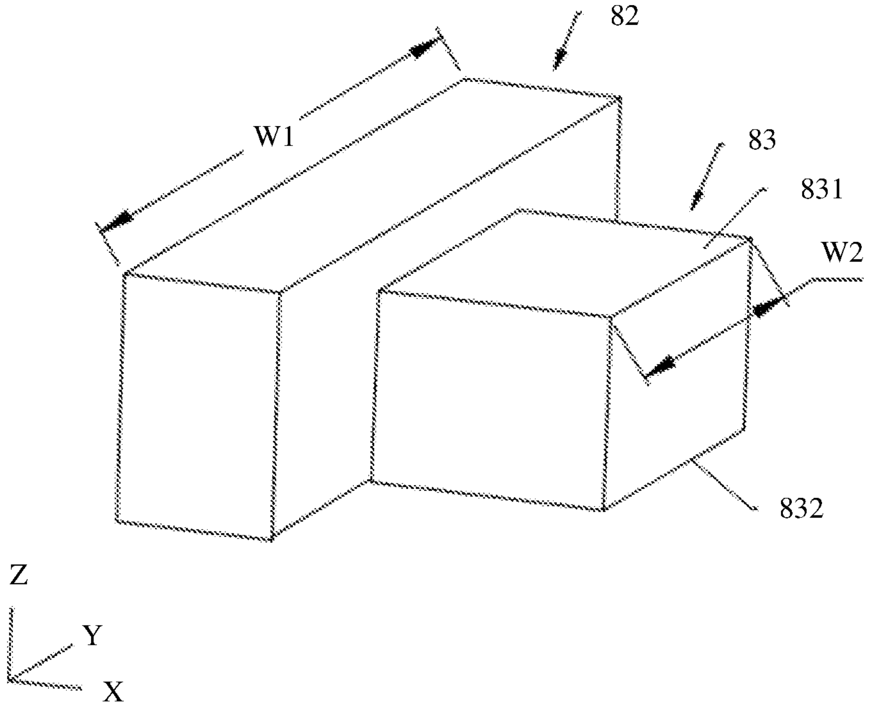
FIG. 35 is a schematic structural diagram of a first side magnet and a second side magnet shown in FIG. 32 according to another embodiment.
Figure 36:
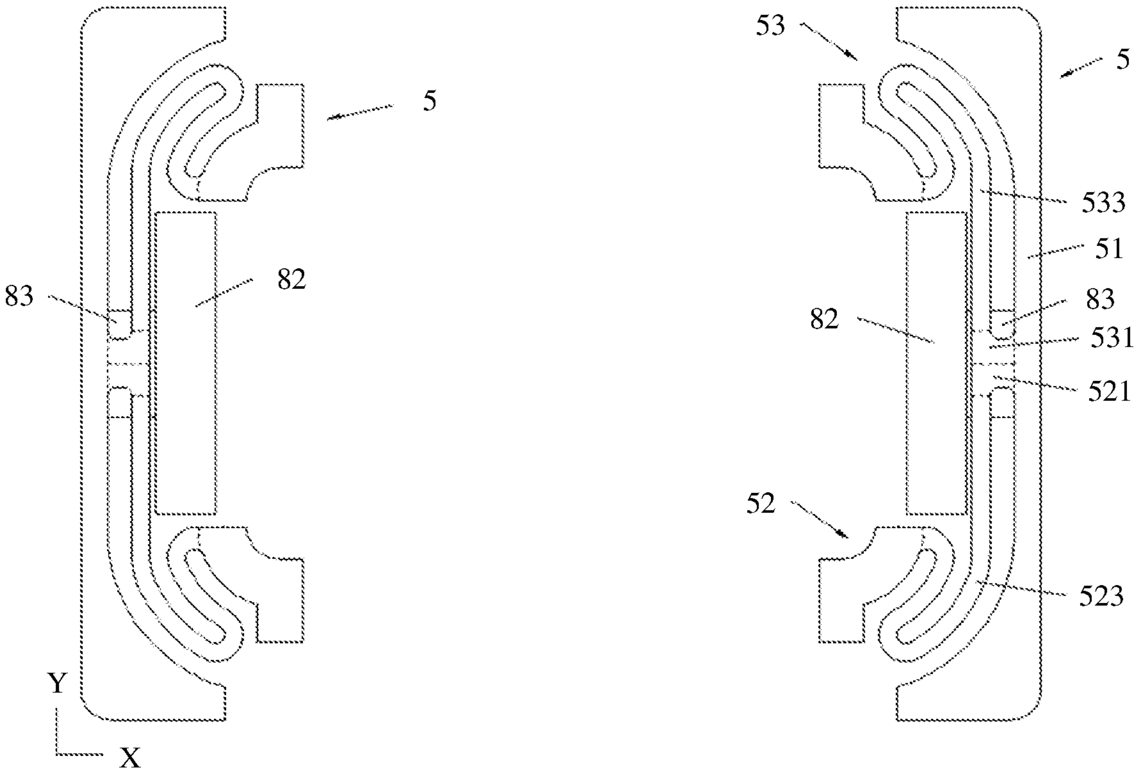
FIG. 36 is a schematic diagram of a location relationship between a first side magnet and a second side magnet shown in FIG. 35 and a flexible printed circuit board.

Refer to both FIG. 35 and FIG. 36. FIG. 35 is a schematic structural diagram of the first side magnet 82 and the second side magnet 83 shown in FIG. 32 according to another embodiment, and FIG. 36 is a schematic diagram of a location relationship between the first side magnet 82 and the second side magnet 83 shown in FIG. 35 and the flexible printed circuit board 5. The following mainly describes differences between this embodiment and the foregoing embodiments, and most content that is the same in the embodiments is not described again.

A size of the second side magnet 83 in the width direction Y of the electroacoustic transducer 10 is a second width W2. A size of the first side magnet 82 in the width direction Y of the electroacoustic transducer 10 is a first width W1. The second width W2 is less than the first width W1.

In this embodiment, the width of the second side magnet 83 in the width direction Y of the electroacoustic transducer 10 is comparatively small, and the second side magnet 83 directly faces a part, with a small amplitude, of the flexible printed circuit board 5, for example, the head end 521 of the first stub 52 and the head end 531 of the second stub 53. Spaces on two sides of the second side magnet 83 in the width direction Y of the electroacoustic transducer 10 may be used as vibration spaces for the flexible printed circuit board 5, and directly face a part, with a comparatively large amplitude, of the flexible printed circuit board 5, for example, the connection section 523 of the first stub 52 and the connection section 533 of the second stub 53.

Alternatively, the second side magnet 83 may directly face another part, with a comparatively small amplitude, of the flexible printed circuit board 5, for example, the part that is of the connection section 523 of the first stub 52 and that is close to the head end 521, and the part that is of the connection section 533 of the second stub 53 and that is close to the head end 531, to have a larger volume.

The first surface 831 of the second side magnet 83 is parallel to the second surface 832, and the second side magnet 83 is in a cuboid shape.

In some embodiments, when vibration space requirements of the first stub 52 and the second stub 53 are met, the second width W2 of the second side magnet 83 may be appropriately increased, or a height of the second side magnet 83 may be reduced and the second width W2 of the second side magnet 83 may be greatly increased (in this case, the second width W2 may be greater than or equal to the first width W1 of the first side magnet 82), so that the second side magnet 83 has a larger volume.

Figure 37:
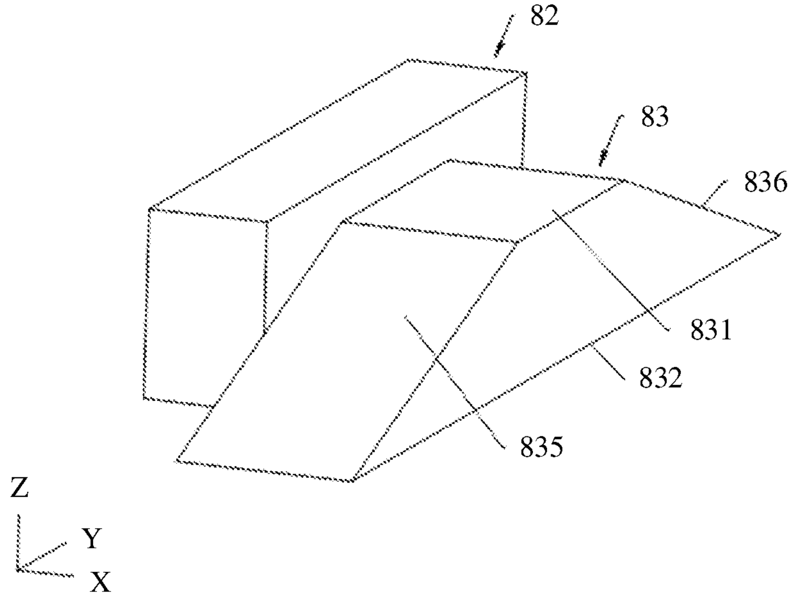
FIG. 37 is a schematic structural diagram of a first side magnet and a second side magnet in FIG. 32 according to still another embodiment.
Figure 38:
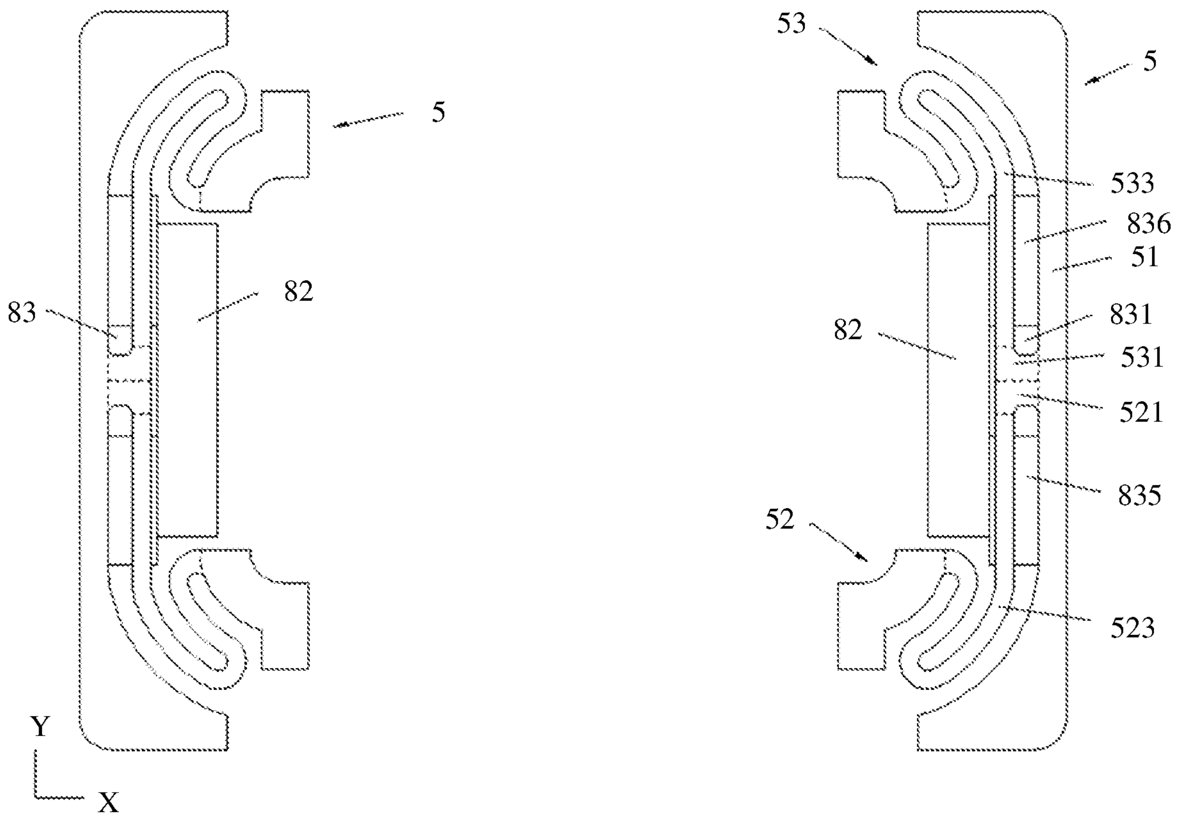
FIG. 38 is a schematic diagram of a location relationship between a first side magnet and a second side magnet shown in FIG. 37 and a flexible printed circuit board.

Refer to both FIG. 37 and FIG. 38. FIG. 37 is a schematic structural diagram of the first side magnet 82 and the second side magnet 83 shown in FIG. 32 according to still another embodiment, and FIG. 38 is a schematic diagram of a location relationship between the first side magnet 82 and the second side magnet 83 shown in FIG. 37 and the flexible printed circuit board 5. The following mainly describes differences between this embodiment and the foregoing embodiments, and most content that is the same in the embodiments is not described again.

A cross section, parallel to the YZ plane, of the second side magnet 83 is in a trapezoidal shape. Specifically, the first surface 831 of the second side magnet 83 is parallel to the second surface 832. The first surface 831 directly faces the head end 521 of the first stub 52 of the flexible printed circuit board 5 and the head end 531 of the second stub 53 of the flexible printed circuit board 5. The second side magnet 83 further includes a first side face 835 and a second side face 836. The first side face 835 connects one end of the first surface 831 to one end of the second surface 832. The second side face 836 connects the other end of the first surface 831 to the other end of the second surface 832. The first side face 835 directly faces the connection section 523 of the first stub 52. The second side face 836 directly faces the connection section 533 of the second stub 53.

Figure 39:
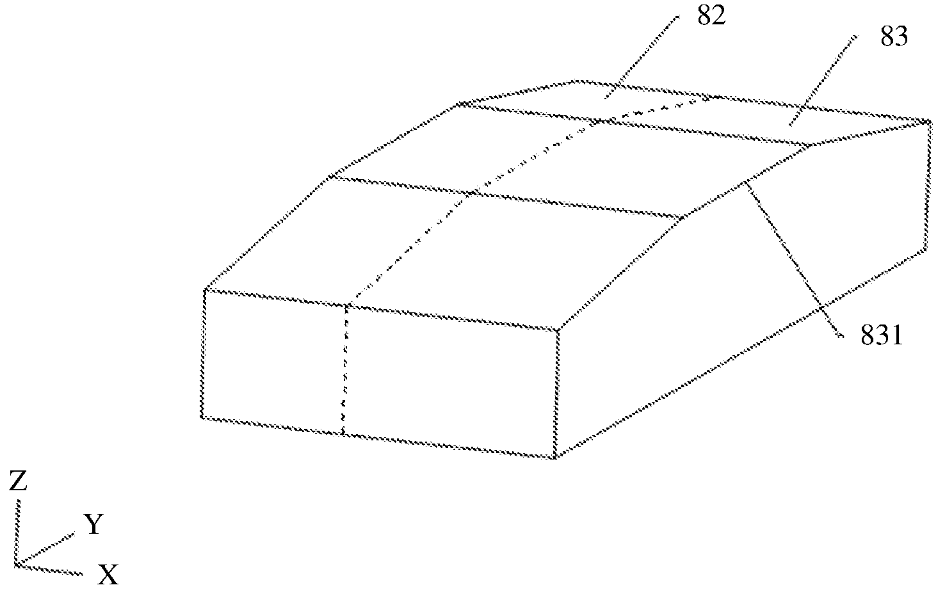
FIG. 39 is a schematic structural diagram of a first side magnet and a second side magnet in FIG. 32 according to still another embodiment.
Figure 40:
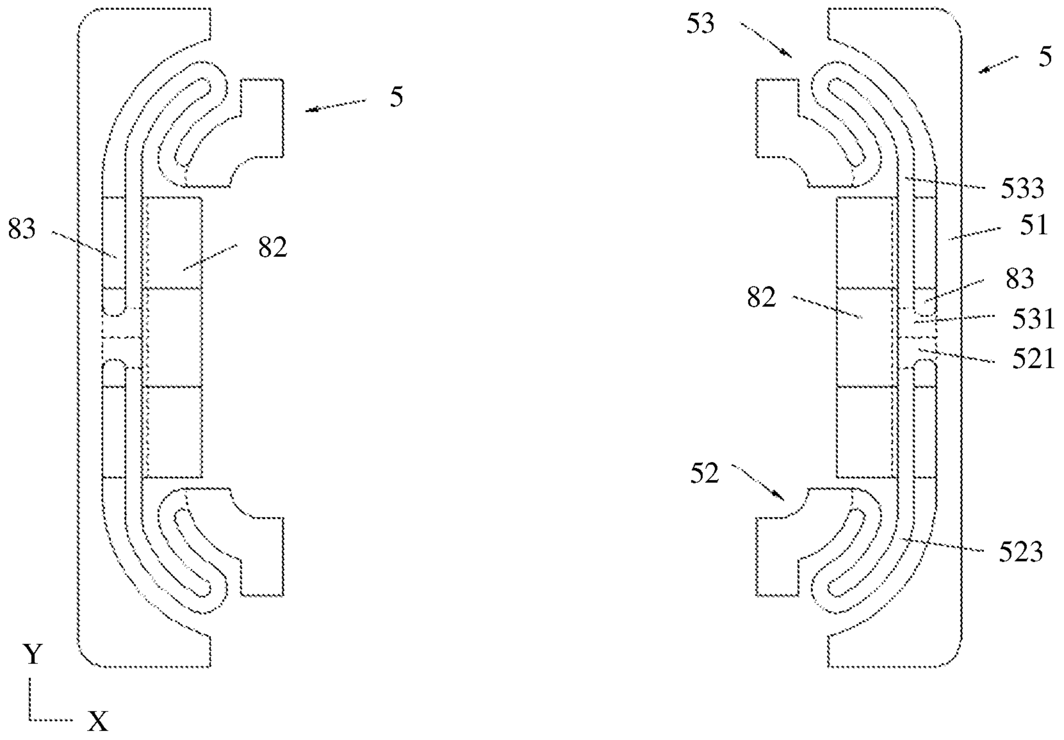
FIG. 40 is a schematic diagram of a location relationship between a first side magnet and a second side magnet shown in FIG. 39 and a flexible printed circuit board.

Refer to both FIG. 39 and FIG. 40. FIG. 39 is a schematic structural diagram of the first side magnet 82 and the second side magnet 83 shown in FIG. 32 according to still another embodiment, and FIG. 40 is a schematic diagram of a location relationship between the first side magnet 82 and the second side magnet 83 shown in FIG. 39 and the flexible printed circuit board 5. The following mainly describes differences between this embodiment and the foregoing embodiments, and most content that is the same in the embodiments is not described again.

The first side magnet 82 and the second side magnet 83 are integrated. A cross-sectional shape of the first side magnet 82 is the same as a cross-sectional shape of the second side magnet 83. A cross section of the first side magnet 82 and a cross section of the second side magnet 83 are both perpendicular to the length direction X of the electroacoustic transducer 10.

In this embodiment, a height of the first side magnet 82 is lower than that in the foregoing embodiment, and a plurality of outer surfaces of the first side magnet 82 that are parallel to the length direction X of the electroacoustic transducer 10 are coplanar with the second side magnet 83, so that the first side magnet 82 and the second side magnet 83 can be integrated, to simplify an assembly process and improve assembly precision.

A location relationship between the flexible printed circuit board 5 and each plane of the first surface 831 of the second side magnet 83 may be the same as that in the foregoing embodiment, and the first side magnet 82 is arranged based on a location of the second side magnet 83.

Figure 41:
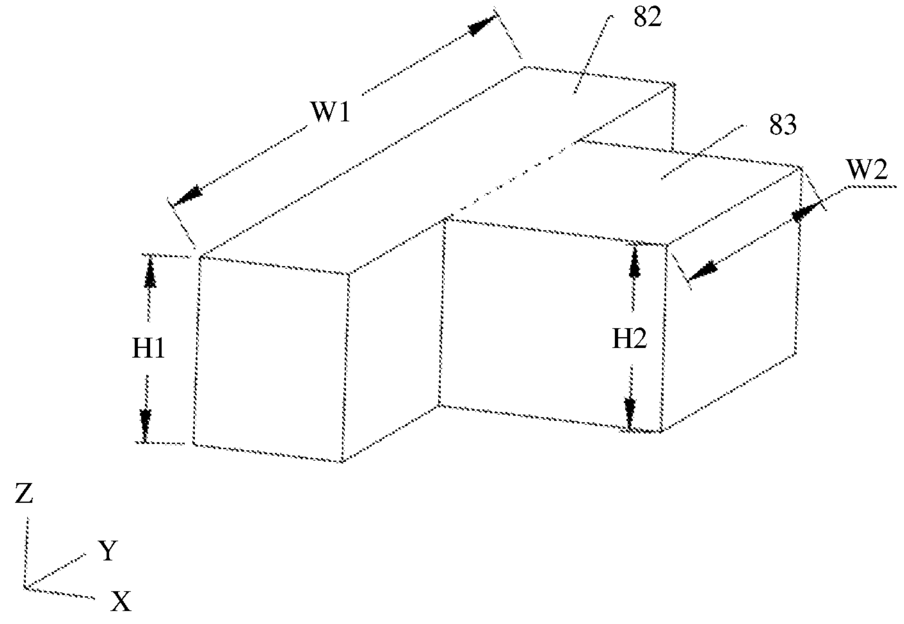
FIG. 41 is a schematic structural diagram of a first side magnet and a second side magnet in FIG. 32 according to still another embodiment.

FIG. 41 is a schematic structural diagram of the first side magnet 82 and the second side magnet 83 in FIG. 32 according to still another embodiment. The following mainly describes differences between this embodiment and the foregoing embodiments, and most content that is the same in the embodiments is not described again.

The first side magnet 82 and the second side magnet 83 are integrated. In the thickness direction Z of the electroacoustic transducer 10, a height H1 of the first side magnet 82 is the same as a height H2 of the second side magnet 83. A size of the second side magnet 83 in the width direction Y of the electroacoustic transducer 10 is a second width W2. A size of the first side magnet 82 in the width direction Y of the electroacoustic transducer 10 is a first width W1. The second width W2 is less than the first width W1.

Compared with the first side magnet 82 in the embodiment shown in FIG. 35, the first side magnet 82 in this embodiment has a lower height H1, and two surfaces of the first side magnet 82 and two surfaces of the second side magnet 83 that are in a direction parallel to the XY plane are separately coplanar, so that the first side magnet 82 and the second side magnet 83 can be integrated, to simplify an assembly process and improve assembly precision.

Figure 42:
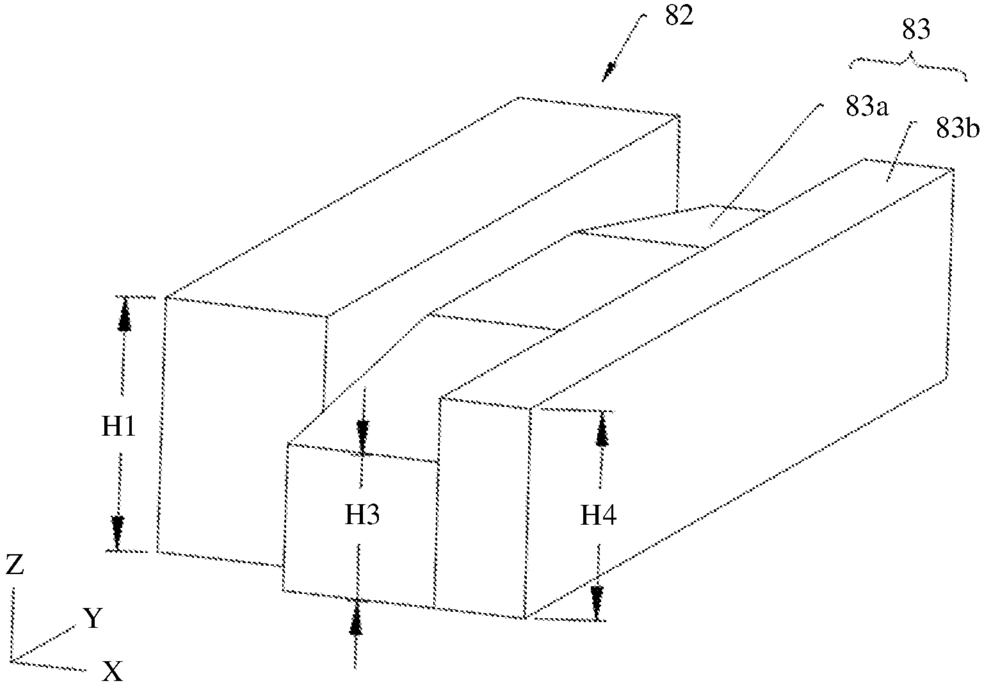
FIG. 42 is a schematic structural diagram of a first side magnet and a second side magnet in FIG. 32 according to still another embodiment.
Figure 43:
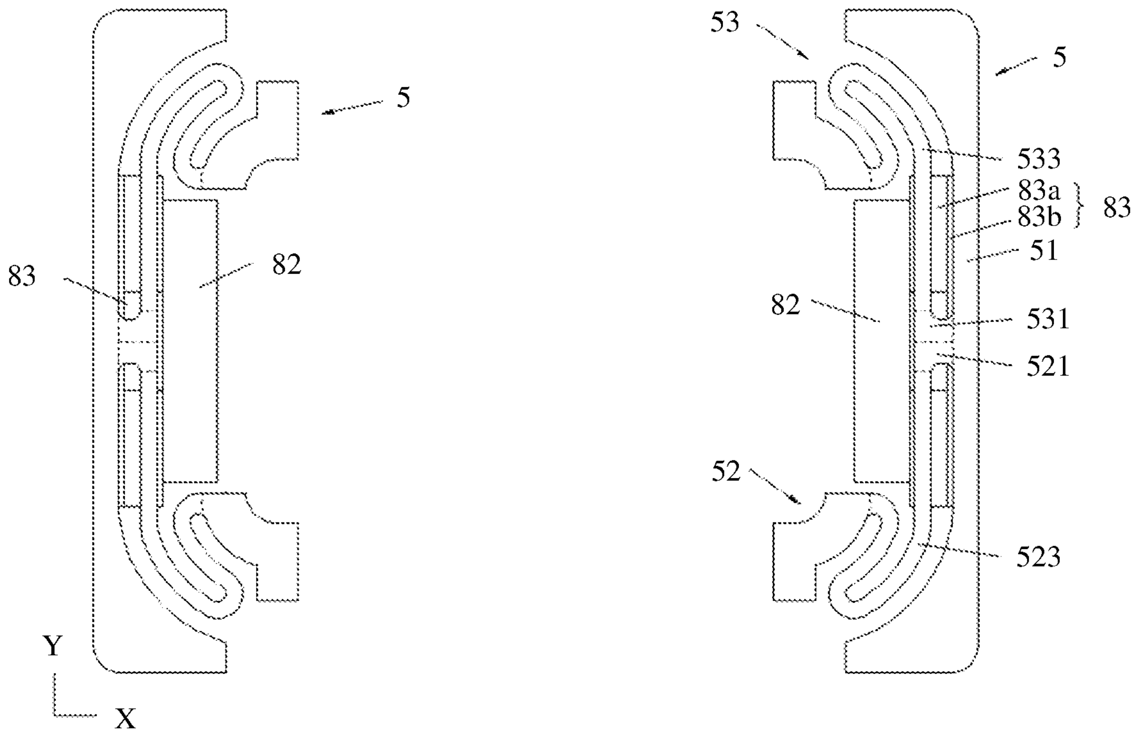
FIG. 43 is a schematic diagram of a location relationship between a first side magnet and a second side magnet shown in FIG. 42 and a flexible printed circuit board.

Refer to both FIG. 42 and FIG. 43. FIG. 42 is a schematic structural diagram of the first side magnet 82 and the second side magnet 83 shown in FIG. 32 according to still another embodiment, and FIG. 43 is a schematic diagram of a location relationship between the first side magnet 82 and the second side magnet 83 shown in FIG. 42 and the flexible printed circuit board 5. The following mainly describes differences between this embodiment and the foregoing embodiments, and most content that is the same in the embodiments is not described again.

The second side magnet 83 includes a first magnetic part 83*a* and a second magnetic part 83*b*. The first magnetic part 83*a* is located between the second magnetic part 83*b* and the first side magnet 82. The second magnetic part 83*b* is disposed directly opposite to the body 51 of the flexible printed circuit board 5. The first magnetic part 83*a* is disposed directly opposite to the head end 521 of the first stub 52 of the flexible printed circuit board 5 and the head end 531 of the second stub 53 of the flexible printed circuit board 5. Alternatively, the first magnetic part 83*a* may be disposed directly opposite to the part that is of the connection section 523 of the first stub 52 and that is close to the head end 521, and the part that is of the connection section 533 of the second stub 53 and that is close to the head end 531.

A length of the first magnetic part 83*a* in the length direction X of the electroacoustic transducer 10 is less than that of the second side magnet 83 in the foregoing embodiment. For other structures and parameter designs of the first magnetic part 83*a*, refer to the second side magnet 83 in the foregoing embodiment.

In the thickness direction Z of the electroacoustic transducer 10, a height H4 of the second magnetic part 83*b* is greater than a height H3 of the first magnetic part 83*a*, and the height H4 of the second magnetic part 83*b* is less than the height Hi of the first side magnet 82. For example, in the electroacoustic transducer 10, a top face of the second magnetic part 83*b* may be in contact with the body 51 of the flexible printed circuit board 5, to fully utilize a space under the flexible printed circuit board 5.

The first magnetic part 83*a* and the second magnetic part 83*b* may be integrated, or may be assembled (for example, bonded) to form an integrated structure.

It can be understood that, if there is no collision, features of the first side magnet 82 and the second side magnet 83 described in the foregoing embodiments may be combined to form a new embodiment.

Figure 44:
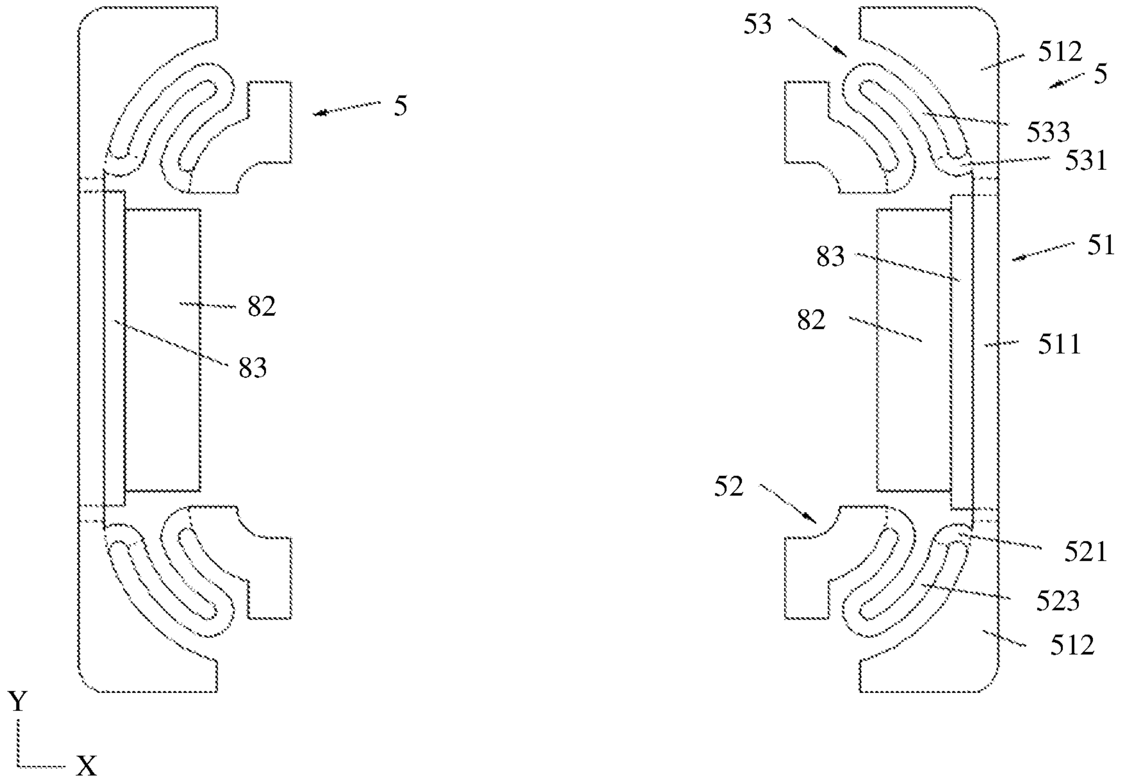
FIG. 44 is a schematic structural diagram of a flexible printed circuit board, a first side magnet, and a second side magnet in FIG. 32 according to still another embodiment.
Figure 45:
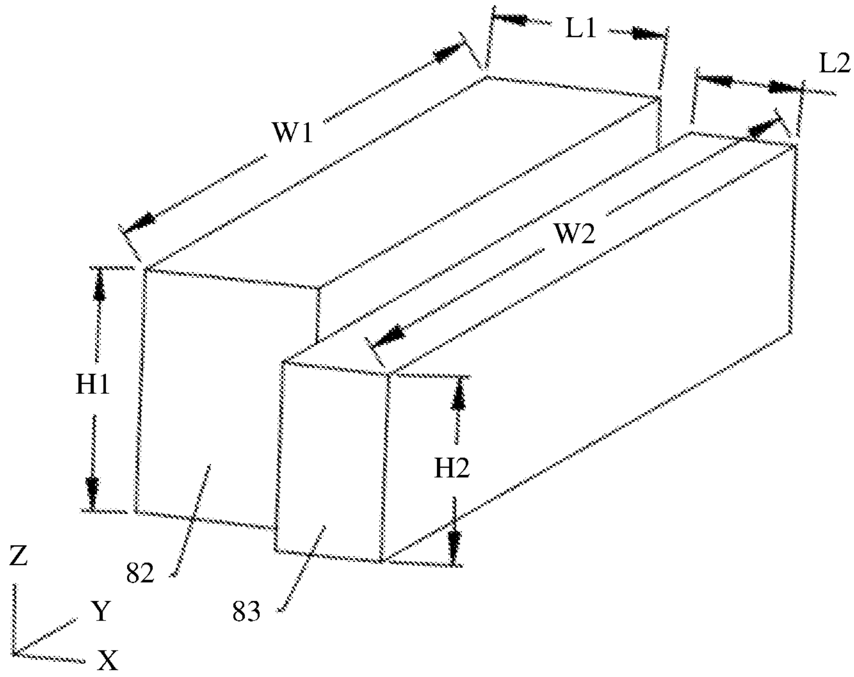
FIG. 45 is a schematic structural diagram of a first side magnet and a second side magnet shown in FIG. 44.

Refer to both FIG. 44 and FIG. 45. FIG. 44 is a schematic structural diagram of the flexible printed circuit board 5, the first side magnet 82, and the second side magnet 83 in FIG. 32 according to still another embodiment, and FIG. 45 is a schematic structural diagram of the first side magnet 82 and the second side magnet 83 shown in FIG. 44. The following mainly describes differences between this embodiment and the foregoing embodiments, and most content that is the same in the embodiments is not described again.

The flexible printed circuit board 5 includes a body 51, a first stub 52, and a second stub 53. The body 51 includes a middle part 511 and two end palls 512 respectively connected to two sides of the middle part 511. A head end 521 of the first stub 52 and a head end 531 of the second stub 53 are respectively connected to the two end palls 512 of the body 51. The second side magnet 83 directly faces the middle part 511 of the body 51 of the flexible printed circuit board 5. The two first side magnets 82 are located between the two second side magnets 83.

In this embodiment, because the first stub 52 and the second stub 53 of the flexible printed circuit board 5 are connected to the two end palls 512 of the body 51, a space on an inner side of the middle part 511 of the body 51 is released. Compared with the foregoing embodiments, in this embodiment, in the length direction X of the electroacoustic transducer 10, a length of the second side magnet 83 is reduced, and a length of the first side magnet 82 is increased, so that the magnetic circuit assembly 10*c* has higher magnetic induction strength. For example, in the length direction X of the electroacoustic transducer 10, the length Li of the first side magnet 82 may be greater than the length L2 of the second side magnet 83.

As shown in FIG. 45, for example, the first side magnet 82 is in a cuboid shape, and the second side magnet 83 is in a cuboid shape. In the thickness direction Z of the electroacoustic transducer 10, a height Hi of the first side magnet 82 may be greater than a height H2 of the second side magnet 83. In the width direction Y of the electroacoustic transducer 10, a width W2 of the second side magnet 83 may be greater than a width Wi of the first side magnet 82.

The foregoing descriptions are merely specific implementations of this application, but are not intended to limit the protection scope of this application. Any variation or replacement readily figured out by a person skilled in the art within the technical scope disclosed in this application shall fall within the protection scope of this application. If there is no conflict, the embodiments of this application and the features of the embodiments may be combined with each other. Therefore, the protection scope of this application shall be subject to the protection scope of the claims.

What is claimed is:

1. An electroacoustic transducer, comprising a center magnet, two first side magnets, two second side magnets, a voice coil, a voice diaphragm, and two flexible printed circuit boards, wherein the two first side magnets are symmetrically arranged at two sides of the center magnet, and a first gap is formed between each first side magnet and the center magnet, the two second side magnets are symmetrically arranged at the two sides of the center magnet and are away from the center magnet;

a first side of the voice coil is partially located in the first gap, and the voice diaphragm is fixedly connected to a second side of the voice coil; and the two flexible printed circuit boards are symmetrically arranged at the two sides of the center magnet and away from the center magnet, and each of the two flexible printed circuit boards is located between a respective second side magnet and the voice diaphragm, and tail ends of two stubs of each flexible printed circuit board are fixedly connected to two corners of the voice coil respectively.

2. The electroacoustic transducer according to claim 1, wherein the electroacoustic transducer further comprises a basin stand, a frame of the basin stand comprises a first face and a second face that are opposite to each other, a periphery of the voice diaphragm is fixed to the first face of the frame, the voice coil is located on an inner side of the frame, and the two flexible printed circuit boards are both partially fixed to the second face of the frame.

3. The electroacoustic transducer according to claim 2, wherein each of the two flexible printed circuit boards comprises a body, a first stub, and a second stub; the body is fixedly connected to the second face of the frame; a head end of the first stub and a head end of the second stub are both connected to a middle part of the body; a tail end of the first stub is fixedly connected to a corner of the voice coil; a tail end of the second stub is fixedly connected to another corner of the voice coil; the head end of the first stub and the head end of the second stub are disposed directly opposite to a respective second side magnet; and the first stub and the second stub are spaced from the respective second side magnet and a respective first side magnet.

4. The electroacoustic transducer according to claim 3, wherein the first stub comprises a bent section and a straight section, one end of the bent section is connected to the tail end of the first stub, the other end of the bent section is connected to one end of the straight section, the other end of the straight section is connected to the head end of the first stub, the bent section comprises one or more arc sections, and each arc section is convex in a direction away from the center magnet.

5. The electroacoustic transducer according to claim 4, wherein the voice coil is in a rounded rectangular shape, the tail end of the first stub is fixedly connected to a round corner of the voice coil, and each arc section is disposed coaxially with the round corner of the voice coil, the round corner of the voice coil being connected to the first stub.

6. The electroacoustic transducer according to claim 3, wherein the electroacoustic transducer further comprises two auxiliary vibration diaphragms arranged on a side, away from the voice coil, of each of the two flexible printed circuit boards; respective first ends of the two auxiliary vibration diaphragms are fixedly connected to tail ends of the first stub and the second stub of a respective flexible printed circuit board; respective second ends of the two auxiliary vibration diaphragms are fixedly connected to ends of the body of the respective flexible printed circuit board; and a respective first end and a respective second end of each auxiliary vibration diaphragm are movable relative to each other.

7. The electroacoustic transducer according to claim 2, wherein each of the two flexible printed circuit boards comprises a body, a first stub, and a second stub; the body is fixedly connected to the second face of the frame; a head end of the first stub and a head end of the second stub are respectively connected to two end parts of the body; a tail end of the first stub is fixedly connected to a corner of the voice coil; and a tail end of the second stub is fixedly connected to another corner of the voice coil.

8. The electroacoustic transducer according to claim 7, wherein in a thickness direction of the center magnet, a height of a first side magnet is greater than a height of a second side magnet.

9. The electroacoustic transducer according to claim 2, wherein the basin stand further comprises a plurality of legs, and the plurality of legs are fixed to the second face of the frame at intervals; and the electroacoustic transducer further comprises a lower electrode plate, the lower electrode plate is fixedly connected to the plurality of legs and is spaced from the frame of the basin stand, and the center magnet, the two first side magnets, and the two second side magnets are fixed to a side of the lower electrode plate, the side facing the frame of the basin stand.

10. The electroacoustic transducer according to claim 9, wherein the electroacoustic transducer further comprises a center electrode plate and a side electrode plate; the center electrode plate is fixed to a side of the center magnet, the side of the center magnet being away from the lower electrode plate; the side electrode plate is fixed to an inner side of the frame, and is spaced from the two flexible printed circuit boards; the side electrode plate comprises a first electrode plate part; the first electrode plate part is disposed directly opposite to a first side magnet and a second side magnet; a second gap is formed between the first electrode plate part and the center electrode plate; the second gap is connected to the first gap; and the voice coil is partially located in the second gap.

11. The electroacoustic transducer according to claim 10, wherein the electroacoustic transducer further comprises two third side magnets, the two third side magnets are fixed to a side of the lower electrode plate, and are symmetrically arranged at other two sides of the center magnet, the side of the lower electrode plate facing the frame, and a third gap is formed between each third side magnet and the center magnet; and the side electrode plate further comprises a second electrode plate part, the second electrode plate part directly faces a third side magnet, a fourth gap is formed between the second electrode plate part and the center electrode plate, the fourth gap is connected to the third gap, and the voice coil is partially located in the fourth gap and partially located in the third gap.

12. The electroacoustic transducer according to claim 1, wherein the electroacoustic transducer further comprises a connection frame, the connection frame is located between the voice coil and the voice diaphragm, one end of the connection frame is fixedly connected to the voice coil, and the other end of the connection frame is fixedly connected to the voice diaphragm.

13. The electroacoustic transducer according to claim 1, wherein in a thickness direction of the center magnet, a height of each first side magnet is greater than a height of each second side magnet.

14. The electroacoustic transducer according to claim 13, wherein each second side magnet comprises a first surface and a second surface that are disposed opposite to each other; the first surface faces a flexible printed circuit board; the first surface comprises a first plane, a first inclined plane, and a second inclined plane; the first plane is parallel to the second surface; one end of the first inclined plane is connected to one end of the first plane, and the other end of the first inclined plane extends in a direction toward the second surface; and one end of the second inclined plane is connected to the other end of the first plane, and the other end of the second inclined plane extends in a direction toward the second surface.

15. The electroacoustic transducer according to claim 13, wherein the two second side magnets, the two first side magnets, and the center magnet are arranged in a first direction; a size of each first side magnet in a second direction is a first width; the second direction is perpendicular to the first direction and a thickness direction of the center magnet; a size of each second side magnet in the second direction is a second width; and the second width is less than the first width.

16. The electroacoustic transducer according to claim 1, wherein a first side magnet and a second side magnet at a same side of the center magnet are integrated, and the second side magnet, the first side magnet, and the center magnet are arranged in a first direction;

a cross-sectional shape of the first side magnet is the same as a cross-sectional shape of the second side magnet, and a cross section of the first side magnet and a cross section of the second side magnet are both perpendicular to the first direction; or in a thickness direction of the center magnet, a height of the first side magnet is the same as a height of the second side magnet, a size of the first side magnet in a second direction is a first width, the second direction is perpendicular to the first direction and the thickness direction of the center magnet, a size of the second side magnet in the second direction is a second width, and the second width is less than the first width.

17. A speaker module, comprising an upper module housing and an electroacoustic transducer, the electroacoustic transducer comprises a center magnet, two first side magnets, two second side magnets, a voice coil, a voice diaphragm, and two flexible printed circuit boards, wherein the two first side magnets are symmetrically arranged at two sides of the center magnet, and a first gap is formed between each first side magnet and the center magnet, the two second side magnets are symmetrically arranged at the two sides of the center magnet and are away from the center magnet;

a first side of the voice coil is partially located in the first gap, and the voice diaphragm is fixedly connected to a second side of the voice coil; and the two flexible printed circuit boards are symmetrically arranged at the two sides of the center magnet and are away from the center magnet, and each of the two flexible printed circuit boards is located between a respective second side magnet and the voice diaphragm, and tail ends of two stubs of each flexible printed circuit board are fixedly connected to two corners of the voice coil respectively; and wherein the electroacoustic transducer is fixedly connected to the upper module housing, a front speaker box is formed between the voice diaphragm and the upper module housing, the upper module housing is provided with a sound outlet hole, and the sound outlet hole connects the front speaker box to an outer side of the speaker module.

18. The speaker module according to claim 17, wherein the speaker module further comprises a lower module housing; the lower module housing is fixed to the upper module housing; the electroacoustic transducer is located inside the lower module housing and the upper module housing; a rear speaker box is formed on a side of the voice diaphragm, the side of the voice diaphragm being away from the front speaker box; the lower module housing is provided with a leakage hole; and the leakage hole connects the rear speaker box to the outer side of the speaker module.

19. An electronic device, comprising a housing and a speaker module, the speaker module comprises an upper module housing and an electroacoustic transducer, the electroacoustic transducer comprising a center magnet, two first side magnets, two second side magnets, a voice coil, a voice diaphragm, and two flexible printed circuit boards, wherein the two first side magnets are symmetrically arranged at two sides of the center magnet, and a first gap is formed between each first side magnet and the center magnet, the two second side magnets are symmetrically arranged at the two sides of the center magnet and are away from the center magnet;

a first side of the voice coil is partially located in the first gap, and the voice diaphragm is fixedly connected to a second side of the voice coil; and the two flexible printed circuit boards are symmetrically arranged at the two sides of the center magnet and are away from the center magnet, and each of the two flexible printed circuit boards is located between a respective second side magnet and the voice diaphragm, and tail ends of two stubs of each flexible printed circuit board are fixedly connected to two corners of the voice coil respectively;

wherein the electroacoustic transducer is fixedly connected to the upper module housing, a front speaker box is formed between the voice diaphragm and the upper module housing, the upper module housing is provided with a sound outlet hole, and the sound outlet hole connects the front speaker box to an outer side of the speaker module; and wherein the speaker module is accommodated in the housing, the housing is provided with a speaker hole, and the speaker hole connects the sound outlet hole to an outer side of the electronic device.

* * * * *